United States Patent
Gupta et al.

(10) Patent No.: US 11,432,214 B2
(45) Date of Patent: Aug. 30, 2022

(54) METHOD FOR NETWORK STATE IDENTIFICATION AND ELECTRONIC DEVICE THEREFOR

(71) Applicant: Samsung Electronics Co., Ltd., Suwon-si (KR)

(72) Inventors: Ashish Gupta, Suwon-si (KR); Yonghae Choi, Suwon-si (KR); Gibeom Kim, Suwon-si (KR); Heewon Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 34 days.

(21) Appl. No.: 15/733,418

(22) PCT Filed: Jan. 22, 2019

(86) PCT No.: PCT/KR2019/000900
§ 371 (c)(1),
(2) Date: Jul. 23, 2020

(87) PCT Pub. No.: WO2019/146996
PCT Pub. Date: Aug. 1, 2019

(65) Prior Publication Data
US 2021/0099936 A1    Apr. 1, 2021

(30) Foreign Application Priority Data

Jan. 23, 2018 (KR) .................. 10-2018-0008282
Aug. 8, 2018 (KR) .................. 10-2018-0092687

(51) Int. Cl.
*H04W 36/14* (2009.01)
*H04W 36/30* (2009.01)
*H04W 80/06* (2009.01)

(52) U.S. Cl.
CPC .......... *H04W 36/14* (2013.01); *H04W 36/30* (2013.01); *H04W 80/06* (2013.01)

(58) Field of Classification Search
CPC ...... H04W 36/14; H04W 36/30; H04W 80/06
See application file for complete search history.

(56) References Cited

U.S. PATENT DOCUMENTS 6,115,393 A      9/2000 Engel et al.
2010/0002610 A1  1/2010 Bowser et al.
(Continued)

FOREIGN PATENT DOCUMENTS

EP    2756653 B1    4/2017

OTHER PUBLICATIONS

International Search Report and Written Opinion of the International Searching Authority in connection with International Application No. PCT/KR2019/00900 dated Apr. 12, 2019, 12 pages.
(Continued)

*Primary Examiner* — Ricky Q Ngo
*Assistant Examiner* — Stephen N Steiner

(57) ABSTRACT

An electronic device according to various embodiments of the present invention can include a method comprising the steps of: identifying the state of a transport protocol; determining a communication state of the electronic device on the basis of the state of the transport protocol; and changing a network on the basis of the communication state. Other embodiments are also possible.

18 Claims, 45 Drawing Sheets

(56) References Cited

U.S. PATENT DOCUMENTS

| | | | |
|---|---|---|---|
| 2014/0017990 A1* | 1/2014 | Kakadia | H04W 36/14 |
| | | | 455/7 |
| 2015/0092747 A1 | 4/2015 | Ganesan | |
| 2015/0215832 A1 | 7/2015 | Fitzpatrick | |
| 2015/0280995 A1 | 10/2015 | Centoza et al. | |
| 2016/0353344 A1* | 12/2016 | Deivasigamani | ............................ |
| | | | H04M 15/8061 |
| 2017/0188407 A1* | 6/2017 | Zee | H04W 36/0027 |

OTHER PUBLICATIONS

Korean Intellectual Property Office, "Notice of Preliminary Rejection," dated Jul. 14, 2022, in connection with Korean Patent Application No. 10-2018-0092687, 10 pages.

* cited by examiner

FIG.15A

METHOD FOR NETWORK STATE IDENTIFICATION AND ELECTRONIC DEVICE THEREFOR

CROSS-REFERENCE TO RELATED APPLICATIONS

This application is a 371 National Stage of International Application No. PCT/KR2019/000900, filed Jan. 22, 2019, which claims priority to Korean Patent Application No. 10-2018-0008282, filed Jan. 23, 2018, and Korean Patent Application No. 10-2018-0092687, filed Aug. 8, 2018, the disclosures of which are herein incorporated by reference in their entirety.

BACKGROUND

1. Field

Various embodiments of the disclosure relate to an apparatus and method for network state identification by an electronic device.

2. Description of Related Art

Recently, in order to cope with the exponential increase in the number of smartphone users with the introduction of smartphones, efforts have been made to provide optimal network services to a user. For example, the optimal network services can provide a seamless Internet experience for a user regardless of whether a Wi-Fi or a cellular network is being used by selecting the optimal network for the user to access the Internet. In order to provide optimal network services to the user, methods of measuring a user's network environment and selecting a network so that the user can smoothly use network services have been discussed. For example, an electronic device can analyze a state of a transport layer protocol represented by a transmission control protocol (TCP), thereby providing an optimal network environment for a user.

SUMMARY

Various embodiments of the disclosure provide a method for network state identification by an electronic device and an electronic device therefor.

According to various embodiments of the disclosure, a method of operating an electronic device may include: identifying a state of a transport protocol; determining a communication state of an electronic device based on the state of the transport protocol; and changing a network based on the communication state.

According to various embodiments of the disclosure, an electronic device may include: a communication module; at least one processor; and a memory operatively connected to the at least one processor, wherein the memory stores instructions that, when executed, cause the at least one processor to: identify a state of a transport protocol; determine a communication state of the electronic device based on the state of the transport protocol; and change a network based on the communication state.

According to various embodiments, an electronic device and a method of operating the same may identify a network state by using a transport protocol so as to more efficiently identify the network state compared to conventional methods.

BRIEF DESCRIPTION OF THE DRAWINGS

FIG. 15A illustrates an example 1500 of an interface of an electronic device, the interface being displayed on the electronic device when a communication state is a blocked state according to various embodiments of the disclosure;

DETAILED DESCRIPTION

Hereinafter, various embodiments will be described with reference to the accompanying drawings.

Figure 1:
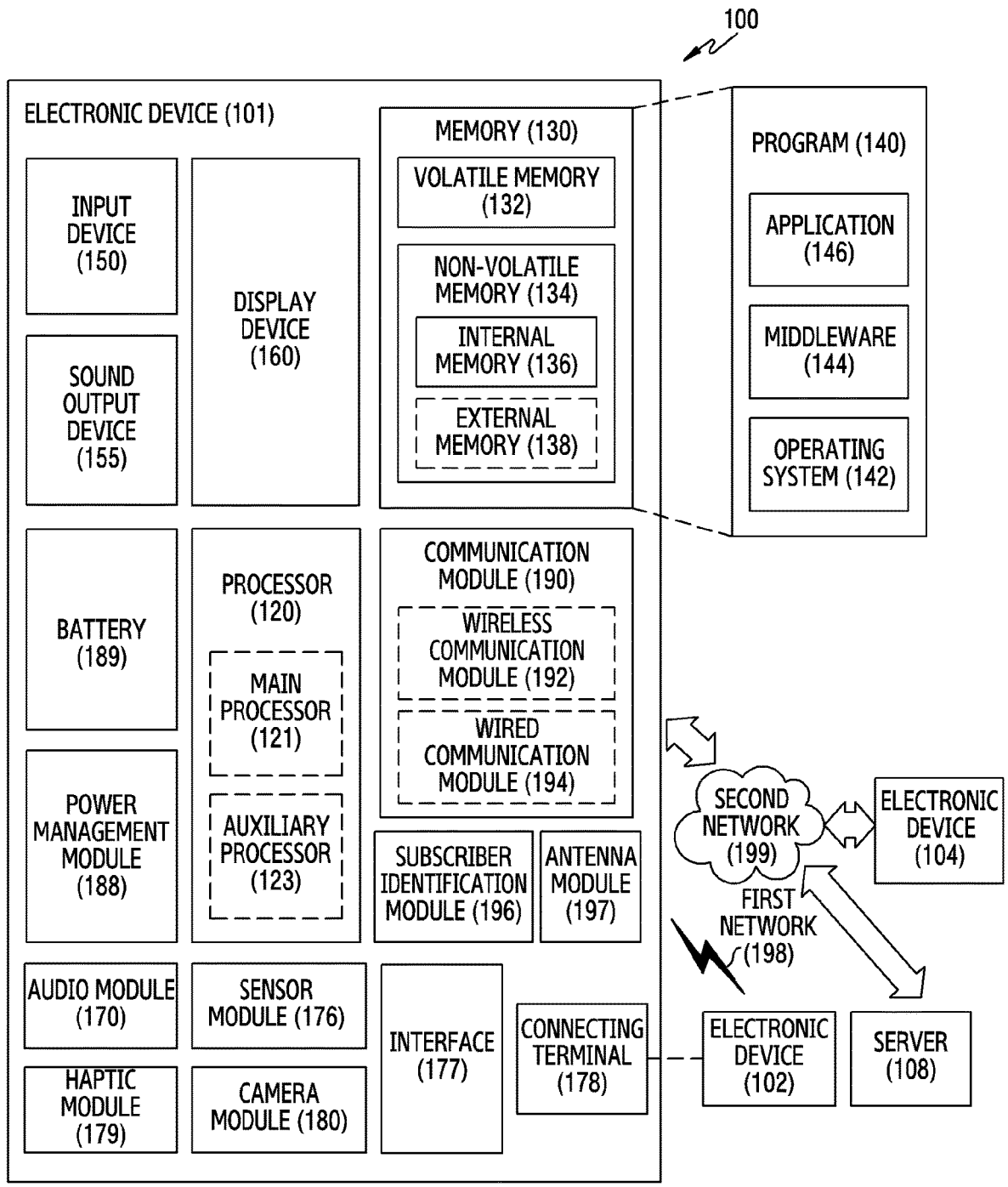
FIG. 1 illustrates a block diagram of an electronic device in a network environment according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
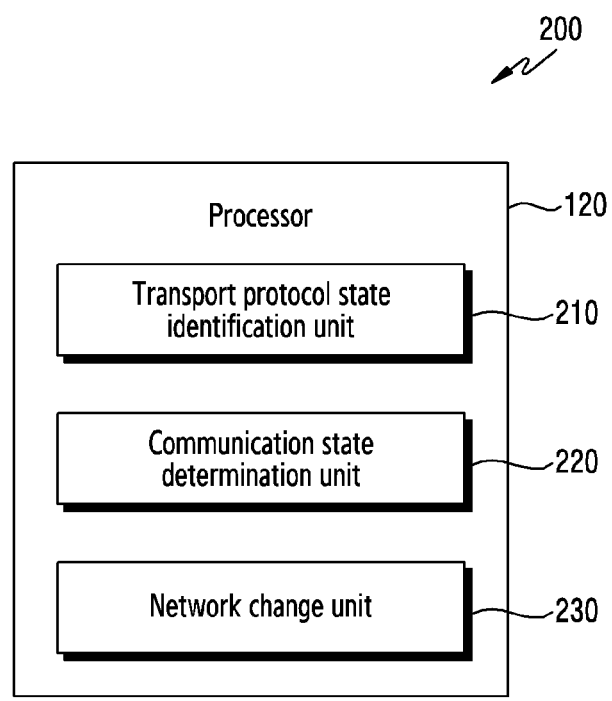
FIG. 2A illustrates a block diagram 200 of an electronic device according to various embodiments of the disclosure.

FIG. 2A illustrates a block diagram 200 of an electronic device according to various embodiments of the disclosure. For example, the electronic device may include all or part of the electronic device 101 shown in FIG. 1.

Referring to FIG. 2A, the electronic device 101 may include at least one processor 120 (e.g., an AP). According to various embodiments, the processor 120 may include a transport protocol state identification unit 210, a communication state determination unit 220, and a network change unit 230, but is not limited thereto, and some components may be omitted. According to an embodiment of the disclosure, the transport protocol state identification unit 210, the communication state determination unit 220, and the network change unit 230 may be configured as a module configured using separate hardware or software outside the processor 120.

The transport protocol state identification unit 210 may identify a state of a transport protocol in order to determine a communication state of the electronic device. According to various embodiments of the disclosure, the transport protocol may include a transmission control protocol (TCP). The TCP may provide connection-oriented communication. In the connection-oriented communication, communication may be performed after preparation for starting communication with a communication partner, before data communication is started. In the connection procedure, the TCP may indicate various socket states, and the electronic device may identify a dynamically changing state of a TCP socket.

According to various embodiments, the communication state determination unit 220 may determine a communication state of the electronic device based on the identified state of the TCP socket. For example, the communication state may include states such as data transmission and reception signal strength of the electronic device and blocking by a network firewall. According to various embodiments, a table predefined in order to determine the communication state according to the state of the TCP socket may be stored in a memory 130. According to various embodiments, the communication state may include a poor state, a good state, a blocked state, and a sluggish state. According to various embodiments, the communication state may indicate Internet service quality. For example, when a user may smoothly use an application which requires an Internet connection, the processor 120 may determine that the Internet service quality is good and determine the communication state to be a good state. When the user fails to smoothly use an application which requires an Internet connection, the processor 120 may determine that the Internet service quality is bad and determine the communication state to be a poor state.

According to various embodiments, the network change unit 230 may change the network to which the electronic device is connected based on the determined communication state. For example, in the case where the communication state of the electronic device is the blocked state, a Wi-Fi network environment is good, but the communication is blocked by a firewall. Therefore, the network change unit 230 may change a network from the Wi-Fi network to a cellular network. In another example, in some countries, even in a cellular network environment, permission to use a specific app may be blocked by the firewall. Accordingly, the network change unit 230 may notify the user of the blocked state and change the network from the cellular network to the Wi-Fi network.

According to various embodiments, since the processor 120 may not detect the blocking, by the firewall, of the specific application only by measuring the network quality, the processor 120 may detect a state of a socket of a transport layer protocol and change the network. For example, the transport layer protocol may include a user datagram protocol (UDP), TCP, and the like. Among these, TCP is a protocol for controlling transmission of information in a network, and allows a series of octets to be stably and sequentially exchanged without error between programs running on a computer or a smartphone connected to a local area network, an intranet, or the Internet. The above-described socket may be an endpoint for connecting communication between a plurality of entities that perform communication. Since all applications use sockets for transmitting and receiving data, applications interacting with other electronic devices may produce a socket pattern. In various embodiments of the disclosure, the processor 120 may use the socket pattern to detect the communication state of the electronic device. The communication state may include the user experience of the user who uses the electronic device. For example, the user experience may include states such as the data transmission and reception signal strength of the electronic device and blocking by the network firewall. According to various embodiments, the processor 120 may identify the state of the TCP socket and determine the communication state based on the state of the identified TCP socket. After determining the communication state, the processor 120 may change the network based on the determined communication state. For example, the network may be changed from the Wi-Fi network to the cellular network.

In various embodiments, the electronic device 101 may include a communication module 190, a processor 120, and a memory 130 operatively connected to the processor 120. The memory 130 may store instructions that, when executed, cause the processor 120 to: identify a state of a transport protocol; determine a communication state of the electronic device 101 based on the state of the identified transport protocol; and change a network based on the determined communication state of the electronic device 101. In an embodiment, the state of the transport protocol may include a state of a TCP socket used by an application executed in the electronic device 101. In an embodiment, the communication state of the electronic device 101 may be determined to be at least one of a good state, a poor state, a blocked state, and a sluggish state.

In an embodiment, the instructions stored in the memory 130 of the electronic device 101 may cause the at least one processor 120 to: detect a TCP socket for a connection establishment; identify whether a state of the TCP socket is changed from a connection establishment request state to a connection-established state; identify whether the sum of the number of transmission data packets of an application executed in the electronic device 101 and the number of reception data packets of an application executed in the electronic device 101 is greater than a threshold; identify whether the state of the TCP socket is a connection-release-waiting state and a time-waiting state; and, when the TCP socket for connection establishment is detected, the state of the TCP socket is changed from the connection establishment request state to the connection-established state, the sum of the number of transmission data packets and the number of reception data packets is greater than the threshold, or the connection-release-waiting state and the time-waiting state are identified, determine the communication state of the electronic device 101 to be a good state.

In an embodiment, the instructions stored in the memory 130 of the electronic device 101 may cause the processor 120 to: identify whether the communication state of the electronic device 101 is a good state; detect a TCP socket for connection establishment; identify whether a state of the TCP socket is a connection establishment request state; identify whether the number of transmission data packets of an application executed in the electronic device 101 is greater than the number of reception data packets of an application executed in the electronic device 101; and, when the communication state is not a good state, the TCP socket for the connection establishment is detected, the connection establishment request state is identified, and the number of transmission data packets is greater than the number of reception data packets, determine the communication state of the electronic device 101 to be a poor state.

In an embodiment, the instructions stored in the memory 130 of the electronic device 101 may cause the processor 120 to: detect a TCP socket for performing retransmission; identify whether the number of transmission data packets of an application executed in the electronic device 101 and the number of reception data packets of an application executed in the electronic device 101 are smaller than a threshold; identify whether a link speed, a signal-to-noise ratio (SNR), and received signal strength indication (RSSI) of the electronic device 101 are greater than a threshold; and, when the TCP socket for the retransmission is detected, the number of transmission data packets and the number of reception data packets are smaller than a threshold, and the link speed, the SNR, and the RSSI are greater than corresponding thresholds, determine the communication state of the electronic device 101 to be a blocked state. In an embodiment, the blocked state may include a state in which an application executed in the electronic device 101 is blocked by a network firewall.

In an embodiment, the instructions stored in the memory 130 of the electronic device 101 may cause the processor 120 to: detect a TCP socket for connection establishment; identify whether a state of the TCP socket is a new connection establishment request state; identify whether the sum of the number of transmission data packets of an application executed in the electronic device 101 and the number of reception data packets of an application executed in the electronic device 101 is smaller than a threshold; and, when the TCP socket for the connection establishment is detected, the new connection establishment request state is identified, and the sum of the number of transmission data packets and the number of reception data packets is smaller than the threshold; determine the communication state of the electronic device 101 to be a sluggish state.

Figure 2B:
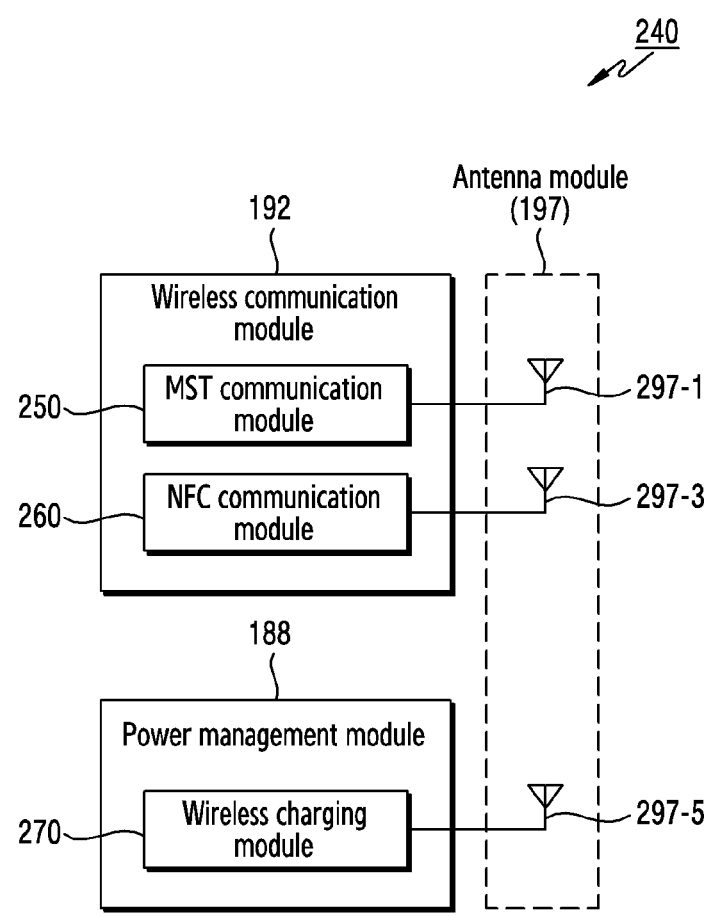
FIG. 2B illustrates a block diagram 240 of a wireless communication module, a power management module, and an antenna module of an electronic device according to various embodiments of the disclosure.

FIG. 2B is a block diagram 200 illustrating the wireless communication module 192, the power management module 188, and the antenna module 197 of the electronic device 101 according to various embodiments. Referring to FIG. 2B, the wireless communication module 192 may include a magnetic secure transmission (MST) communication module 250 or a near-field communication (NFC) module 260, and the power management module 188 may include a wireless charging module 270. In such a case, the antenna module 197 may include a plurality of antennas that include a MST antenna 297-1 connected with the MST communication module 250, a NFC antenna 297-3 connected with the NFC communication module 260, and a wireless charging antenna 297-5 connected with the wireless charging module 270. For ease of description, the same components as those described in regard to FIG. 1 are briefly described or omitted from the description.

The MST communication module 250 may receive a signal containing control information or payment information such as card information from the processor 120, generate a magnetic signal corresponding to the received signal, and then transfer the generated magnetic signal to the external electronic device 102 (e.g., a point-of-sale (POS) device) via the MST antenna 297-1. To generate the magnetic signal, according to an embodiment, the MST communication module 250 may include a switching module (not shown) that includes one or more switches connected with the MST antenna 297-1, and control the switching module to change the direction of voltage or current supplied to the MST antenna 297-1 according to the received signal. The change of the direction of the voltage or current allows the direction of the magnetic signal (e.g., a magnetic field) emitted from the MST antenna 297-1 to change accordingly. If detected at the external electronic device 102, the magnetic signal with its direction changing may cause an effect (e.g., a waveform) similar to that of a magnetic field that is generated when a magnetic card corresponding to the card information associated with the received signal is swiped through a card reader of the electronic device 102. According to an embodiment, for example, payment-related information and a control signal that are received by the electronic device 102 in the form of the magnetic signal may be further transmitted to an external server 108 (e.g., a payment server) via the network 199.

The NFC communication module 260 may obtain a signal containing control information or payment information such as card information from the processor 120 and transmit the obtained signal to the external electronic device 102 via the NFC antenna 297-3. According to an embodiment, the NFC communication module 260 may receive such a signal transmitted from the external electronic device 102 via the NFC antenna 297-3.

The wireless charging module 270 may wirelessly transmit power to the external electronic device 102 (e.g., a cellular phone or wearable device) via the wireless charging antenna 297-5, or wirelessly receive power from the external electronic device 102 (e.g., a wireless charging device). The wireless charging module 270 may support one or more of various wireless charging schemes including, for example, a magnetic resonance scheme or a magnetic induction scheme.

According to an embodiment, some of the MST antenna 297-1, the NFC antenna 297-3, or the wireless charging antenna 297-5 may share at least part of their radiators. For example, the radiator of the MST antenna 297-1 may be used as the radiator of the NFC antenna 297-3 or the wireless charging antenna 297-5, or vice versa. In such a case, the antenna module 197 may include a switching circuit (not shown) adapted to selectively connect (e.g., close) or disconnect (e.g. open) at least part of the antennas 297-1, 297-3, or 297-5, for example, under the control of the wireless communication module 192 (e.g., the MST communication module 250 or the NFC communication module 260) or the power management module (e.g., the wireless charging module 270). For example, when the electronic device 101 uses a wireless charging function, the NFC communication module 260 or the wireless charging module 270 may control the switching circuit to temporarily disconnect at least one portion of the radiators shared by the NFC antenna 297-3 and the wireless charging antenna 297-5 from the NFC antenna 297-3 and to connect the at least one portion of the radiators with the wireless charging antenna 297-5.

According to an embodiment, at least one function of the MST communication module 250, the NFC communication module 260, or the wireless charging module 270 may be controlled by an external processor (e.g., the processor 120). According to an embodiment, at least one specified function (e.g., a payment function) of the MST communication module 250 or the NFC communication module 260 may be performed in a trusted execution environment (TEE). According to an embodiment, the TEE may form an execution environment in which, for example, at least some designated area of the memory 130 is allocated to be used for performing a function (e.g., a financial transaction or personal information-related function) that requires a relatively high level of security. In such a case, access to the at least some designated area of the memory 130 may be restrictively permitted, for example, according to an entity accessing thereto or an application being executed in the TEE.

According to various embodiments, an electronic device (e.g., the electronic device 101 of FIG. 1) may include a communication module (e.g., the communication module 190 of FIG. 1), at least one processor (e.g., the processor 120 of FIG. 1), and a memory (e.g., the memory 130 of FIG. 1) operatively connected to the at least one processor, wherein the memory 130 may store instructions that, when executed, cause the at least one processor 120 to: identify a state of a transport protocol; determine a communication state of the electronic device 101 based on the state of the transport protocol; and change a network based on the communication state.

In various embodiments, the state of the transport protocol may include a state of a transmission control protocol (TCP) socket used by an application executed in the electronic device.

In various embodiments, the communication state may be determined to be at least one of a good state, a poor state, a blocked state, and a sluggish state.

In various embodiments, the instructions may cause the at least one processor to: detect a TCP socket for connection establishment; identify whether a state of the TCP socket is changed from a connection establishment request state to a connection-established state; identify whether the sum of the number of transmission data packets of an application executed in the electronic device and the number of reception data packets of an application executed in the electronic device is greater than a threshold; identify whether the state of the TCP socket is a connection-release-waiting state and a time-waiting state; and, when the TCP socket for the connection establishment is detected, the state of the TCP socket is changed from the connection establishment request state to the connection-established state, the sum of the number of transmission data packets and the number of reception data packets is greater than the threshold, or the connection-release-waiting state and the time-waiting state are identified, determine the communication state to be the good state.

In various embodiments, the instructions may cause the at least one processor to: identify whether the communication state is a good state; detect a TCP socket for connection establishment; identify whether a state of the TCP socket is a connection establishment request state; identify whether the number of transmission data packets of an application executed in the electronic device is greater than the number of reception data packets of an application executed in the electronic device; and, when the communication state is not a good state, the TCP socket for the connection establishment is detected, the connection establishment request state is identified, and the number of transmission data packets is greater than the number of reception data packets, determine the communication state to be the poor state.

In various embodiments, the instructions may cause the at least one processor to: detect a TCP socket for performing retransmission; identify whether the number of transmission data packets of an application executed in the electronic device and the number of reception data packets of an application executed in the electronic device are smaller than a threshold; identify whether a link speed, a signal-to-noise ratio (SNR), and received signal strength indication (RSSI) of the electronic device are greater than corresponding thresholds; and, when the TCP socket for the retransmission is detected, the number of transmission data packets and the number of reception data packets are smaller than the thresholds, and the link speed, the SNR, and the RSSI are greater than the threshold, determine the communication state to be the blocked state.

In various embodiments, the blocked state may include a state in which an application executed in the electronic device is blocked by a network firewall.

In various embodiments, the instructions may cause the at least one processor to: detect a TCP socket for connection establishment; identify whether a state of the TCP socket is a new connection establishment request state; identify whether the sum of the number of transmission data packets of an application executed in the electronic device and the number of reception data packets of an application executed in the electronic device is smaller than a threshold; and, when the TCP socket for the connection establishment is detected; the new connection establishment request state is identified, the sum of the number of transmission data packets and the number of reception data packets is smaller than the threshold, determine the communication state to be the sluggish state.

In various embodiments, the instructions may cause the at least one processor to: display the communication state on the electronic device; and display a message including information relating to a network change on the electronic device based on the communication state.

In various embodiments, the instructions may cause the at least one processor to: identify at least one of a state of the transport protocol and a count of sockets of the transport protocol; determine whether a backhaul failure has occurred based on at least one of the identified state of the transport protocol and the identified count of sockets of the transport protocol; and control the backhaul failure based on the backhaul failure determination.

In various embodiments, the instructions may cause the at least one processor to: identify that a total count of sockets of the transport protocol is equal to or greater than a threshold; identify that a count of connection-established sockets of a transport protocol is maintained or reduced; and determine whether a backhaul failure has occurred based on a result of the identification.

In various embodiments, the instructions may cause the at least one processor to: identify that the number of transmission data packets of an application executed in the electronic device and the number of reception data packets of an application executed in the electronic device are smaller than or equal to corresponding thresholds; and determine whether a backhaul failure has occurred based on a result of the identification.

In various embodiments, the instructions may cause the at least one processor to: identify that a retransmission segment of the transport protocol is equal to or greater than a threshold; and determine whether a backhaul failure has occurred based on a result of the identification.

In various embodiments, the instructions may cause the at least one processor to: identify the occurrence of an error in a reception segment of the transport protocol; and determine whether a backhaul failure has occurred based on a result of the identification.

In various embodiments, the instructions may case the at least one processor to: display information relating to the backhaul failure; and display an indicator for changing a network, based on the backhaul failure.

In various embodiments, the instructions may cause the at least one processor to: identify an external device to which information relating to the backhaul failure is to be transmitted; and transmit the information relating to the backhaul failure to the identified external device.

Figure 3:
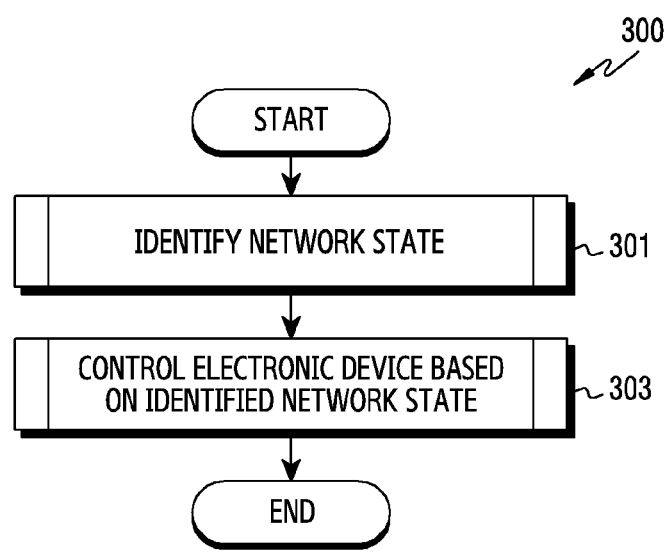
FIG. 3 illustrates a flowchart 300 of an electronic device according to various embodiments of the disclosure.

FIG. 3 illustrates a flowchart 300 of an electronic device according to various embodiments of the disclosure. In the following embodiment, the operations may be sequentially performed, but are not necessarily sequentially performed. For example, the sequential position of each operation may be changed, or at least two operations may be performed in parallel. The entity performing the operations illustrated in flowchart 300 may be understood to be the electronic device 101 or a component (e.g., a processor 120) of the electronic device 101.

Referring to FIG. 3, in operation 301, the electronic device (e.g., the processor 120 of FIG. 1) according to various embodiments may identify a network state. In an embodiment, the network state may include a communication state or a backhaul state of the electronic device 101. In an embodiment, the communication state of the electronic device 101 may include a poor state, a good state, a blocked state, and a sluggish state. The processor 120 may determine the above-described communication state of the electronic device 101 by identifying a state of a transport protocol (i.e., a state of a TCP socket). In an embodiment, when the electronic device 101 communicates (e.g., via Wi-Fi) via an external communication device (e.g., the AP), the backhaul state of the electronic device 101 may include a backhaul connection state in which the external communication device is connected to the Internet (e.g., cloud) or a backhaul connection failure state in which the external communication device is not connected to the Internet. In various embodiments, the backhaul connection failure may be referred to simply as "backhaul failure".

According to various embodiments, in operation 303, the processor 120 may control the electronic device based on the identified network state. For example, when the identified network state corresponds to one of the above-described communication states, the processor 120 may display the determined communication state on a display (e.g., the display device 160 of FIG. 1) of the electronic device 101. When the identified network state corresponds to a backhaul failure, the processor 120 may display the backhaul failure state on the display device 160, or may display a network change indicator on the display device 160 to enable a user to select whether to change to another network (e.g., a cellular network). In an embodiment, when the identified network state corresponds to a backhaul failure, the processor 120 may display the identified backhaul failure state on the display device 160, or may not display the same but may automatically change the network to another network. In an embodiment, the change to another network according to the backhaul failure may be provided as an option selectable by a user. For example, in the case in which the processor 120 identifies the backhaul failure, when the option indicating that the network may be changed to another network is activated by the user, the processor 120 may display the identified backhaul failure state on the display device 160, or may not display the same but may automatically change the network to another network. When the option is deactivated, the processor 120 may not automatically change the network to another network.

In various embodiments, a procedure and an example of determining the communication state of the electronic device based on the identification of the state of the transport protocol and changing the network based on the determined communication state will be described below with reference to FIGS. 4 to 15B.

Figure 4:
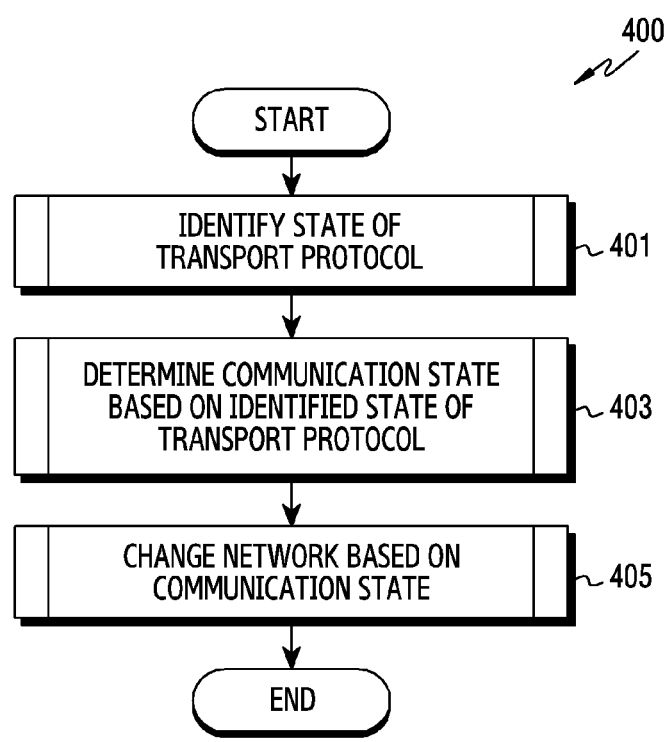
FIG. 4 illustrates a flowchart 400 of an electronic device for identifying a state of a transport protocol to determine a communication state according to various embodiments of the disclosure.

FIG. 4 illustrates a flowchart of an electronic device according to various embodiments of the disclosure.

In the following embodiment, the operations may be sequentially performed, but are not necessarily sequentially performed. For example, the sequential position of each operation may be changed, or at least two operations may be performed in parallel. Operations 401 and 403 of FIG. 4 are a part of operation 301 of FIG. 3, operation 405 of FIG. 4 is a part of operation 303 of FIG. 3, and the entity performing the operations illustrated in flowchart 400 may be understood to be the electronic device 101 or a component (e.g., a processor 120) of the electronic device 101.

Referring to FIG. 4, in operation 401, the processor 120 may identify a state of a transport protocol. According to an embodiment of the disclosure, the processor 120 may identify a state of a TCP socket. For example, in the case of connection-oriented communication supported by a TCP, preliminary preparation for communication between a client and a server may be performed before data communication is started. In the preliminary preparation procedure, the state of the TCP socket may be dynamically changed. For example, the state of the TCP socket may include a connection establishment request (SYN_SENT) state, a connection-established (ESTABLISHED) state, a connection release (FIN_WAIT) state, and the like. The processor 120 may identify that the state of the TCP socket is changed to one of the above-described states. The general operation of the change in the state of the TCP socket is shown as in FIG. 5.

Figure 6:
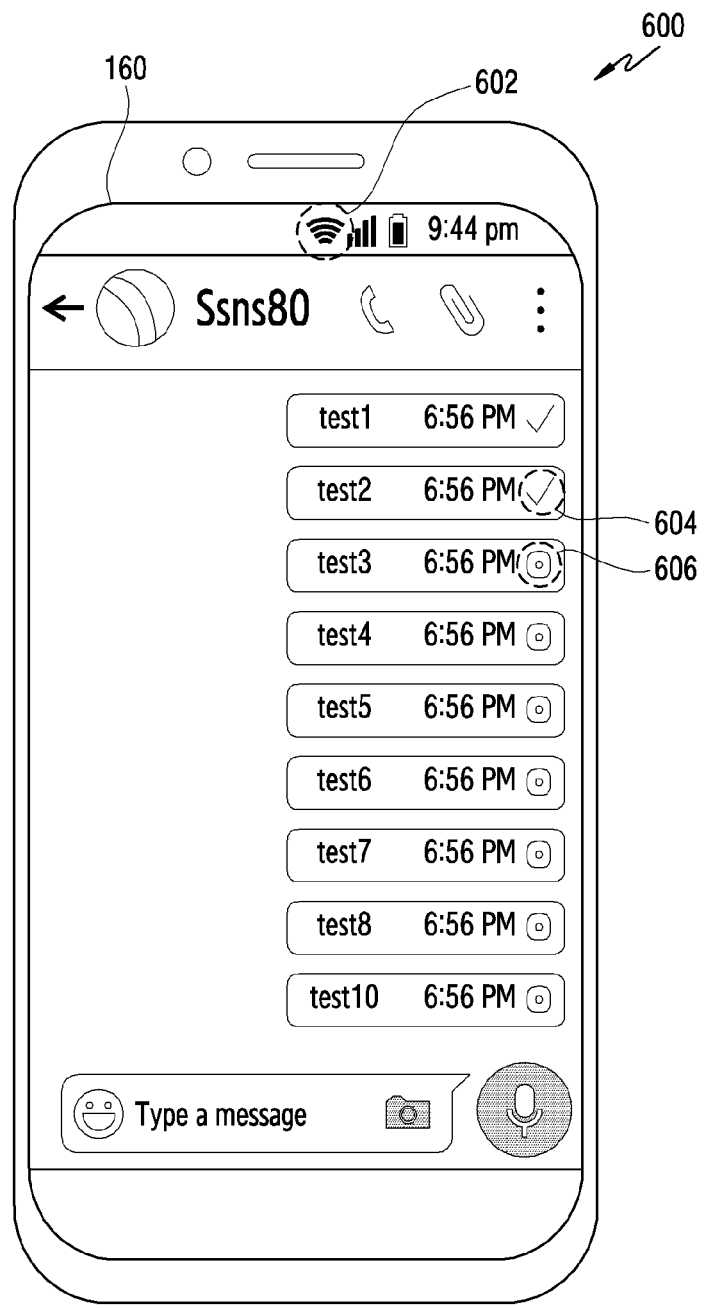
FIG. 6 illustrates an example 600 of an interface of an electronic device, the interface being displayed on the electronic device when a communication state is a blocked state according to various embodiments of the disclosure.

In operation 403, the processor 120 may determine a communication state based on the identified state of the transport protocol. For example, the processor 120 may identify the state of the TCP socket to thus determine the communication state of the electronic device 101. In various embodiments, the communication state may include a poor state, a good state, a blocked state, and a sluggish state. The communication states may be determined in consideration of reception signal strength, link speed, and the like, as well as the state of the TCP socket. Accordingly, the electronic device 101 may detect various communication states that are difficult to identify based only on physical channel characteristics. For example, in the case where the communication state is a blocked state, a physical channel of a network currently being used may be excellent, but communication may not be performed as shown in FIG. 6.

In operation 405, the processor 120 may change a network based on the communication state. For example, when the determined communication state is a blocked state, the processor 120 may change the network from a Wi-Fi network to a cellular network. In various embodiments, before changing the network, the processor 120 may perform control to display the determined communication state together with information on whether to change the network on the display device 160 of the electronic device 101. In various embodiments, the processor 120 may change the network based on input by a user or with reference to a specific threshold. As described above, by measuring the communication state to change the network, the electronic device 101 may communicate with external electronic devices (e.g., a server 108 and an electronic device 104) in a changed network environment.

In various embodiments, the processor 120 may: identify the state of the transport protocol; determine the communication state of the electronic device 101 based on the identified state of the transport protocol; and change the network based on the determined communication state. In an embodiment, the state of the transport protocol may include the state of the TCP socket used by an application executed in the electronic device 101. In an embodiment, the state of the electronic device 101 may be determined to be at least one of a good state, a poor state, a blocked state, and a sluggish state.

Figure 5:
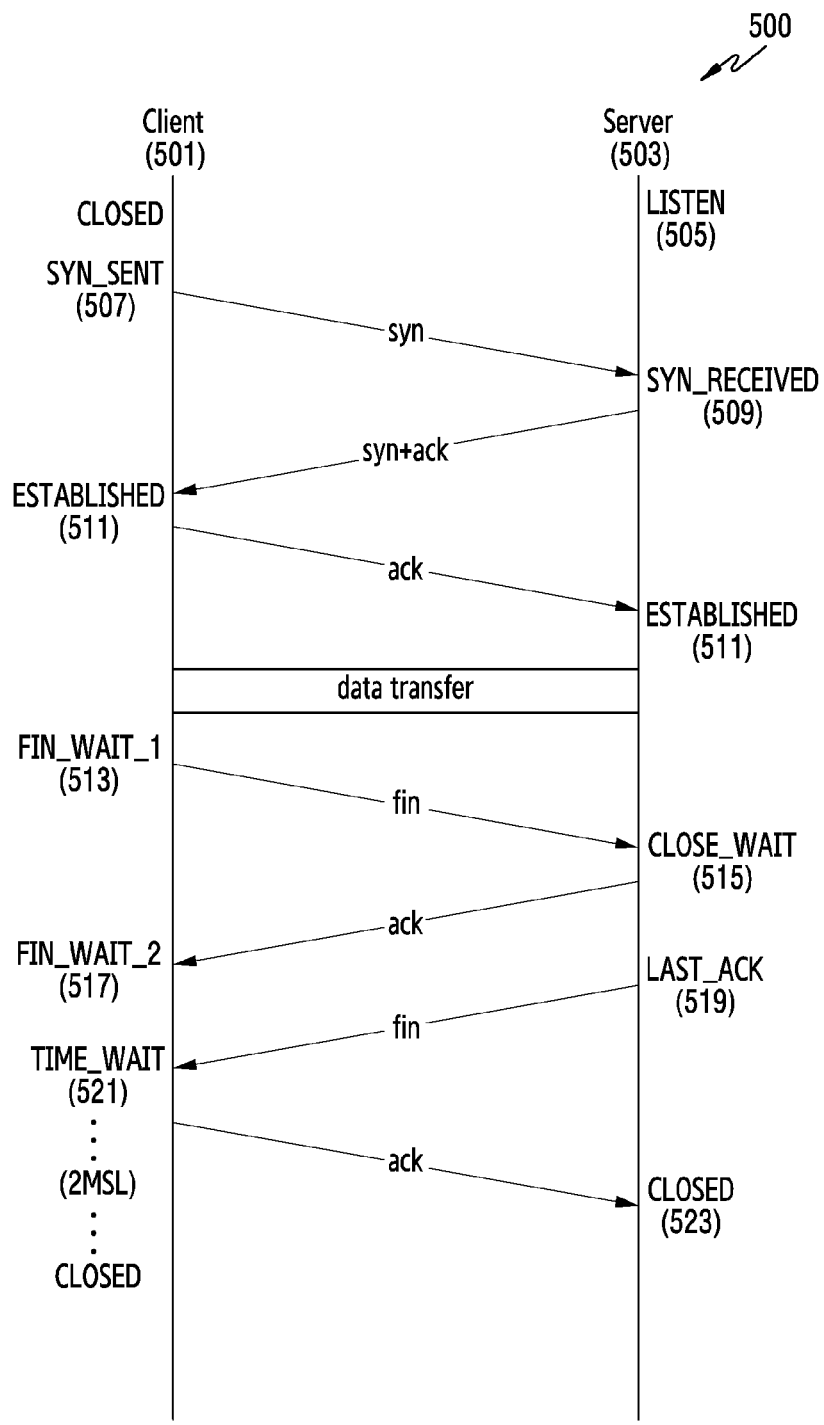
FIG. 5 illustrates a sequence diagram 500 illustrating data transmission using a transmission control protocol (TCP) according to various embodiments of the disclosure.

FIG. 5 illustrates a sequence diagram illustrating data transmission using TCP according to various embodiments of the disclosure. In various embodiments, an electronic device may identify a state of a TCP socket to thereby detect a communication state. As shown in FIG. 5, TCP connection may be established by sequentially passing through multiple states. The state of the TCP socket may be changed from a current state to a subsequent state in response to a specific event. For example, in a detection (LISTEN) state 505, a server 503 (e.g., the server 108) may wait for a TCP connection establishment request from a client 501 (e.g., the electronic device 101). In a connection establishment request (SYN_SENT) state 507, the client 501 may transmit a signal (e.g., a syn packet) requesting connection establishment, to a server 503, and wait until the connection establishment request is matched in the server 503. For example, the client 501 may wait for an acknowledgement response (e.g., a syn+ack packet) to the connection establishment request from the server 503. The server 503 may maintain the detection (LISTEN) state 505 until receiving a signal (e.g., the syn packet) requesting connection establishment from the client 501. When the server 503 receives the signal requesting connection establishment, the server 503 may change the state to a connection establishment request received (SYN_RECEIVED) state 509. In the connection establishment request received (SYN_RECEIVED) state 509, the server 503 may transmit a signal including an acknowledgement response (e.g., the syn+ack packet) to the connection establishment request to the client 501 and wait for the acknowledgment response to the connection establishment. The client 501 may change the state to a connection-established (ESTABLISHED) state 511 upon receiving the acknowledgment response (e.g., the syn+ack packet) to the connection establishment request from the server 503. In the connection-established (ESTABLISHED) state 511, the client 501 may transmit an acknowledgment response (e.g., an ack packet) to the connection establishment to the server 503, and the server 503 may be in the connection-established state 511 after receiving the acknowledgement response from the client 501. In the connection-established state, the client 501 may open the connection, and may transmit and receive data to the server 503. In various embodiments, the connection-established state may indicate a normal state in which data can be transmitted to the client 501 (e.g., the electronic device 101). In a first connection release (FIN_WAIT_1) state 513, the client 501 may transmit a connection release signal (e.g., a fin packet) to the server 503. After transmitting the connection release signal, the client 501 may wait for an acknowledgment response to the connection release signal, or may wait for an acknowledgment response to a previously transmitted connection release request from the server 503. When receiving the connection release signal (e.g., the fin packet), the server 503 may change to a connection-release-waiting (CLOSE_WAIT) state 515. The server 503 may transmit an acknowledgement response (e.g., the ack packet) to the connection release signal, received from the client 501, to the client 501. Here, the client 501 may include a local user. Although not shown in FIG. 5, a state in which the client 501 waits for the acknowledgement response to the connection release signal from the server 503 may be defined as a closing (CLOSING) state. When receiving the acknowledgement response to the connection release signal from the server 503, the client 501 may change to a second connection release (FIN_WAIT_2) state 517. In a last acknowledgment response (LAST_ACK) state 519, the server 503 may transmit a signal (e.g., the fin packet) indicating the connection release of the server 503 to the client 501, and may wait for an acknowledgement response thereto. When receiving the signal (e.g., the fin packet) indicating the connection release, the client 501 may be changed to a time-waiting (TIME_WAIT) state 521. In the time-waiting (TIME_WAIT) state 521, the client 501 may transmit, to the server 503, an acknowledgment response signal (e.g., the ack packet) to the signal indicating the connection release of the server 503. Further, the client 501 may wait a sufficient time to identify that the server 503 has received the acknowledgement response to the request for the connection release. In various embodiments, the client 501 may maintain the time-waiting state for a maximum segment lifetime (2MSL) (e.g., about 1 minute to 4 minutes). When receiving the acknowledgement response to the connection release from the client 501, the server 503 may change to a connection closed (CLOSED) state 523. In the connection closed (CLOSED) state, the connection between the client and the server may not exist. In various embodiments, since the TCP is a protocol involving the acknowledgement response, the electronic device may classify the above-described state of the TCP socket into a temporary state or a permanent state. In various embodiments, the electronic device 101 may consider the state of the TCP socket that waits for the acknowledgement response from a remote device (e.g., the server 108) to be a temporary state. For example, the connection establishment request state 507, the first connection release state 513, the closing state, and the last acknowledgement response state 519 may be considered to be temporary states. In various embodiments, the electronic device 101 may consider states of the TCP socket other than temporary states to be permanent states. The electronic device 101 may identify the above-described various states of the TCP socket, and may determine the communication state based thereon.

FIG. 6 illustrates an example of an interface of an electronic device 101, the interface being displayed on the electronic device 101 when a communication state is a blocked state according to various embodiments of the disclosure. The interface of the electronic device 101 may include a display device 160. Referring to FIG. 6, in various embodiments, even if the Wi-Fi signal quality is good and the state of the backhaul network is good, a message of an SNS application may not be sent due to a network firewall. In various embodiments, the electronic device 101 may display various message-sending indicators indicating a message-sending state of a messenger application on the display device 160. For example, in FIG. 6, a first message-sending indicator 604 may indicate a message that has been normally sent, and a second message-sending indicator 606 may indicate a message that failed to be normally sent and is pending. Since a Wi-Fi state indicator 602 indicates that the Wi-Fi signal quality is good, a user may find that it is difficult to determine the cause of the unsent message. The electronic device 101 may use the state of the TCP socket in order to detect the blocked state.

In an embodiment, the processor 120 may determine that the greater the number of connection establishment sockets, the greater the number of reception packets. In an embodiment, when the state of the TCP socket is changed, the processor 120 may determine the communication state of the electronic device 101 to be a good state. In an embodiment, when the state of the TCP socket is stuck in a specific state, the processor 120 may determine the communication state of the electronic device 101 to be a poor state.

In various embodiments, in order to indicate a specific problem state occurring in a network, a red flag technique may be used. For example, whenever the specific problem state is detected, the electronic device may accumulate red flags. The electronic device may analyze cumulative red flags (CRFs) to identify the state of the transport protocol. The accumulation of the red flags may be defined as shown in FIGS. 7A and 7B.

Figure 7A:
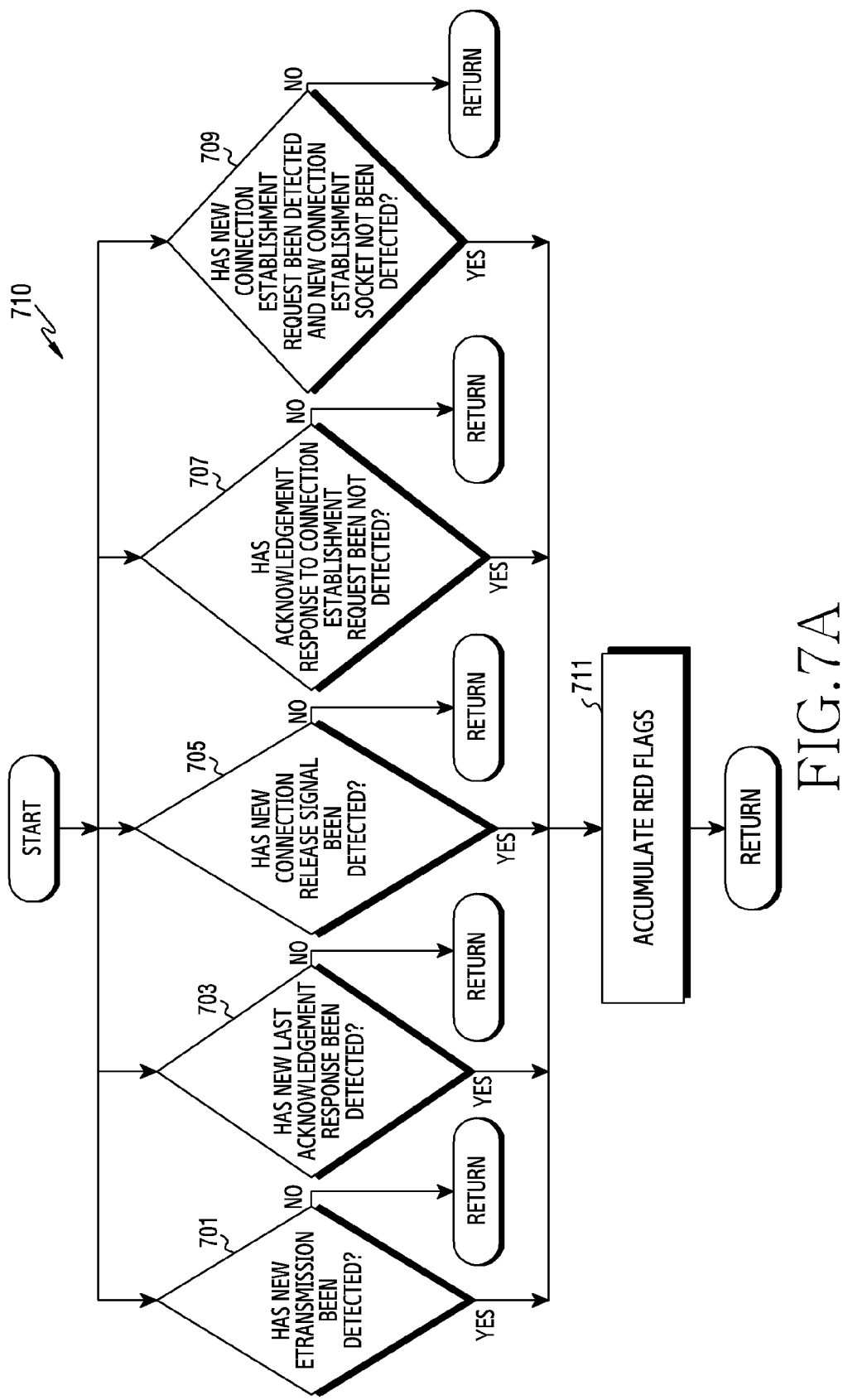
FIG. 7A illustrates a flowchart 710 illustrating accumulation of red flags according to various embodiments of the disclosure.
Figure 7B:
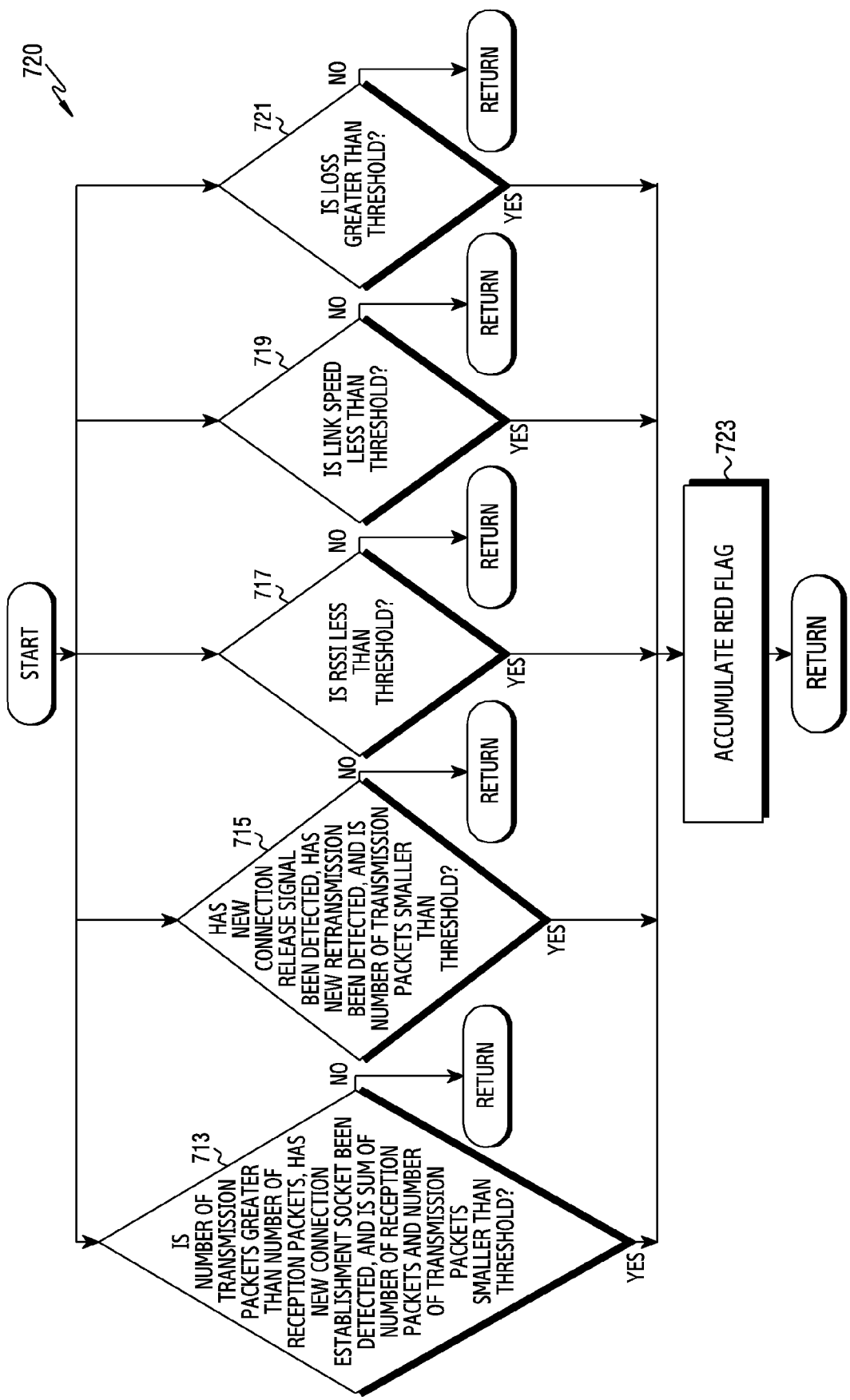
FIG. 7B illustrates a flowchart 720 illustrating accumulation of red flags according to various embodiments of the disclosure.

FIG. 7A illustrates a flowchart illustrating accumulation of red flags according to various embodiments on the disclosure. In the following embodiment, the operations may be sequentially performed, but are not necessarily sequentially performed. For example, the sequential position of each operation may be changed, or at least two operations may be performed in parallel. FIG. 7A is a part of operation 401 of FIG. 4, and the entity performing the operations illustrated in flowchart 710 may be understood to be the electronic device 101 or a component (e.g., a processor 120) of the electronic device 101.

In various embodiments, the processor 120 may use a cumulative red flag scheme to detect a problem with a signal in a network. In various embodiments, the processor 120 may consider a red flag as an identifier indicating a certain problem, and may record and accumulate red flags whenever the problem occurs. The scheme may be indicated as a cumulative red flag scheme.

Referring to FIG. 7A, in operation 701, the processor 120 may identify whether new retransmission is detected. For example, the processor 120 may identify whether a TCP socket experiencing retransmission is detected. When the new retransmission is detected, the processor 120 may accumulate the red flags.

In operation 703, the processor 120 may identify whether a new last acknowledgment response is detected. For example, the processor 120 may identify whether the state of the TCP socket is newly detected as the last acknowledgement response state. When the new last acknowledgement response is detected, the processor 120 may accumulate the red flags.

In operation 705, the processor 120 may identify whether a new connection release signal is detected. For example, the processor 120 may identify whether the state of the TCP socket is newly detected as the connection release state. When the new connection release signal is detected, the processor 120 may accumulate the red flags.

In operation 707, the processor 120 may identify non-detection of an acknowledgement response to a connection establishment request. For example, when the state of the TCP socket is the connection establishment request state, the processor 120 may identify whether there has been an acknowledgement response to the connection establishment request from the server. When an acknowledgement response to the connection establishment request is not detected, the processor 120 may accumulate the red flags.

In operation 709, the processor 120 may identify the case where a new connection establishment request is detected but a new connection establishment socket is not detected. For example, the processor 120 may identify whether the state of the TCP socket is newly detected as the connection establishment request state and failure to detect a new connection establishment socket. When a new connection establishment request is detected but a new connection establishment socket is not detected, the processor 120 may accumulate the red flags.

In operation 711, the processor 120 may accumulate the red flags. According to various embodiments, when at least one condition among: the case in which a new retransmission is detected; the case in which a new last acknowledgement response is detected; the case in which a new connection release signal is detected; the case in which no acknowledgement response to the connection establishment request is detected; or the case in which a new connection establishment request is detected but no new connection establishment socket is detected is satisfied, the processor 120 may accumulate the red flags. In various embodiments, the results obtained from operations 701 to 709 may not affect each other. For example, when the processor 120 detects a new retransmission in operation 701, the red flags may be accumulated in operation 711, regardless of whether a new last acknowledgment response is detected or whether a new connection release signal is detected. In various embodiments, the processor 120 may sequentially perform operations 701 to 709, or may separately perform each operation, regardless of the order thereof.

FIG. 7B illustrates a flowchart illustrating accumulation of red flags according to various embodiments of the disclosure. In the following embodiment, the operations may be sequentially performed, but are not necessarily sequentially performed. For example, the sequential position of each operation may be changed, or at least two operations may be performed in parallel. FIG. 7B is a part of operation 401 of FIG. 4, and the entity performing the operations illustrated in flowchart 720 may be understood to be the electronic device 101 or a component (e.g., a processor 120) of the electronic device 101.

Referring to FIG. 7B, in operation 713, the processor 120 may determine whether the number of transmission packets is greater than the number of reception packets, whether a new connection establishment socket is detected, and whether the sum of the number of reception packets and the number of transmission packets is smaller than a threshold. When the above conditions are satisfied, the processor 120 may accumulate the red flags in operation 723.

In operation 715, the processor 120 may determine whether a new connection release signal is detected, whether a new retransmission is detected, and whether the number of transmission packets is smaller than a threshold. For example, the threshold may be 10 packets. When a new connection release signal is detected, a new retransmission is detected, and the number of transmission packets is smaller than the threshold, the processor 120 may accumulate the red flags in operation 723.

In operation 717, the processor 120 may determine whether RSSI is less than a threshold. For example, the processor 120 may determine whether the RSSI is less than a specific threshold. When the RSSI is less than the specific threshold, the processor 120 may accumulate the red flags in operation 723.

In operation 719, the processor 120 may determine whether a link speed is less than a threshold. For example, the processor 120 may determine whether the link speed of the network of the electronic device 101 is less than a specific threshold. When the link speed of the network is less than the threshold, the processor 120 may accumulate the red flags in operation 723.

In operation 721, the processor 120 may determine whether a loss is greater than a threshold. For example, the processor 120 may determine whether a loss at the time of data transmission and reception is greater than a specific threshold. When the loss is greater than the threshold, the processor 120 may accumulate the red flags in operation 723.

In operation 723, the processor 120 may accumulate the red flags. According to various embodiments, when at least one condition among: the case in which the number of transmission packets is greater than the number of reception packets, a new connection establishment socket is detected, and the sum of the number of reception packets and the number of transmission packets is smaller than the threshold; the case in which a new connection release signal is detected, a new retransmission is detected, and the number of transmission packets is smaller than the threshold; the case in which the RSSI is less than the threshold; the case in which the link speed is less than the threshold; or the case in which the loss is greater than the threshold is satisfied, the processor 120 may accumulate the red flags. In various embodiments, the results obtained from operations 713 to 721 may not affect each other. For example, when, in operation 713, the number of transmission packets is greater than the number of reception packets, a new connection establishment socket is detected, and the sum of the number of reception packets and the number of transmission packets is smaller than the threshold, the red flags may be accumulated in operation 723, regardless of whether the RSSI is less than the threshold or whether the link speed is less than the threshold. In various embodiments, the processor 120 may sequentially perform operations 713 to 721, or may separately perform each operation regardless of the order thereof.

In various embodiments, when the red flags are accumulated and the number of red flags is greater than a designated threshold, the processor 120 may notify a user of the poor state of the network, and change the network based thereon.

As described with reference to FIGS. 4 to 7B, the electronic device according to various embodiments of the disclosure may determine the communication state based on the state of the TCP socket. According to an embodiment, the communication state may be determined to be one of a good state, a poor state, a blocked state, and a sluggish state. Hereinafter, more detailed embodiments for determining each communication state will be described.

Figure 8:
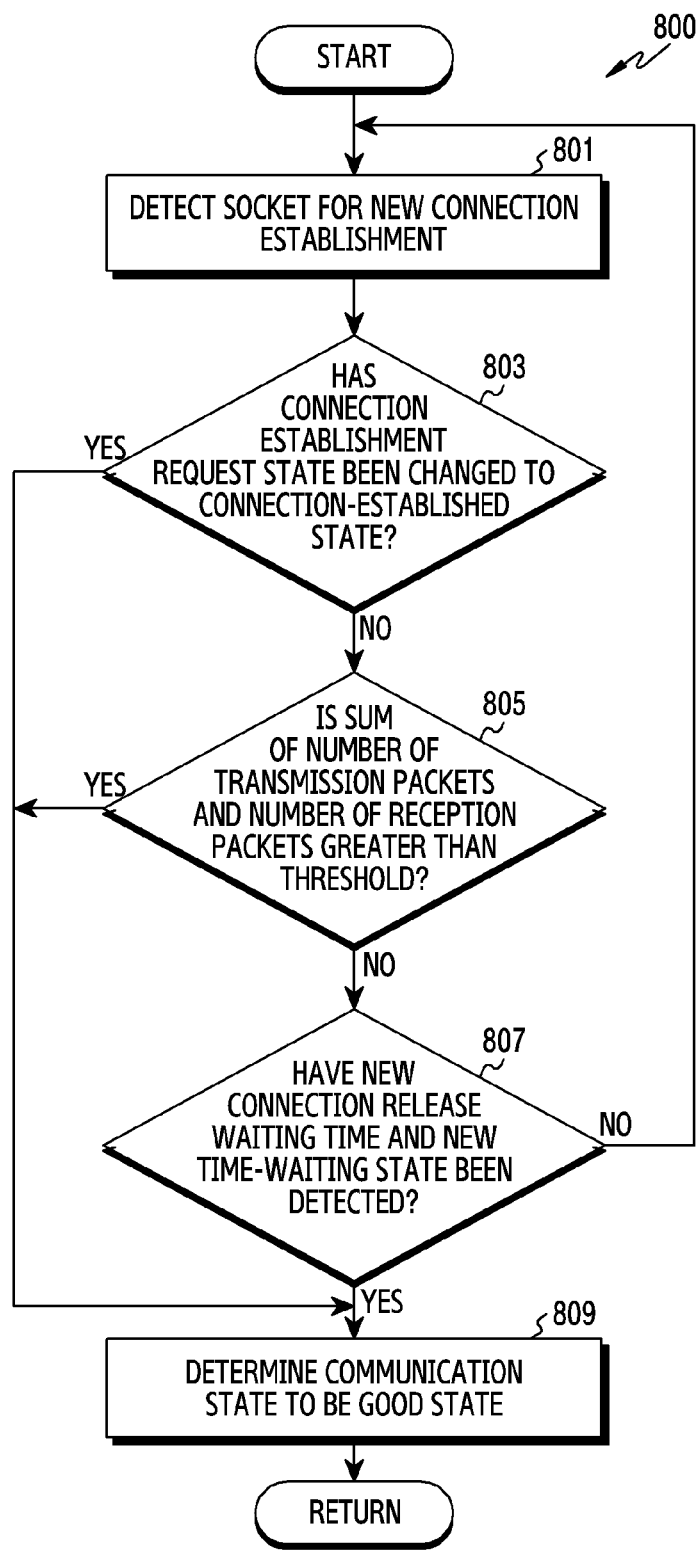
FIG. 8 illustrates a flowchart 800 for determining a good state according to various embodiments of the disclosure.

FIG. 8 illustrates a flowchart for determining a good state according to various embodiments of the disclosure. In the following embodiment, the operations may be sequentially performed, but are not necessarily sequentially performed. For example, the sequential position of each operation may be changed, or at least two operations may be performed in parallel. FIG. 8 is a part of operation 403 of FIG. 4, and the entity performing the operations illustrated in flowchart 800 may be understood to be the electronic device 101 or a component (e.g., a processor 120) of the electronic device 101.

Referring to FIG. 8, in operation 801, the processor 120 may detect a socket for new connection establishment. In various embodiments, the processor 120 may newly detect a socket for establishment of a connection between a client and a server. After detecting the socket for the connection establishment, the processor 120 may identify the following change in a state of a TCP socket. For example, for various reasons, the state of the TCP socket may be stuck in the above-described temporary state. The processor 120 may track the state of the TCP socket in order to escape from the stuck state.

In operation 803, the processor 120 may identify whether the connection establishment request state is changed to the connection-established state. For example, after transmitting and receiving the acknowledgement response to and from the server, the processor 120 may identify whether the state of the TCP socket of the client is changed from the connection establishment request state to the connection-established state. When the state of the TCP socket is changed to the connection-established state, the processor 120 may determine the communication state of the electronic device 101 to be a good state in operation 809.

In operation 805, the processor 120 may determine whether the sum of the number of transmission packets and the number of reception packets is greater than a threshold. For example, when the state of the TCP socket is not changed to the connection-established state, the processor 120 may determine whether the sum of the number of transmission packets and the number of reception packets is greater than the threshold. For example, the processor 120 may compare the sum of the number of transmission data packets transmitted to an external device by the electronic device 101 and the number of reception data packets received from the external device by the electronic device 101 with a specific threshold. When the sum of the number of transmission packets and the number of reception packets is greater than the specific threshold, the processor 120 may determine the communication state of the electronic device 101 to be a good state.

In operation 807, the processor 120 may identify whether a new connection-release-waiting state and a new time-waiting state are detected. For example, when the sum of the number of transmission packets and the number of reception packets is smaller than a specific threshold, the processor 120 may identify whether a new connection-release-waiting state and a new time-waiting state are detected. For example, when the network is normally connected and enables normal reception of a packet, the processor 120 may detect the connection-release-waiting state and the time-waiting state. When a new connection-release-waiting state and a new time-waiting state are detected, the processor 120 may determine the communication state of the electronic device 101 to be a good state. When a new connection release waiting time and a new time-waiting state are not detected, the processor 120 may again perform an operation of detecting a new connection establishment socket.

In operation 809, the processor 120 may determine the communication state to be a good state. For example, when the condition in each of operations 701 and 707 is satisfied, the processor 120 may determine the communication state of the electronic device 101 to be the good state. In various embodiments, the good state may indicate that a user experiences no problem in performing communication. In various embodiments, the processor 120 may identify whether a certain state of the TCP socket among the multiple states of the TCP socket is the good state, and update a list of TCP socket states that are good states in order to prevent unnecessary retransmission from occurring. For example, when a connection establishment request state is the good state, the processor 120 may update a list of sockets named "goodAreaSYN". When retransmission is established in the good state, the processor 120 may update a list of sockets named "goodAreaRetrans". When a first connection release state is the good state, the processor 120 may update a list of sockets named "goodAreaFin". When a last acknowledgement response state is the good state, the processor 120 may update a list of sockets named "goodAreaLastAck". When a closing state is the good state, the processor 120 may update a list of sockets named "goodAreaClosing". According to the above-described operation, the processor 120 may determine the communication state of the electronic device 101 to be the good state.

In various embodiments, the processor 120 may: detect the TCP socket for connection establishment; identify whether the detected state of the TCP socket is changed from the connection establishment request state to the connection-established state; identify whether the sum of the number of transmission data packets of an application executed in the electronic device 101 and the number of reception data packets of an application executed in the electronic device 101 is greater than the threshold; identify whether the state of the TCP socket is the connection-release-waiting state or the time-waiting state; and determine the communication state of the electronic device 101 to be the good state when the TCP socket for the connection establishment is detected, the state of the TCP socket is changed from the connection establishment request state to the connection-established state, the sum of the number of transmission data packets and the number of reception data packets is greater than the threshold, or the connection-release-waiting state and the time-waiting state are detected.

Figure 9:
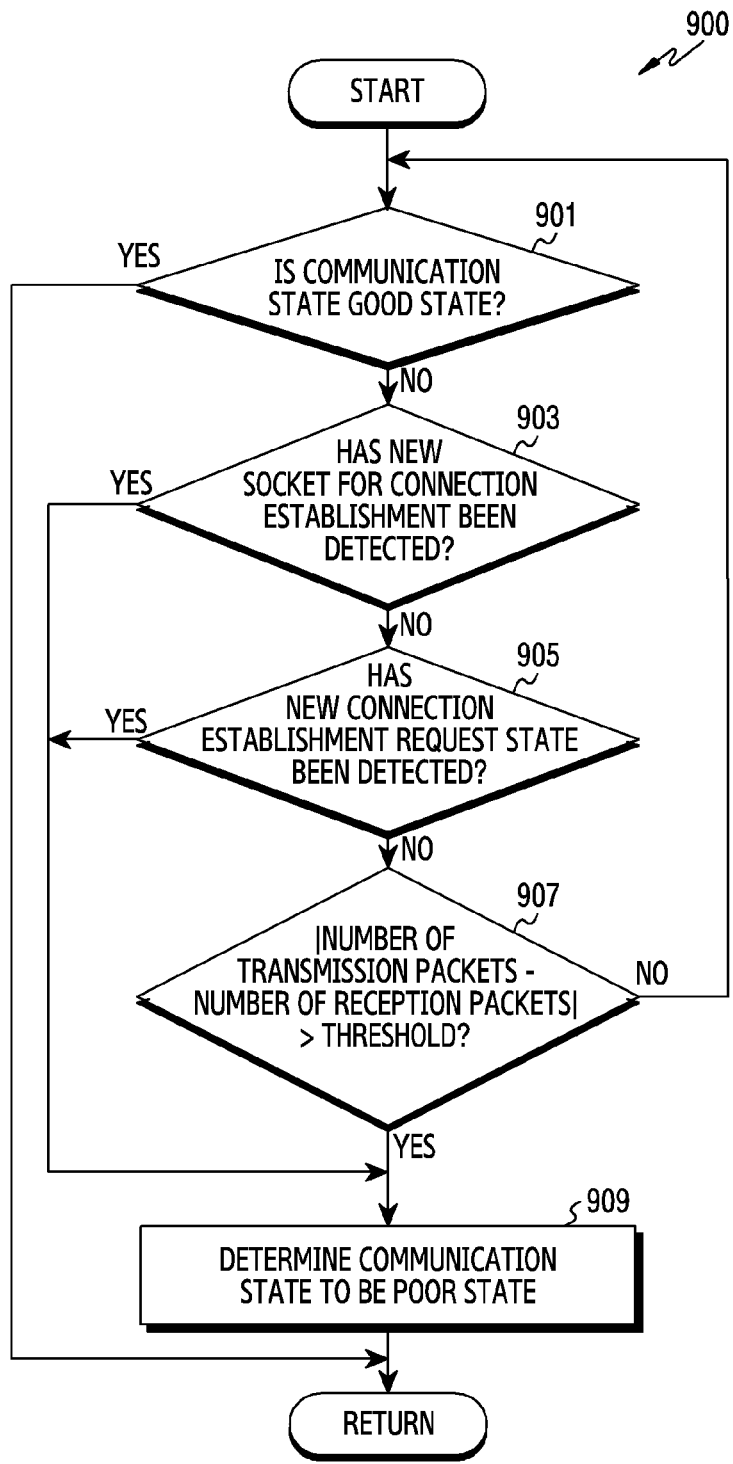
FIG. 9 illustrates a flowchart 900 for determining a poor state according to various embodiments of the disclosure.

FIG. 9 illustrates a flowchart for determining a poor state according to various embodiments of the disclosure. In the following embodiment, the operations may be sequentially performed, but are not necessarily sequentially performed. For example, the sequential position of each operation may be changed, or at least two operations may be performed in parallel. FIG. 9 is a part of operation 403 of FIG. 4, and the entity performing the operations illustrated in flowchart 900 may be understood to be the electronic device 101 or a component (e.g., a processor 120) of the electronic device 101.

Referring to FIG. 9, in operation 901, the processor 120 of the electronic device 101 may identify whether a communication state is a good state. For example, before determining the communication state to be a poor state, the processor 120 may identify whether the communication state of the electronic device 101 is the above-described good state. Here, the good state may include the case in which the sum of the number of transmission packets and the number of reception packets is greater than the threshold. When the communication state is not the good state, the processor 120 may perform operations 903 to 909 below.

In operation 903, the processor 120 may identify whether a socket for new connection establishment is detected. In various embodiments, the processor 120 may newly detect a socket for establishment of a connection between a client (e.g., the electronic device 101) and a server (e.g., the server 108). When the socket for the connection establishment is newly detected, the processor 120 may determine the communication state of the electronic device 101 to be the poor state.

In operation 905, the processor 120 may identify whether a new connection establishment request state is detected. For example, when a socket for new connection establishment is not detected, the processor 120 may identify whether the new connection establishment request state is detected. For example, when a socket for connection establishment is not newly detected but a new connection establishment request state is detected, the processor 120 may determine the communication state of the electronic device 101 to be the poor state.

In operation 907, the processor 120 may determine whether the difference between the number of transmission packets and the number of reception packets is greater than a threshold. For example, when the new connection establishment request state is not detected, the processor 120 may determine whether the difference between the number of transmission data packets and the number of reception data packets is greater than an arbitrary threshold. For example, when the communication state is not the good state in operation 901, the socket for the new connection establishment is not detected in operation 903, and a new connection establishment request state is not detected and the difference between the number of transmission data packets and the number of reception data packets is greater than the threshold in operation 905, the processor 120 may determine the communication state of the electronic device 101 to be the poor state. When the difference between the number of transmission packets and the number of reception packets is not greater than the threshold, the processor 120 may again perform an operation of determining whether the communication is a good state. Each of operations 903 to 907 is an independent operation, and the processor 120 may sequentially perform the operations or may perform the operations without regard to the order thereof.

In operation 909, the processor 120 may determine the communication state to be the poor state. For example, when a condition in each of operations 903 to 907 is satisfied, the processor 120 may determine the communication state of the electronic device 101 to be the poor state according to the above-described operation.

In various embodiments, the processor 120 may: identify whether the communication state of the electronic device 101 is the good state; detect the TCP socket for connection establishment; identify whether the state of the TCP socket is the connection establishment request state; identify whether the number of transmission data packets of an application executed in the electronic device 101 is greater than the number of reception data packets of an application executed in the electronic device 101; and determine the communication state of the electronic device 101 to be the poor state when the communication state of the electronic device 101 is not the good state, the TCP socket for the connection establishment is detected, the connection establishment request state is identified, or the number of transmission data packets is greater than the number of reception data packets.

Figure 10:
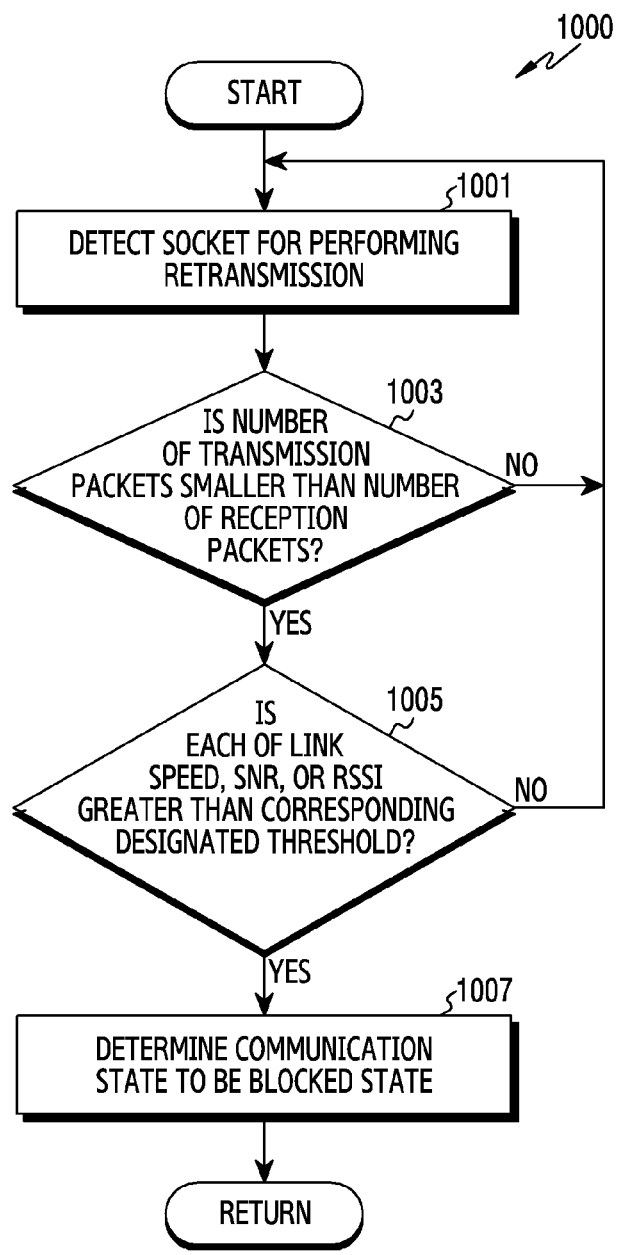
FIG. 10 illustrates a flowchart 1000 for determining a blocked state according to various embodiments of the disclosure.

FIG. 10 illustrates a flowchart for determining a blocked state according to various embodiments of the disclosure. In the following embodiment, the operations may be sequentially performed, but are not necessarily sequentially performed. For example, the sequential position of each operation may be changed, or at least two operations may be performed in parallel. FIG. 10 is a part of operation 403 of FIG. 4, and the entity performing the operations illustrated in flowchart 1000 may be understood to be the electronic device 101 or a component (e.g., a processor 120) of the electronic device 101.

Referring to FIG. 10, in operation 1001, the processor 120 may detect a socket for performing retransmission. For example, the processor 120 may detect a socket for performing retransmission. In various embodiments, as the number of detected sockets increases, the number of send queues may increase.

In operation 1003, the processor 120 may determine whether the number of transmission packets and the number of reception packets are smaller than a threshold. For example, the processor 120 may determine whether the number of transmission packets and the number of reception packets are smaller than the threshold during a time when a TCP times out. The timeout of the TCP may occur when the electronic device 101 transmits data to external electronic devices (e.g., the server 108 and the electronic device 104), sets a timer, and then fails to receive acknowledgement responses from the external electronic devices before the timer ends. In an embodiment, even though the Wi-Fi network environment is good, the processor 120 may determine whether the number of data packets transmitted and received by an application is smaller than the threshold. When the number of transmission packets and the number of reception packets are not smaller than the threshold, the processor 120 may again perform an operation of detecting a socket for performing retransmission.

In operation 1005, the processor 120 may determine whether each of a link speed, a signal-to-noise ratio (SNR), or RSSI is greater than a corresponding designated threshold. For example, when the number of transmission packets and the number of reception packets are smaller than the threshold, the processor 120 may compare the link speed, the SNR, or the RSSI with a corresponding designated threshold to determine whether the link speed, the SNR, or the RSSI is greater than the corresponding designated threshold, even though an application is blocked by a network firewall. When the link speed, the SNR, or the RSSI is not greater than the corresponding designated threshold, the processor 120 may again perform an operation of detecting a socket for performing retransmission.

In operation 1007, the processor 120 may determine the communication state to be the blocked state. For example, when the link speed, the SNR, or the RSSI is greater than the corresponding designated threshold, and the number of transmission packets and the number of reception packets are smaller than the threshold, the processor 120 may determine the communication state to be the blocked state. Each of operations 1001 to 1005 is an independent operation, and the processor 120 may sequentially perform each operation, or may perform each operation regardless of the order thereof. In various embodiments, the blocked state may be a state in which a user-relevant application is blocked by a firewall. In various embodiments, the processor 120 may maintain a send (e.g., outgoing, send, or transmit) data queue in terms of kernel memory usage by the socket. When the size of the send data queue increases as the number of sockets being used of retransmission increases, a wireless connection state between the electronic device 101 and a Wi-Fi access point (AP) may be considered to be good. When the wireless connection state is good, but the number of transmission data packets of an application and the number of reception data packets of an application are small, the processor 120 may determine that a specific application is blocked by the firewall. According to the above-described operations, the processor 120 may determine the communication state of the electronic device 101 to be the blocked state.

In various embodiments, the processor 120 may: detect the TCP socket for performing retransmission; identify whether the number of transmission data packets of an application executed in the electronic device 101 and the number of reception data packets of an application executed in the electronic device 101 are smaller than the threshold; identify whether the link speed, the signal-to-noise-ratio (SNR), and the received signal strength indication (RSSI) of the electronic device 101 are greater than corresponding thresholds; and determine the communication state of the electronic device 101 to be the blocked state when the TCP socket for performing retransmission is detected, the number of transmission data packets and the number of reception data packets are smaller than the threshold, and the link speed, the SNR, and the RSSI are greater than the corresponding thresholds. In an embodiment, the blocked state may include a state in which an application executed in the electronic device 101 is blocked by a network firewall.

Figure 11:
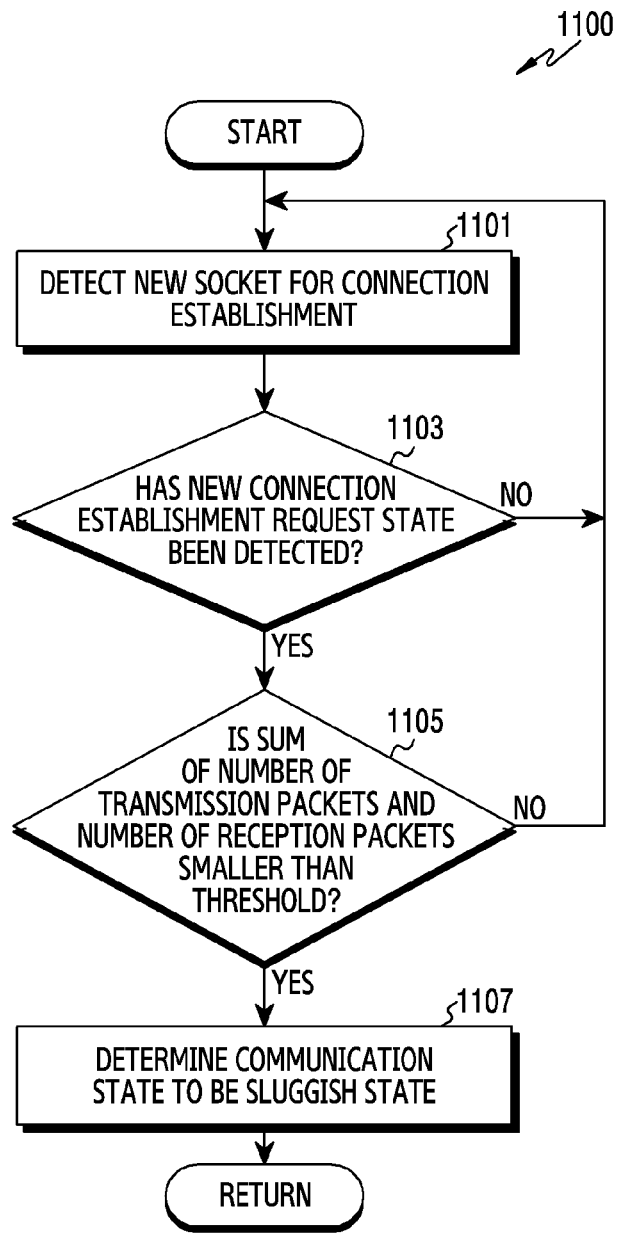
FIG. 11 illustrates a flowchart 1100 for determining a sluggish state according to various embodiments of the disclosure.

FIG. 11 illustrates a flowchart for determining a sluggish state according to various embodiments of the disclosure. In the following embodiment, the operations may be sequentially performed, but are not necessarily sequentially performed. For example, the sequential position of each operation may be changed, or at least two operations may be performed in parallel. FIG. 11 is a part of operation 403 of FIG. 4, and the entity performing the operations illustrated in flowchart 1100 may be understood to be the electronic device 101 or a component (e.g., a processor 120) of the electronic device 101.

Referring to FIG. 11, in operation 1101, the processor 120 may detect a socket for new connection establishment. In various embodiments, the processor 120 may newly detect a socket for establishment of a connection between a client (e.g., the electronic device 101) and a server (e.g., the server 108).

In operation 1103, the processor 120 may identify whether a new connection establishment request state is detected. For example, when the socket for the new connection establishment is detected, the processor 120 may identify whether a new connection establishment request state is detected. When no new connection establishment request state is detected, the processor 120 may again perform an operation of detecting a socket for new connection establishment.

In operation 1105, the processor 120 may determine whether the sum of the number of transmission packets and the number of reception packets is smaller than a threshold. For example, when a new connection establishment request state is detected, the processor 120 may determine whether the sum of the number of transmission data packets and the number of reception data packets is smaller than a threshold. In an embodiment, the processor 120 may determine whether the sum of the number of transmission packets and the number of reception packets is smaller than the threshold during a time when a TCP times out. When the sum of the number of transmission packets and the number of reception packets is not smaller than a specific threshold, the processor 120 may again detect a socket for new connection establishment. Each of operations 1101 to 1105 is an independent operation, and the processor 120 may sequentially perform each operation, or may perform the operations regardless of the order thereof.

In operation 1107, the processor 120 may determine the communication state to be the sluggish state. For example, when the new connection establishment request state is detected and the sum of the number of transmission packets and the number of reception packets is smaller than the threshold, the processor 120 may determine the communication state of the electronic device 101 to be the sluggish state. In various embodiments, the sluggish state may indicate the case in which a data download speed in a specific application is slow due to policies of the Wi-Fi access point. According to the above-described operations, the processor 120 may determine the communication state of the electronic device to be the sluggish state.

In various embodiments, the processor 120 may: detect the TCP socket for the connection establishment; identify whether the state of the TCP socket is the new connection establishment request state; identify whether the sum of the number of transmission data packets of an application executed in the electronic device 101 and the number of reception data packets of an application executed in the electronic device 101 is smaller than the threshold; and determine the communication state of the electronic device 101 to be the sluggish state when the TCP socket for the connection establishment is detected, the new connection configuration request state is detected, and the sum of the number of transmission data packets and the number of reception data packets is smaller than the threshold.

Figure 12:
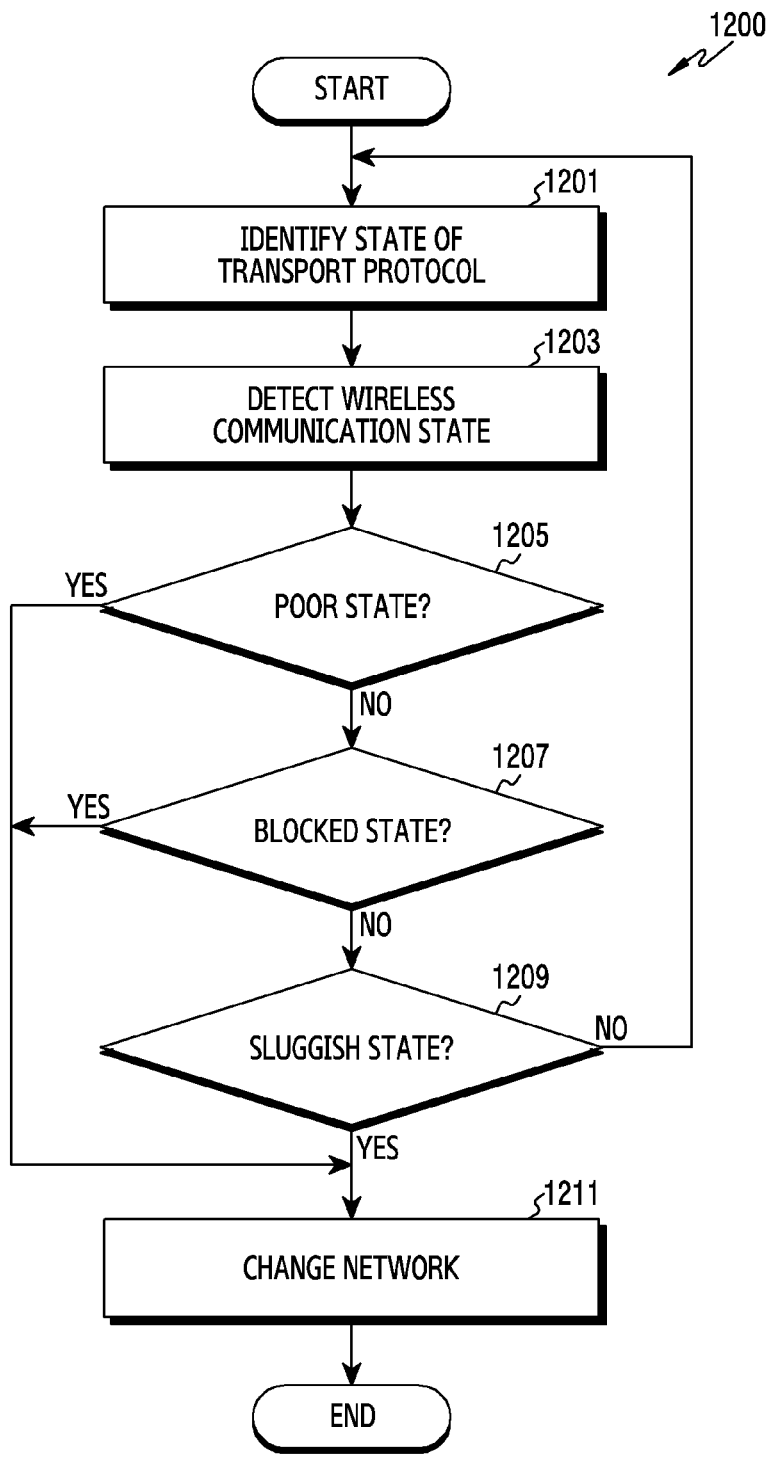
FIG. 12 illustrates a flowchart 1200 for identifying a communication state and changing a network according to various embodiments of the disclosure.

FIG. 12 illustrates a flowchart for identifying a communication state and changing a network according to various embodiments of the disclosure. In the following embodiment, the operations may be sequentially performed, but are not necessarily sequentially performed. For example, the sequential position of each operation may be changed, or at least two operations may be performed in parallel. The entity performing the operations illustrated in flowchart 1200 may be understood to be the electronic device 101 or a component (e.g., a processor 120) of the electronic device 101.

Referring to FIG. 12, in operation 1201, the processor 120 may identify a state of a transport protocol. For example, the processor 120 may identify a socket pattern based on the context according to a wireless link characteristic. In various embodiments, the socket pattern may be a pattern of a TCP socket state. For example, the state of the TCP socket may include a connection establishment request (SYN_SENT) state, a connection-established (ESTABLISHED) state, a connection release (FIN-WAIT) state, and the like. The processor 120 may identify that the state of the TCP socket is changed to the above-described states.

In operation 1203, the processor 120 may detect a wireless connection state. For example, the wireless connection state may include at least one of RSSI, a link speed, a loss, or an SNR. The processor 120 may detect a communication state by using the wireless connection state detected together with the identified state of the TCP socket. For example, the communication state may include a good state, a poor state, a blocked state, and a sluggish state.

In operation 1205, the processor 120 may determine whether the connection state is a poor state. For example, the processor 120 may indicate the case in which the Wi-Fi signal quality is poor. In various embodiments, in the poor state, the pattern of the state of the TCP socket may include: the case in which the number of sockets in a new connection release state increases and the number of reception packets is small; the case in which the number of sockets in a new connection establishment request state increases and the number of reception packets is small; the case in which the number of sockets in a new closing state increases and the number of reception packets is small; the case in which the number of sockets in a new last acknowledgement response state increases and the number of reception packets is small; or the case in which the number of reception packets is small and the number of retransmissions increases. When the communication state is identified to be the poor state, the processor 120 may change a network in operation 1211.

In operation 1207, the processor 120 may determine whether the communication state is a blocked state. For example, when the communication state is not the poor state, the processor 120 may identify whether the communication state is a blocked state. For example, the blocked state may indicate the case in which a Wi-Fi network environment is good but a specific application is blocked by the firewall. In various embodiments, when the communication state is the blocked state, the electronic device 101 may have good RSSI and a good link speed. When the communication state is the blocked state, on a network layer level, an application may have a smaller number of TCP sockets in a connection-established state. The sockets may be used for retransmission and reception packets may be stuck in a send queue. In various embodiments, when the communication state is the blocked state, a large number of sockets in the connection establishment request state may not be changed to the connection-established state. When the communication state is the blocked state, the processor 120 may change a network in operation 1211.

In operation 1209, the processor 120 may determine whether the communication state is a sluggish state. For example, when the communication state is not the blocked state, the processor 120 may identify whether the communication state is a sluggish state. In various embodiments, when the communication state is the sluggish state, the electronic device 101 may have good RSSI and good link speed in a wireless network. When the communication state is the sluggish state, the number of sockets in a connection-established state may increase, but the number of data packets received by an application may be small. In this case, the sockets of the application may not perform retransmission. When the communication state is not the sluggish state, the processor 120 may identify the state of the transport protocol again, or, although not shown in the drawing, the processor 120 may determine the communication state to be a good state. In various embodiments, when the communication state is the good state, the number of new connection establishment sockets may increase and the number of reception packets may be small. When the communication state is the good state, the number of sockets in a new connection-release-waiting state may increase and a new connection release state may not be identified. In various embodiments, when the communication state is the good state, the state of the TCP socket may be changed from the connection establishment request state to the connection-established state.

In operation 1211, the processor 120 may change a network. For example, when the communication state is the sluggish state, the processor 120 may change a network. For example, the processor 120 may control a communication module 180 to change the network from a Wi-Fi network to a cellular network. However, the network change is not limited thereto, and it is possible to change the network from a current network to various kinds of networks. According to the above-described operation, the processor 120 may identify the state of the TCP socket, determine the communication state, and change the network based on the determined communication state. Each of the above-described operations 1205 to 1209 is an independent operation, and the processor 120 may sequentially perform each operation, or may perform each operation regardless of the order thereof.

Figure 13:
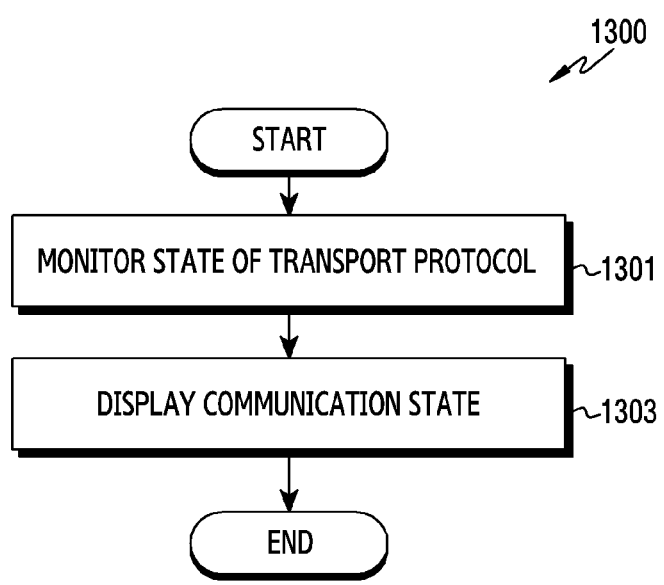
FIG. 13 illustrates a flowchart 1300 of an electronic device for monitoring a state of a transport layer protocol according to various embodiments of the disclosure.
Figure 14:
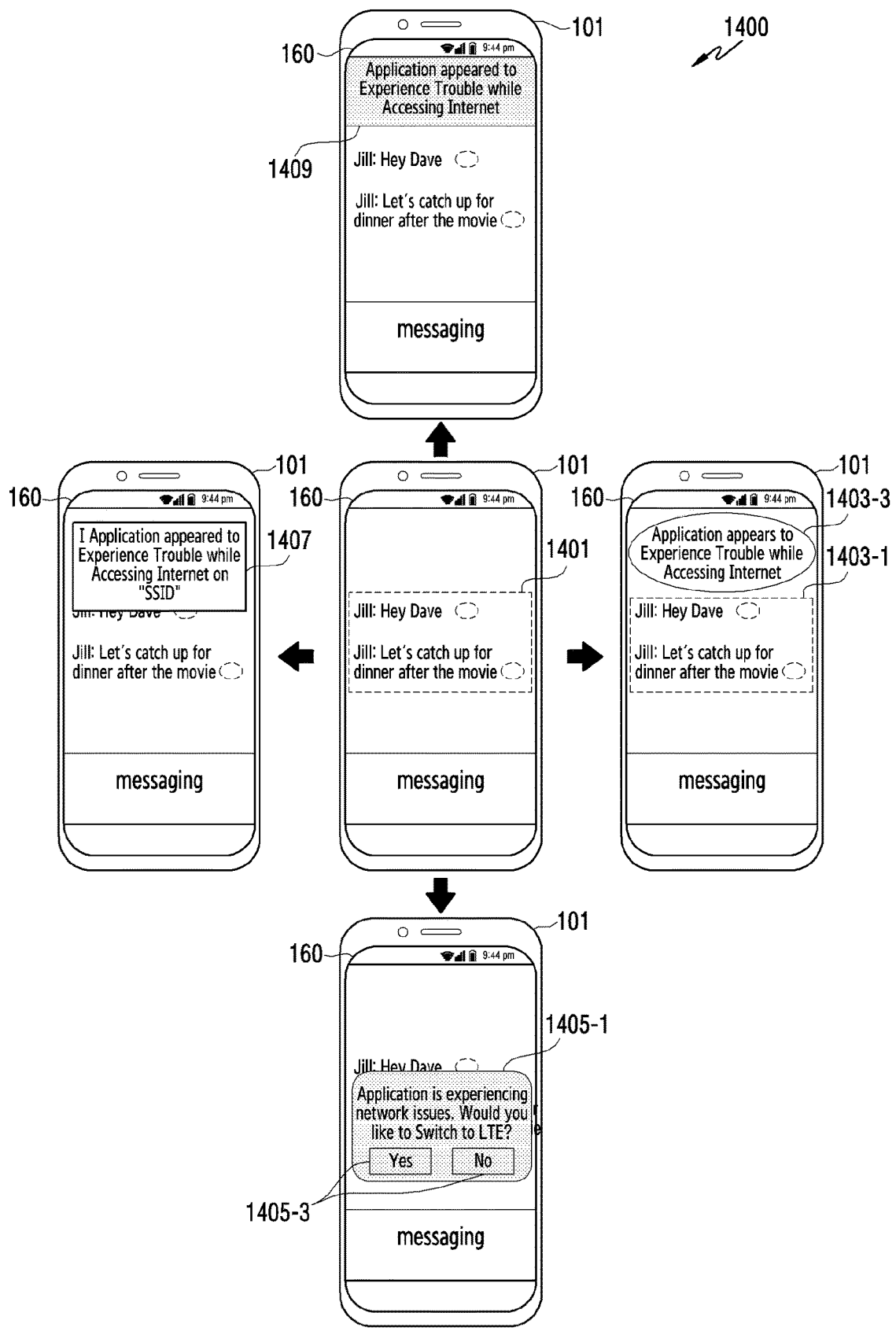
FIG. 14 illustrates an example 1400 of an interface of an electronic device for monitoring a state of a transport layer protocol according to various embodiments of the disclosure.

FIG. 13 illustrates a flowchart of an electronic device for monitoring a state of a transport layer protocol according to various embodiments of the disclosure. In the following embodiment, the operations may be sequentially performed, but are not necessarily sequentially performed. For example, the sequential position of each operation may be changed, or at least two operations may be performed in parallel. The entity performing the operations illustrated in flowchart 1300 may be understood to be the electronic device 101 or a component (e.g., a processor 120) of the electronic device 101.

Referring to FIG. 13, in operation 1301, the processor 120 may monitor a state of a transport protocol. In various embodiments, the transport protocol may include a TCP. The processor 120 may analyze a state of a TCP socket. For example, the processor 120 may identify the pattern of the changing states of the TCP socket, and may also analyze physical channel characteristics such as the number of transmission and reception packets, RSSI, link speed, or a loss, so as to determine the communication state of the electronic device 101. In various embodiments, the communication state may include a good state, a poor state, a blocked state, and a sluggish state. The processor 120 may monitor the above-described state of the TCP socket and determine the communication state of the electronic device 101.

In operation 1303, the processor 120 may display the communication state. For example, the processor 120 may display the previously determined communication state on a display device 160 of the electronic device 101. In an embodiment, the processor 120 may display a message, indicating that an application currently running in the electronic device 101 has a problem assessing the network, on the display device 160. For example, referring to FIG. 14, the processor 120 of the electronic device 101 may perform control to display a screen including a chat window 1401-1, via which a user exchanges a message with other users through an application, on the display device 160. For example, when the electronic device 101 transmits and receives a message to and from an external electronic device 102 through an SNS application such as KaKaoTalk, WhatsApp, Facebook, or another messenger, the processor 120 may perform control to display the transmitted and the received message on the display device 160 of the electronic device 101. When the user exchanges a message with another user through the above-described SNS application, an interface of the electronic device 101 may include a message chat window 1403-1 and a pop-up window 1403-3 indicating that the application is experiencing trouble accessing the Internet, and the processor 120 may perform control to display a screen including the interface on the display device 160. In an embodiment, when a specific application is blocked by a network firewall, the processor 120 may perform control to display a message, indicating that the application has trouble transmitting and receiving a data packet, on the display device 160 of the electronic device 101. For example, referring to FIG. 14, the processor 120 of the electronic device 101 may perform control to display a screen including a pop-up window 1405-1 prompting the user to select whether to change the network from the current network to the cellular network since the application is experiencing trouble accessing the Internet, and an indicator 1405-3, which allows the user to select whether to change the network with reference to the contents of the pop-up window, on the display device 160. For example, the electronic device 101 may display a message prompting the user to select whether to change the network from a Wi-Fi network to an LTE, LTE-A, or 5G network, on the display device 160 of the electronic device 101. Accordingly, by changing the network, the processor 120 may facilitate the operation of the application. In an embodiment, an interface of the electronic device 101 may include a pop-up window 1407 indicating that the application has trouble accessing the Internet via a service set identifier (SSID), and the processor 120 may perform control to display a screen including the interface on the display device 160. The SSID may indicate the name of a wireless network, and Wi-Fi devices such as a laptop computer or a smartphone may attempt wireless connection through SSID classification. In an embodiment, a pop-up window 1409 indicating that the application is experiencing trouble accessing the Internet may at least partially overlap the interface of the existing electronic device 101, and the processor 120 may perform control to display a screen including the overlapping interface, on the display device 160.

In various embodiments, as described above, the electronic device 101 may display not only the pop-up window indicating that the application has trouble accessing the Internet, but also the communication state, determined through the monitoring, and whether to change the network. For example, when the current communication state is the poor state, the blocked state, or the sluggish state, the processor 120 may perform control to display the communication state on the display device 160 and to display the pop-up window, including the indicator which prompts the user to select whether to change the network, on the display device 160.

In various embodiments, the processor 120 may perform control to display the communication state of the electronic device 101 on the display device 160 and to display a message including information relating to the network change, based on the communication of the electronic device 101 on the display device 160. In an embodiment, the instructions stored in the memory 130 of the electronic device 101 may cause the processor 120 to display the communication state of the electronic device 101 on the display device 160 and to display a message including information relating to the network change based on the communication state on the display device 160.

In various embodiments, the processor 120 may use a socket ID and an IP address to identify a state of a TCP socket. For example, the socket ID may include an INODE number, and the IP address may include source and destination addresses, and a universally unique identifier (UUID). In various embodiments, the processor 120 may maintain a list of good states to prevent a false alarm with regard to the communication state. Accordingly, the processor 120 may identify that some sockets are stuck in a specific state.

In various embodiments, the processor 120 may produce a list of states of the TCP socket to identify the state of the TCP socket. For example, as shown in <Table 1>, the processor 120 may produce a list of states of the TCP socket by using the socket ID and the IP address.

TABLE 1

| Using socket ID | Using IP address |
|---|---|
| Producing connection-established state list | Producing connection-release state list |
| Producing connection establishment request state list | Producing last acknowledgement response state list |
| Producing retransmission list | Producing closing state list |
| Producing connection-release-waiting state list | Producing time-waiting state list |

Referring to [Table 1], the processor 120 may produce a connection-established state list, a connection establishment request state list, a retransmission list, and a connection-release-waiting state list by using the socket ID, and may produce a connection release state list, a last acknowledgement response state list, a closing state list, and a time-waiting state list by using the IP address. For example, the processor 120 may produce a connection-established state list by using the socket ID. The processor 120 may identify a socket for new connection establishment in a previous state and a current state. In various embodiments, the processor 120 may produce a connection establishment request state list by using the socket ID. For example, when the previous and current communication states are good states, the processor 120 may identify whether the state of the TCP socket is a new connection establishment request state, or may identify whether there has been an acknowledgement response to the connection establishment request. In various embodiments, the processor 120 may produce a retransmission list by using the socket ID. For example, when the current communication state is the good state, the processor 120 may identify whether the application performs new retransmission. In various embodiments, the processor 120 may produce a connection-release-waiting state list by using the socket ID. For example, when the current communication state is the good state, the processor 120 may identify whether the state of the TCP socket is a new connection-release-waiting state.

In various embodiments, the processor 120 may identify the state of the TCP socket by using the IP address. For example, the processor 120 may produce a new connection release state list by using the IP address. For example, when the current communication state is the good state, the processor 120 may identify whether the state of the TCP socket is a new connection release state by using the IP address. In various embodiments, the processor 120 may produce a last acknowledgement response state list by using the IP address. For example, when the current communication state is the good state, the processor 120 may identify whether the state of the TCP socket remains as a last acknowledgement response state. In various embodiments, the processor 120 may produce a closing state list by using the IP address. For example, when the current communication state is the good state, the processor 120 may identify whether the state of the TCP socket remains as a closing state. In various embodiments, the processor 120 may produce a time-waiting state list by using the IP address. For example, the processor 120 may identify whether the state of the TCP socket is a new time-waiting state in the previous and the current state. According to the above-described operations, the processor 120 may update the list of the TCP socket states which are the good states by using the socket ID or the IP address.

As described above, the processor 120 may identify the state of the transport protocol of the electronic device 101 by using the ID and the IP address of the TCP socket. For example, the processor 120 may determine the communication state of the electronic device 101 by identifying the state of the TCP socket corresponding to each of a MAC address and an IP address. For example, as shown in <Table 2>, while performing communication through a specific application, the processor 120 may detect the state of the TCP socket of the electronic device 101. For example, the processor 120 may determine the communication state of the electronic device 101 by identifying the state of the TCP socket corresponding to each of the MAC address and the IP address. For example, as shown in <Table 2>, while performing communication through a specific application, the processor 120 may detect the state of the TCP socket of the electronic device 101.

TABLE 2

| MAC address | IP address | Application name | State of TCP socket |
|---|---|---|---|
| First MAC address | First IP address | AAA | LISTEN |
| Second MAC address | Second IP address | BBB | ESTABLISHED |
| Third MAC address | Third IP address | CCC | ESTABLISHED |
| Fourth MAC address | Fourth IP address | DDD | ESTABLISHED |
| Fifth MAC address | Fifth IP address | EEE | ESTABLISHED |

Referring to <Table 2>, the processor 120 may detect the state of the TCP socket according to each of the MAC address and the IP address. The processor 120 may determine the communication state of the electronic device 101 by identifying the detected state of the TCP socket. For example, when data transmission or reception through applications from the AAA to the EEE application ends (e.g., when image streaming ends), the processor 120 may detect the state of the TCP socket of the electronic device 101. In this case, the processor 120 may determine the communication state of the electronic device 101 to be the good state by identifying that the state of the TCP socket is a permanent state of the TCP socket such as a detection state and multiple connection-established states.

In an embodiment, as shown in <Table 3>, while performing communication through a specific application, the processor 120 may detect the state of the TCP socket of the electronic device 101.

TABLE 3

| MAC address | IP address | Application name | State of TCP socket |
|---|---|---|---|
| First MAC address | First IP address | AAA | CLOSE_WAIT |
| Second MAC address | Second IP address | BBB | ESTABLISHED |
| Third MAC address | Third IP address | CCC | CLOSE_WAIT |
| Fourth MAC address | Fourth IP address | DDD | CLOSE_WAIT |
| Fifth MAC address | Fifth IP address | EEE | ESTABLISHED |
| Sixth MAC address | Sixth IP address | FFF | ESTABLISHED |
| Seventh MAC address | Seventh IP address | GGG | CLOSE_WAIT |

Referring to <Table 3>, the processor 120 may detect the state of the TCP socket according to each of the MAC address and the IP address. The processor 120 may determine the communication state of the electronic device 101 by identifying the detected state of the TCP socket. For example, when data transmission or reception through applications from the AAA to the GGG application ends (e.g., when image streamlining ends), the processor 120 may detect the state of the TCP socket of the electronic device 101. In this case, the processor 120 may determine the communication state of the electronic device 101 to be the good state by identifying that the state of the TCP socket of the electronic device 101 is changed from the multiple connection-established states to the connection-release-waiting state.

In an embodiment, as shown in <Table 4>, while performing communication through a specific application, the processor 120 may detect the state of the TCP socket of the electronic device 101.

TABLE 4

| MAC address | IP address | Application name | State of TCP socket |
|---|---|---|---|
| First MAC address | First IP address | AAA | ESTABLISHED |
| Second MAC address | Second IP address | BBB | FIN_WAIT_1 |
| Third MAC address | Third IP address | CCC | FIN_WAIT_1 |
| Fourth MAC address | Fourth IP address | DDD | FIN_WAIT_1 |
| Fifth MAC address | Fifth IP address | EEE | ESTABLISHED |

Referring to <Table 4>, the processor 120 may detect the state of the TCP socket according to each of the MAC address and the IP address. The processor 120 may determine the communication state of the electronic device 101 by identifying the detected state of the TCP socket. For example, when data transmission or reception through applications from the AAA to the EEE application ends (e.g., when message transmission or reception ends), the processor 120 may detect the state of the TCP socket of the electronic device 101. In this case, the processor 120 may determine the communication state of the electronic device 101 to be the blocked state by identifying that the state of the TCP socket is only the connection-established state and the first connection release state.

In an embodiment, as shown in <Table 5>, while performing communication through a specific application, the processor 120 may detect the state of the TCP socket of the electronic device 101.

TABLE 5

| MAC address | IP address | Application name | State of TCP socket |
|---|---|---|---|
| First MAC address | First IP address | AAA | ESTABLISHED |
| Second MAC address | Second IP address | BBB | CLOSE_WAIT |
| Third MAC address | Third IP address | CCC | CLOSE_WAIT |
| Fourth MAC address | Fourth IP address | DDD | ESTABLISHED |
| Fifth MAC address | Fifth IP address | EEE | CLOSE_WAIT |
| Sixth MAC address | Sixth IP address | FFF | CLOSE_WAIT |
| Seventh MAC address | Seventh IP address | GGG | FIN_WAIT_1 |

Referring to <Table 5>, the processor 120 may detect the state of the TCP socket according to each of the MAC address and the IP address. The processor 120 may determine the communication state of the electronic device 101 by identifying the detected state of the TCP socket. For example, when data transmission or reception through applications from the AAA to the EEE application ends, the processor 120 may detect the state of the TCP socket of the electronic device 101. In this case, the processor 120 may determine the communication state of the electronic device 101 to be the poor state by identifying that the state of the TCP socket of the electronic device 101 is the connection-established state, the connection-release-waiting state, or the first connection release state.

In an embodiment, as shown in <Table 6>, while performing communication through a specific application, the processor 120 may detect information including the retransmission counter of the electronic device 101.

TABLE 6

| Line number | Local IP address | Remote IP address | Socket state | Transmission queue | Reception queue | Timer | Retransmission counter |
|---|---|---|---|---|---|---|---|
| 1 | First local IP address | First remote IP address | First socket state | First transmission queue value | First reception queue value | First timer value | First retransmission counter value |
| 2 | Second local IP address | Second remote IP address | Second socket state | Second transmission queue value | Second reception queue value | Second timer value | Second retransmission counter value |

Referring to <Table 6>, the processor 120 may detect a local IP address, a remote IP address, a socket state, a transmission queue, a reception queue, a timer, and a retransmission counter with respect to each line number. The processor 120 may determine the communication state of the electronic device by identifying the detected transmission queue value and the retransmission counter value. For example, the processor 120 may identify that the first transmission queue value is 0, but the second transmission queue value is not 0, and may determine that line number 2 corresponds to a transport layer. The processor 120 may identify the retransmission counter value. For example, the processor 120 may identify that the first retransmission counter value is 0, but the second retransmission counter value is not 0. The processor 120 may determine the communication state of the electronic device 101 to be the blocked state by identifying that the retransmission counter value is not 0.

Figure 15A:
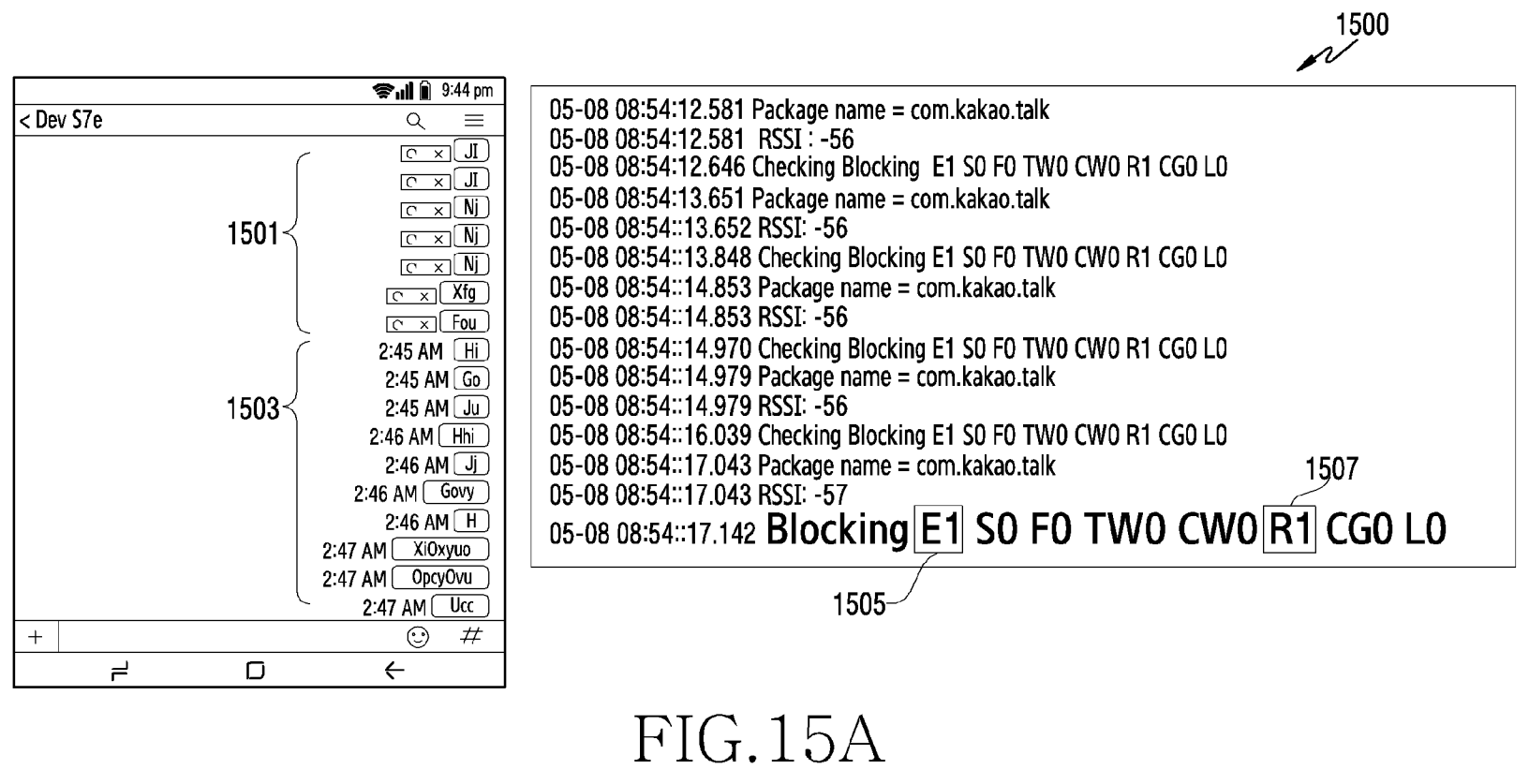

FIG. 15A illustrates an example of an interface of the electronic device, the interface being displayed on the electronic device when a communication state is a blocked state according to various embodiments of the disclosure. Hereinafter, the electronic device may include all or part (e.g., the processor 120 and the display device 160) of the electronic device 101 of FIG. 1.

Referring to FIG. 15A, the processor 120 may detect that a chat application is blocked by a network firewall by identifying a state of a TCP socket of the chat application. In various embodiments, the processor 120 may use a socket ID and an IP address to identify the state of the TCP socket. When the application is blocked by the network firewall, the processor 120 may perform control to display a first indicator 1501 and a second indicator 1503, for indicating that message transmission is not properly performed, on the display device 160. For example, the processor 120 may identify the case in which the number 1505 of connection establishment sockets of the chat application is smaller than a specific threshold and the case in which the retransmission count 1507 is not 0. Accordingly, the processor 120 may consider that the chat application is blocked by the network firewall, and may determine the communication state of the electronic device 101 to be the blocked state.

Figure 15B:
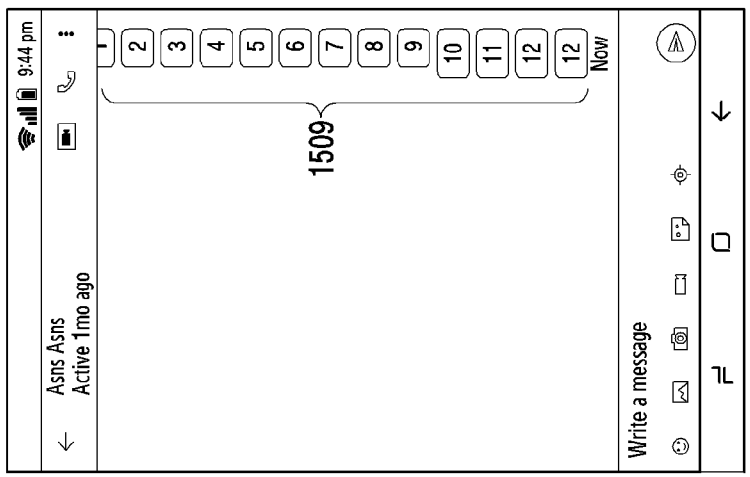
FIG. 15B illustrates an example 1510 of an interface of an electronic device, the interface being displayed on the electronic device when a communication state is a good state according to various embodiments of the disclosure.

FIG. 15B illustrates an example of an interface of the electronic device, the interface being displayed on the electronic device when a communication state is a good state according to various embodiments of the disclosure. Hereinafter, the electronic device may include all or part (e.g., the processor 120 and the display device 160) of the electronic device 101 of FIG. 1.

Referring to FIG. 15B, the processor 120 may detect that a chat application is not blocked by a network firewall or that there is no delay by identifying a state of a TCP socket of the chat application. In various embodiments, the processor 120 may use a socket ID and an IP address to identify the state of the TCP socket. When the application is not blocked by the network firewall or there is no delay, the processor 120 may perform control to display an indicator 1509, for indicating that message transmission is properly performed, on the display device 160. For example, the processor 120 may identify the case in which the number 1511 of connection establishment sockets of the chat application is greater than a threshold and the case in which the retransmission count 1513 is 0. Accordingly, the processor 120 may determine that the chat application is not blocked by the network firewall and that message transmission is smoothly performed. That is, the processor 120 determines the communication state of the electronic device 101 to be the good state.

As described above, an electronic device and a method of operating the same according to various embodiments may: identify a state of a transport protocol, i.e., a state of a TCP socket; determine a communication state of the electronic device 101 to be one of a good state, a poor state, a blocked state, and a sluggish state, based on the identified state of the TCP socket; and change a network based on the determined communication state, so as to provide an optimal network environment to a user.

In general, Wi-Fi wireless network technology indicates that an electronic device communicates via at least one external communication provision device (e.g., an AP). Apart from the strength of a signal that the electronic device receives from the external communication provision device, there may be a substantial Internet connection. The above-described substantial Internet connection may indicate connection between the external communication provision device and the Internet (e.g. the cloud), and the connection may be referred to as a backhaul connection.

Figure 16:
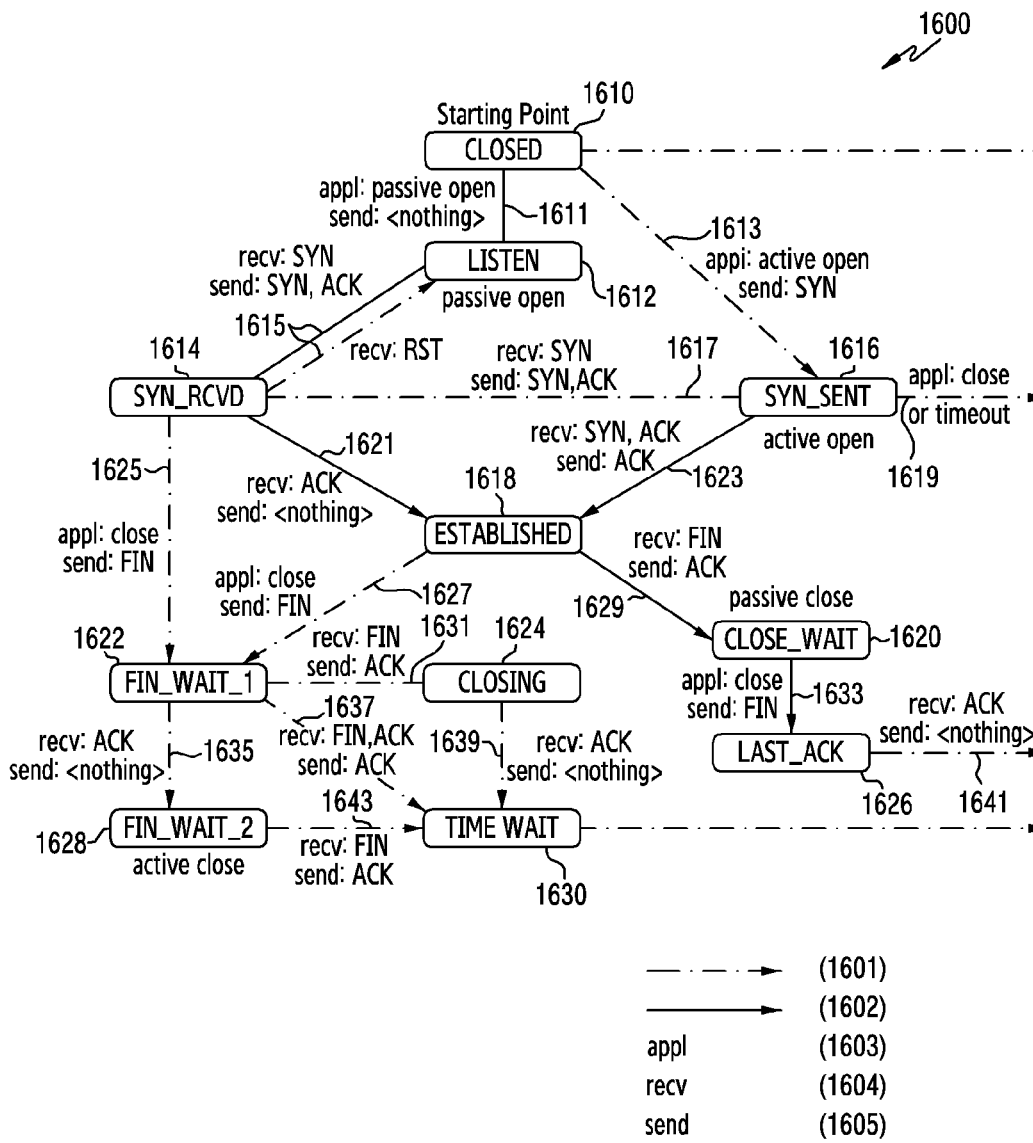
FIG. 16 illustrates a sequence diagram 1600 illustrating a change in a state of a transport protocol socket according to various embodiments of the disclosure.

In wireless network technology such as Wi-Fi, a socket may be used as a unit for performing communication. In most data transmission, the socket may be an endpoint, i.e., a start and end, for connecting communication between multiple entities that perform communication. Currently, a TCP socket scheme is used with all of a hypertext transfer protocol (HTTP), a file transfer protocol (FTP), and a quick UDP Internet Connections (QUIC) protocol. In order to transmit or receive one communication message (e.g., a single emoticon sent via a messenger application), a large number of sockets may be opened and closed. The above-described sockets may be created or destroyed through each predetermined period (stage), and may exist in a specific state in each stage. FIG. 16, which will be described below, illustrates a sequence diagram illustrating the procedure in which the socket state is changed when the TCP socket is created or destroyed.

FIG. 16 illustrates a sequence diagram 1600 illustrating a change in a state of a transport protocol state according to various embodiments of the disclosure.

Referring to FIG. 16, according to various embodiments, the states of a TCP socket of a client (e.g., the client 501 of FIG. 5) and a server (e.g., the server 503 of FIG. 5) may be changed to other states in response to a specific event. In FIG. 16, a dotted arrow 1601 may indicate a normal transition of the client 501, a line arrow 1602 may indicate normal transition of the server 503, "appl" 1603 may indicate a state transition when an application operates, "recv" 1604 may indicate a state transition when a segment is received, and "send" 1605 may indicate what is transmitted at the time of the transition.

In various embodiments, a changing stage may start from a connection closed (CLOSED) state 1610. At event 1611, an application may be in a passive open state, and the state of the TCP socket may be changed from the connection closed state 1610 to the detection (LISTEN) state 1612, without transmitting anything from the client 501 to the server 503. At event 1613, the application may be in an active open state, and the state of the TCP socket may be changed from the connection closed state 1610 to a connection establishment request (SYN_SENT) state 1616 by transmitting, from the client 501 to the server 503, a signal (e.g., an SYN packet) for requesting connection establishment. The connection establishment request state 1616 may indicate the active open state. At event 1615, the state of the TCP socket may be changed from the detection state 1612 to a connection establishment request received (SYN_RCVD) state 1614 when the server 503 receives a signal (e.g., an SYN packet) for requesting connection establishment, from the server 503, and the server 503 may transmit an acknowledgement response (e.g., an SYN and an ACK packet) to the connection establishment request to the client 501. At event 1617, the server 503 may receive a signal for requesting connection establishment from the client 501, and the server 503 may transmit an acknowledgement response to the connection establishment request to the client 501. At event 1619, the application may be in a closed or timeout state. At event 1621, the state of the TCP socket may be changed from the connection establishment request received state 1614 to the connection-established state 1618 when the server 503 receives the ACK packet from the client 501, and the server 503 may not transmit anything to the client 501. At event 1623, the state of the TCP socket may be changed from the connection establishment request state 1616 to the connection-established state 1618 when the client 501 receives the SYN and ACK packets from the server 503, and the client 501 may transmit the ACK packet to the server 503. At event 1625, the application may be in the closed state, and the client 501 may transmit a connection release signal (e.g., a FIN packet) to the server 503. At event 1627, the application may be in the closed state, and the client 501 may transmit the connection release signal to the server 503. At event 1629, the state of the TCP socket may be changed from the connection-established state 1618 to a connection-release-waiting (CLOSE_WAIT) state 1620 when the server 503 receives the FIN packet, and the server 503 may transmit the ACK packet to the client 501. In an embodiment, the connection-release-waiting state 1620 may indicate a passive close state. At event 1631, the state of the TCP socket may be changed from a first connection release (FIN_WAIT_1) state 1622 to a closing (CLOSING) state 1624 when the client 501 receives the FIN packet from the server 503, and the client 501 may transmit the ACK packet to the server 503. At event 1633, the application may be in the closed state, and the server 503 may transmit the FIN packet to the client 501. At event 1635, the state of the TCP socket may be changed from the first connection release state 1622 to a second connection release (FIN_WAIT_2) state 1628 when the client 501 receives the ACK packet from the server 503, and the client 501 may not transmit anything to the server 503. At event 1637, the state of the TCP socket may be changed from the first connection release state 1622 to a time-waiting (TIME_WAIT) state 1630 when the client receives the FIN and ACK packets, and the client 501 may transmit the ACK packet to the server 503. At event 1639, the state of the TCP socket may be changed from the closing state 1624 to the time-waiting state 1630 when the client 501 receives the ACK packet from the server 503, and the client 501 may not transmit anything to the server 503. At event 1641, the state of the TCP socket may be changed from a last acknowledgement response (LAST_ACK) state 1626 to the connection release state 1610 when the client 501 receives the ACK packet from the server 503, and the client 501 may not transmit anything to the server 503. As described above, various pieces of information relating to the electronic device 101 may be acquired by using a feature whereby the TCP socket goes through all stages from creation to destruction at least once in the process of performing communication. For example, information relating to a backhaul connection state or backhaul connection quality may be acquired by analyzing the count of all sockets in an active state.

In general, in order to examine whether there is a Wi-Fi backhaul connection, a method of regularly identifying the quality and the backhaul connection of a Wi-Fi channel may be used. The above-described identification method may not be flexibly applied according to the current communication state, but may be regularly used at designated intervals, in the case where the number of transmission packets and the number of reception packets are small or in the case where RSSI is weak. If the backhaul connection is identified only when the above-described condition is satisfied, the case in which the number of transmission packets and the number of reception packets are small due to deterioration of network conditions and the case in which the number of transmission packets and the number of reception packets are small because a user does not use the electronic device may not be distinguished from each other. The transmission packet and the reception packet are changed only when the user actively uses the Internet. Accordingly, in the case of background traffic, or when the user does not use the electronic device for a while, detecting changes in the transmission packet and the reception packet may be difficult. When the backhaul connection is identified only when the number of transmission packets and the number of reception packets are small, detecting the situation in which the transmission quality and the reception quality are good but there is no Internet connection due to an issue with the backhaul connection may be difficult. When Wi-Fi connection quality is low, the characteristics of a physical link layer may be used in order to identify whether there is a backhaul connection. Even when the transmission or reception quality of a signal is not good, the electronic device may have an Internet connection due to a reflected signal. Further, even when the quality of a signal from a communication provision device (e.g., an AP) is good, the electronic device may not have an Internet connection due to a backhaul connection failure. When the user is located close to the AP which provides Wi-Fi, that is, when a backhaul connection problem occurs in a state in which the quality of the signal is good, the above-described general method of identifying the backhaul connection may delay detection of backhaul connection failure because the backhaul connection is only examined after a designated time passes. According to various embodiments of the disclosure, when the electronic device determines that the backhaul connection has failed, the backhaul failure may be detected more promptly by using the count of states of a transport protocol socket (e.g., a TCP socket). In various embodiments, when the backhaul failure is detected, the electronic device may provide an interface for changing to another AP or cellular communication. Accordingly, the experience of a user who performs communication may be enhanced. In various embodiments, when the backhaul failure is detected, the electronic device may display the detected backhaul failure state on the display device, or may not display the same but may automatically change the network to another network. In various embodiments, at the time of the backhaul failure, the electronic device may provide the user with an option for automatically changing the network. In various embodiments, the electronic device examines the backhaul connection only when the probability of a problem occurring with the backhaul is high, thereby reducing unnecessary operations and enhancing battery efficiency. FIGS. 17 to 32, which will be described below, illustrate the case where the electronic device determines backhaul failure by identifying at least one of the state of the transport protocol and the count of sockets of the transport protocol, and controls the backhaul failure.

Figure 17:
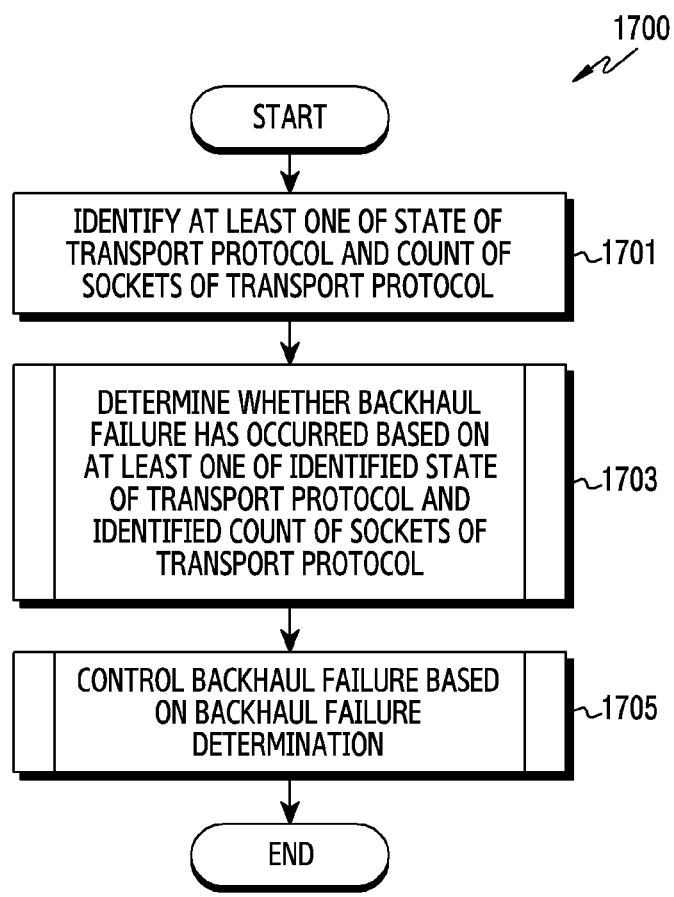
FIG. 17 illustrates a flowchart 1700 of an electronic device for determining whether a backhaul failure has occurred based on at least one of a state of a transport protocol and a count of sockets of a transport protocol according to various embodiments of the disclosure.

FIG. 17 illustrates a flowchart 1700 of an electronic device for determining whether a backhaul failure has occurred based on at least one of a state of a transport protocol and a count of sockets of a transport protocol according to various embodiments of the disclosure. In the following embodiment, the operations may be sequentially performed, but are not necessarily sequentially performed. For example, the sequential position of each operation may be changed, or at least two operations may be performed in parallel. Operations 1701 and 1703 of FIG. 17 are a part of operation 301 of FIG. 3, operation 1705 of FIG. 17 is a part of operation 303 of FIG. 3, and the entity performing the operations illustrated in flowchart 1700 may be understood to be the electronic device 101 or a component (e.g., a processor 120) of the electronic device 101.

Referring to FIG. 17, in operation 1701, the electronic device (e.g., the processor 120 of FIG. 1) according to various embodiments may identify at least one of the state of the transport protocol and the count of sockets of the transport protocol. For example, the processor 120 may identify a total count of sockets of a transport protocol (i.e., TCP) and a count of sockets corresponding to a connection-established state, a TCP socket retransmission segment, or a TCP socket reception segment.

Figure 18:
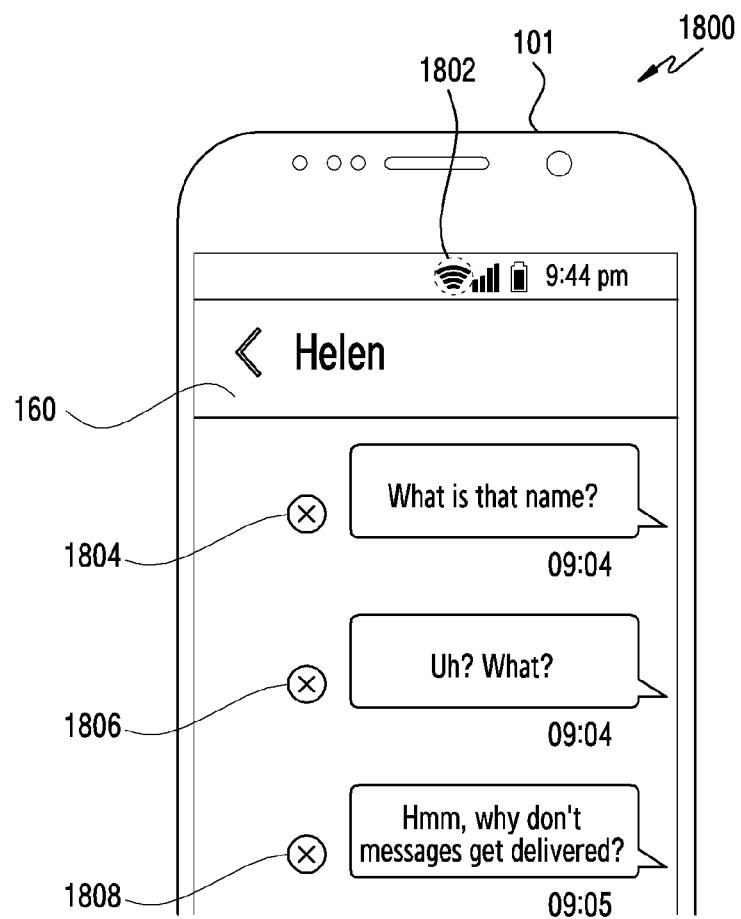
FIG. 18 illustrates an example 1800 of an interface of an electronic device, the interface indicating a backhaul failure according to various embodiments of the disclosure.

According to various embodiments, in operation 1703, the processor 120 may determine whether a backhaul failure has occurred based on at least one of the identified state of the transport protocol or the identified count of sockets of the transport protocol. In an embodiment, when the total count of sockets of the transport protocol increases, but the count of sockets corresponding to the connection-established state among the total count of sockets does not increase, the processor 120 may determine that a backhaul failure has occurred. In an embodiment, when the number of reception packets or the number of transmission packets is insufficient, and the number of retransmission segments increases, the processor 120 may determine that a backhaul failure has occurred. In an embodiment, when the number of reception packets or the number of transmission packets is insufficient and an error is identified in the reception segment of the transport protocol, the processor 120 may determine that a backhaul failure has occurred. In an embodiment, in a situation in which an interface such as that shown in FIG. 18 is displayed, the processor 120 may determine that a backhaul failure has occurred. In an embodiment, an indicator 1802 indicating the strength of a Wi-Fi signal may display information indicating that the strength of the Wi-Fi signal is good on a display device (e.g., the display device 160 of FIG. 1) of the electronic device 101. For example, among four stages displayed by the indicator 1802 indicating the strength of the Wi-Fi signal, when one or more stages are activated and displayed, the strength of the Wi-Fi signal may be considered to be good. For example, in FIG. 18, the indicator 1802 indicating the strength of the Wi-Fi signal may show that all four stages are activated. In an embodiment, when the indicator 1802 indicating the strength of the Wi-Fi signal indicates that the strength of the Wi-Fi signal is good, but an indicator 1804 to 1808 indicating failure of message transmission is displayed, the processor 120 may recognize that there is a problem in the backhaul connection and determine that a backhaul failure has occurred.

According to various embodiments, in operation 1705, the processor 120 may control the backhaul failure based on the backhaul failure determination. For example, the processor 120 may display the backhaul failure on the display device 160 of the electronic device 101, and display a network change indicator so that a user can change the network. In various embodiments, the network change indicator may include indicators for changing the network for communication to another AP or a cellular network. In various embodiments, when the backhaul failure is determined, the processor 120 may share information on the backhaul failure determination with external electronic devices. FIGS. 19 to 24, which will be described below, illustrate a flowchart of the electronic device 101 for determining whether a backhaul failure has occurred and an example thereof.

Figure 19:
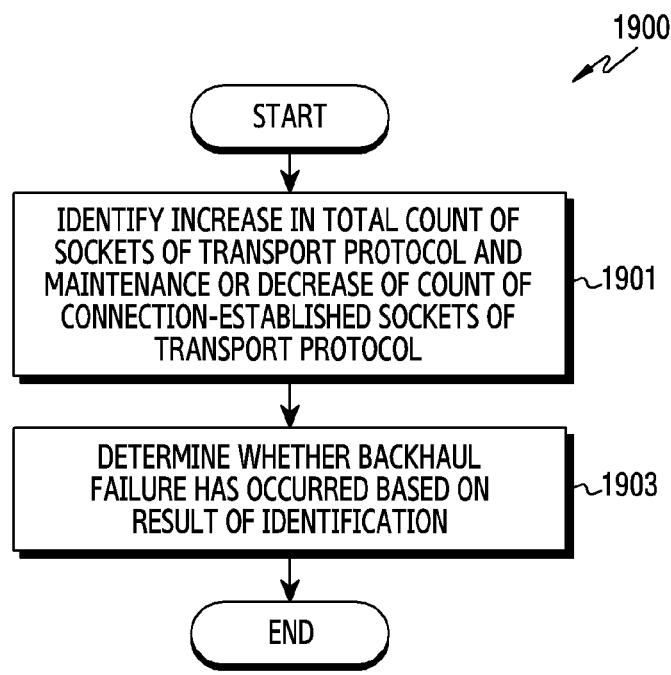
FIG. 19 illustrates a flowchart 1900 of an electronic device for determining whether a backhaul failure has occurred based on a total count of sockets and a count of connection-established sockets of a transport protocol according to various embodiments of the disclosure.

FIG. 19 illustrates a flowchart 1900 of an electronic device for determining whether a backhaul failure occurred based on a total count of sockets and a count of connection-established sockets of a transport protocol according to various embodiments of the disclosure. In the following embodiment, the operations may be sequentially performed, but are not necessarily sequentially performed. For example, the sequential position of each operation may be changed, or at least two operations may be performed in parallel. Operation 1901 of FIG. 19 is a part of operation 1701 of FIG. 17, operation 1903 of FIG. 19 is a part of operation 1703 of FIG. 17, and a the entity performing the operations illustrated in flowchart 1900 may be understood to be the electronic device 101 or a component (e.g., a processor 120) of the electronic device 101.

Figure 20:
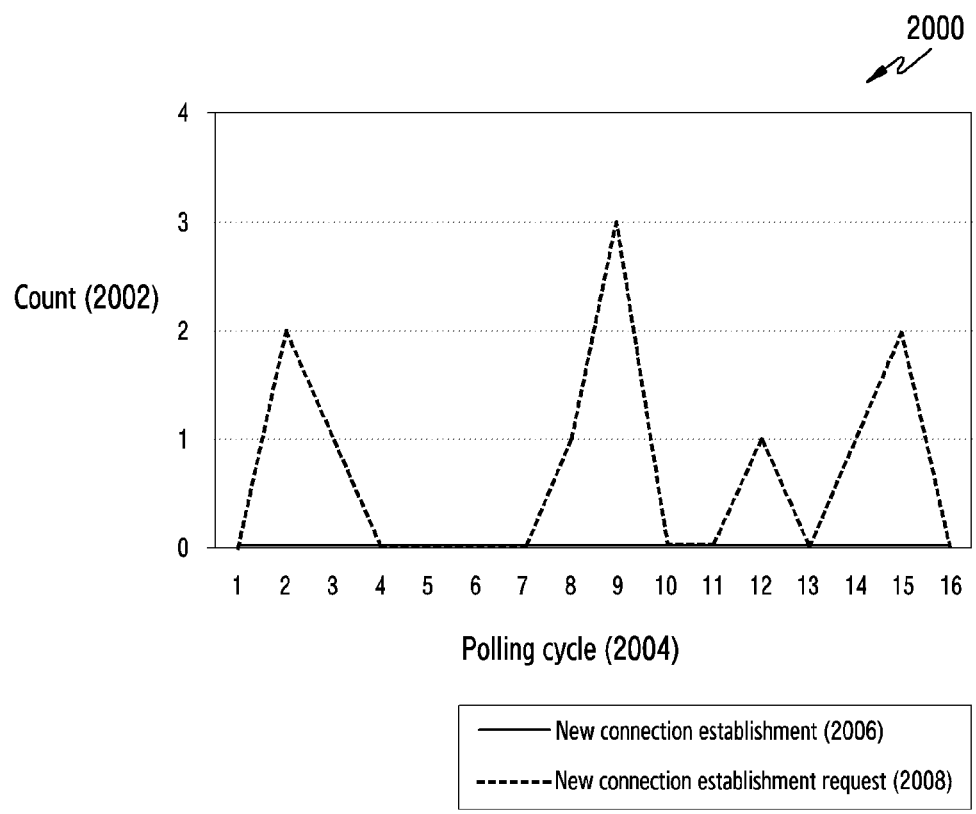
FIG. 20 illustrates a graph 2000 illustrating an example of determining whether a backhaul failure has occurred based on a total count of sockets and a count of connection-established sockets of a transport protocol according to various embodiments of the disclosure.

Referring to FIG. 19, in operation 1901, the electronic device (e.g., the processor 120 of FIG. 1) according to various embodiments may identify the increase in a total count of sockets of a transport protocol and maintenance or decrease of a count of connection-established sockets of a transport protocol. In an embodiment, the processor 120 may identify that the total count of TCP sockets increases, but that, among these, the count of sockets in a connection-established state does not increase. For example, the above-described state may be a state in which the backhaul connection is lost from an arbitrary time point, the number of sockets in the connection-established state decreases, and packets to be transmitted from an application are accumulated. In an embodiment, the state of the transport protocol is shown in FIG. 20. In the graph 2000 in FIG. 20, the horizontal axis indicates a polling cycle, and the vertical axis indicates a TCP socket count 2002. For example, during the polling cycle, the processor 120 may identify that the count of newly established connections 2006 does not increase but that the count of new connection establishment requests 2008 increases. For example, in FIG. 20, the count of new connection establishment requests 2008 may be fixed to 0 and may not increase. The processor 120 may identify that: when the polling cycle 2004 changes from 1 to 2, i.e., at the moment when the polling cycle 2004 changes from 1 to 2, the count of new connection establishment requests 2008 increases from 0 to 2; when the polling cycle 2004 changes from 7 to 9, i.e., at the moment when the polling cycle 2004 changes from 7 to 9, the count of new connection establishment requests 2008 increases from 0 to 3; when the polling cycle 2004 changes from 11 to 12, i.e., at the moment when the polling cycle 2004 changes from 11 to 12, the count of new connection establishment requests 2008 increases from 0 to 1; and when the polling cycle 2004 changes from 13 to 15, i.e., at the moment when the polling cycle 2004 changes from 13 to 15, the count of new connection establishment requests 2008 increases from 0 to 2. Due to the increase in the count of new connection establishment requests 2008, the total count of sockets of the transport protocol may increase.

According to various embodiments, in operation 1903, the processor 120 may determine whether a backhaul failure has occurred based on a result of the identification. For example, as described above in FIG. 20, the processor 120 may identify a state in which as the total count of new connection establishment requests increases, the total count of TCP sockets increases, but the count of sockets in the connection-established state does not increase, and determine the occurrence of the backhaul failure. In an embodiment, the processor 120 may determine whether a backhaul failure has occurred by comparing a difference between the total count of TCP sockets and the count of sockets in the connection-established state with a threshold. For example, when a state in which a response (e.g., a syn packet) is not received continues for a time equal to or longer than a threshold time, or when the difference between the total count of TCP sockets and the count of sockets in the connection-established state is greater than a threshold and this continues for a threshold time, the processor 120 may determine whether a backhaul failure has occurred.

Figure 21:
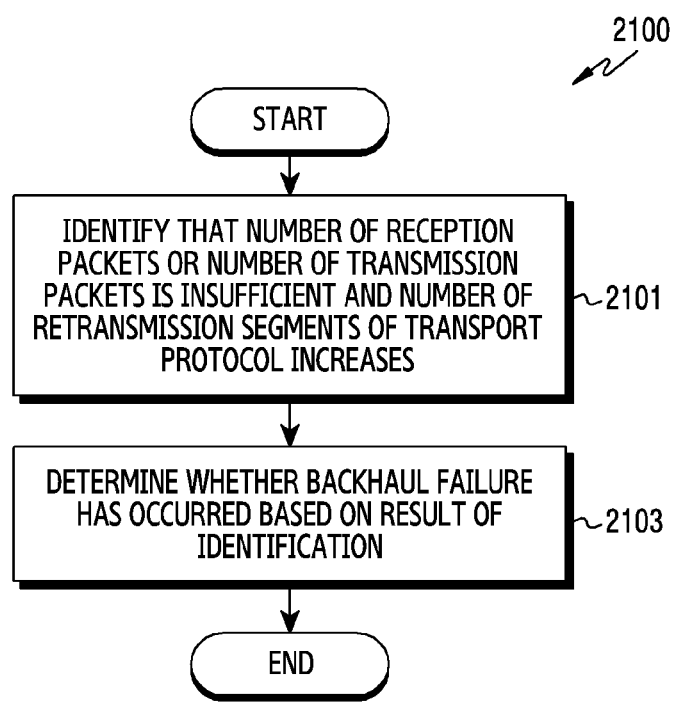
FIG. 21 illustrates a flowchart 2100 of an electronic device for determining whether a backhaul failure has occurred based on a retransmission state of a transport protocol according to various embodiments of the disclosure.

FIG. 21 illustrates a flowchart 2100 of an electronic device for determining whether a backhaul failure has occurred based on a retransmission state of a transport protocol according to various embodiments of the disclosure. In the following embodiment, the operations may be sequentially performed, but are not necessarily sequentially performed. For example, the sequential position of each operation may be changed, or at least two operations may be performed in parallel. Operation 2101 of FIG. 21 is a part of operation 1701 of FIG. 17, operation 2103 of FIG. 21 is a part of operation 1703 of FIG. 17, and the entity performing the operations illustrated in flowchart 2100 may be understood to be the electronic device 101 or a component (e.g., a processor 120) of the electronic device 101.

Figure 22A:
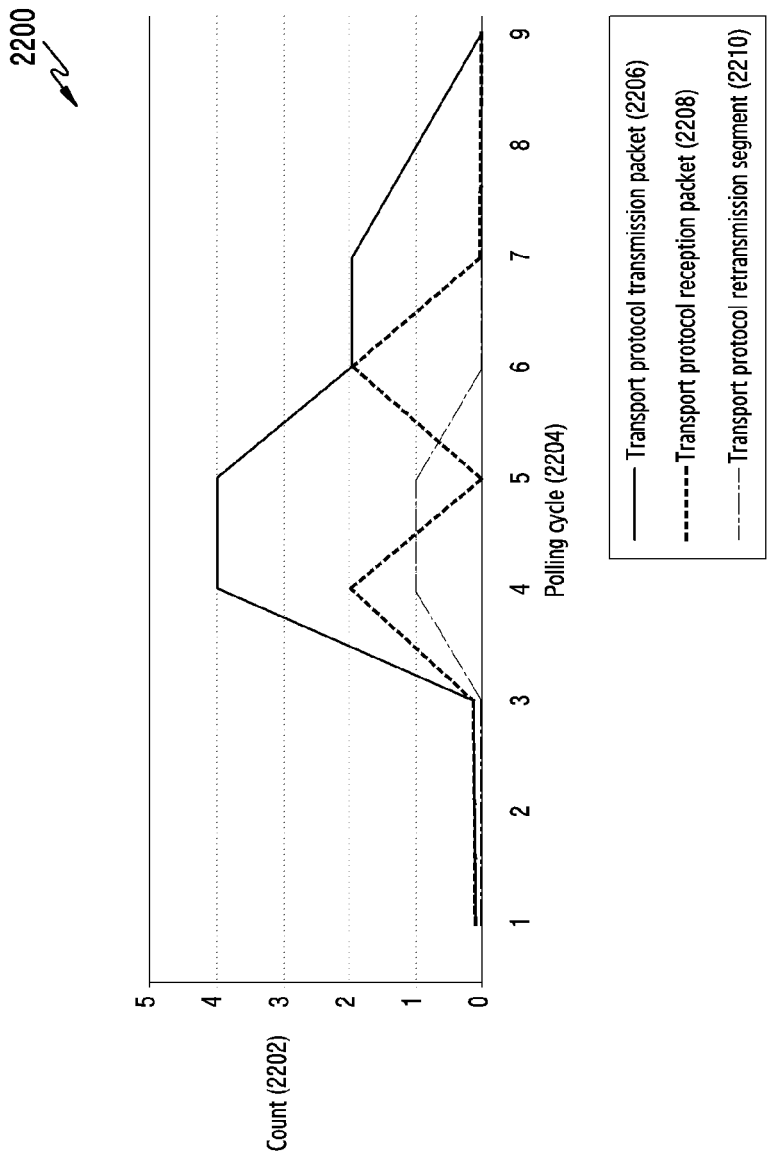
FIG. 22A illustrates a graph 2200 indicating an example of determining whether a backhaul failure has occurred based on a retransmission state of a transport protocol according to various embodiments of the disclosure.

Referring to FIG. 21, in operation 2101, the electronic device (e.g., the processor 120 of FIG. 1) according to various embodiments may identify that the number of reception packets or the number of transmission packets is insufficient and that the number of retransmission segments of a transport protocol increases. For example, when the number of packets to be received and the number of packets to be transmitted decrease, i.e., when the transmission and reception environment is deteriorated, the processor 120 may identify a state in which the number of packets that could not be transmitted increases. In an embodiment, the state of the transport protocol is shown in FIG. 22A. In the graph 2200 in FIG. 22A, the horizontal axis indicates a polling cycle 2204, and the vertical axis indicates a count 2202. For example, during the polling cycle, the processor 120 may identify that the count of transport protocol transmission packets 2206 and the count of transport protocol reception packets 2208 are low but that the count of transport protocol retransmission segments 2210 is high. For example, in FIG. 22A, the processor 120 may identify that when the polling cycle 2204 changes from 4 to 5, i.e., at the moment when the polling cycle 2204 changes from 4 to 5, the count of transport protocol transmission packets 2206 remains at 4, the count of transport protocol reception packets 2208 decreases from 2 to 0, and the count of transport protocol retransmission segments 2210 remains at 1. According to a result of the identification described above, the processor 120 may identify that the count of transport protocol transmission packets 2206 is relatively low but that the count of transport protocol retransmission segments 2210 is high.

Figure 22B:
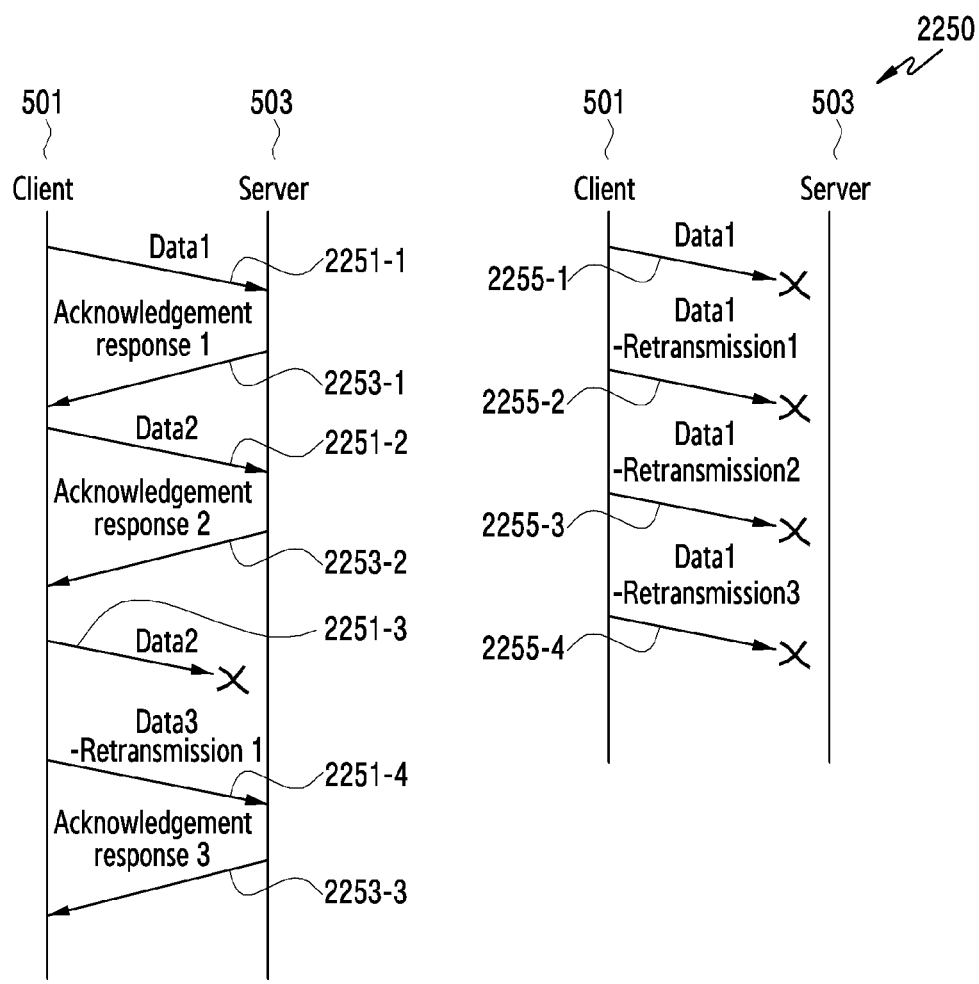
FIG. 22B illustrates a sequence diagram 2250 indicating an example of determining whether a backhaul failure has occurred based on a retransmission state according to various embodiments of the disclosure.

According to various embodiments, in operation 2103, the processor 120 may determine whether a backhaul failure has occurred based on a result of the identification. For example, as shown in FIG. 22B, the processor 120 may identify that the number of transport protocol retransmission segments increases as time passes, and determine whether a backhaul failure has occurred. For example, at time T0, a client (e.g., the client 501 of FIG. 5) may transmit pieces of data 2251-1 to 2251-4 to a server (e.g., the server 503 of FIG. 5). In an embodiment, among the pieces of data 2251-1 to 2251-4, the client 501 may retransmit 2251-4 data 3 after failing to transmit data 3 (2251-3). The server 503 may receive data from the client 501 and transmit acknowledgement responses 2253-1 to 2253-3 to the reception to the client 501. The count of TCP sockets and the number of segments at $T_0$ are as shown in <Table 7> below.

TABLE 7

| Total socket count | Connection-established socket count | In-segment error count | Retransmission count | Number of transmitted segments |
|---|---|---|---|---|
| 15 | 10 | 18 | 17 | 1000 |

Referring to <Table 7>, the total count of TCP sockets is 15, the connection-established socket count is 10, the in-segment error count is 18, the retransmission count is 17, and the number of transmitted segments is 1000. According to an embodiment, at time T1, the client 501 may retransmit 2255-2 to 2255-4 after failing to transmit data 1 (2255-1) to the server 503. The count of TCP sockets and the number of segments at T1 are as shown in <Table 8> below.

TABLE 8

| Total socket count | Connection-established socket count | In-segment error count | Retransmission count | Number of transmitted segments |
|---|---|---|---|---|
| 15 | 10 | 18 | 19 | 1003 |

Referring to <Table 8>, the processor 120 may identify that as time changes from T0 to T1, the retransmission count is increased from 17 to 19. The processor 120 may identify that the retransmission count is increased as in the result described above, and determine that a backhaul failure has occurred.

Figure 23:
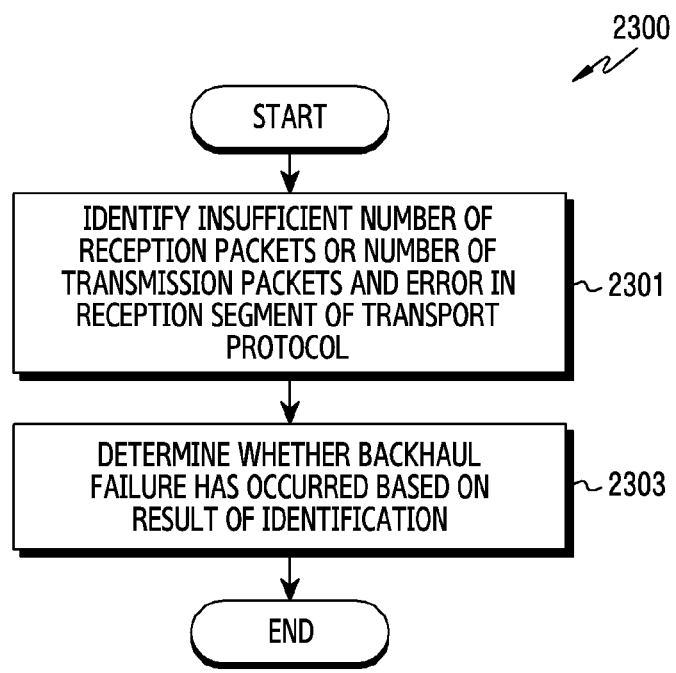
FIG. 23 illustrates a flowchart 2300 of an electronic device for determining whether a backhaul failure has occurred based on a reception error of a transport protocol according to various embodiments of the disclosure.

FIG. 23 illustrates a flowchart 2300 of an electronic device for determining whether a backhaul failure has occurred based on a reception error of a transport protocol according to various embodiments of the disclosure. In the following embodiment, the operations may be sequentially performed, but are not necessarily sequentially performed. For example, the sequential position of each operation may be changed, or at least two operations may be performed in parallel. Operation 2301 of FIG. 23 is a part of operation 1701 of FIG. 17, operation 2303 of FIG. 23 is a part of operation 1703 of FIG. 17, and the entity performing the operations illustrated in flowchart 2300 may be understood to be the electronic device 101 or a component (e.g., a processor 120) of the electronic device 101.

Referring to FIG. 23, in operation 2301, the electronic device (e.g., the processor 120 of FIG. 1) according to various embodiments may identify an insufficient number of reception packets or an insufficient number of transmission packets, and an error in a reception segment of a transport protocol. For example, in a deteriorated transmission and reception environment, the processor 120 may identify that a count of errors in the reception segment increases. In an embodiment, the state of the transport protocol is shown FIG. 24A. In the graph 2400 in FIG. 24A, the horizontal axis indicates a polling cycle 2404, and the vertical axis indicates a count 2402. For example, during the polling cycle, the processor 120 may identify that each of the count of transport protocol transmission packets 2406 and the count of transport protocol reception packets 2408 has a low value and that a count of errors in a reception segment of a transport protocol 2410 increases. For example, in FIG. 24A, the processor 120 may identify that: when the polling cycle 2404 changes from 3 to 4, i.e., at the time when the polling cycle 2404 changes from 3 to 4, the count of errors in the reception segment of the transport protocol 2410 increases from 0 to 2; when the polling cycle 2404 changes from 6 to 7, i.e., at the time when the polling cycle 2404 changes from 6 to 7, the count of errors in the reception segment of the transport protocol 2410 changes from 0 to 1; and while the polling cycle 2404 changes from 4 to 7, the count of transport protocol reception packets 2408 remains at 2. According to a result of the identification described above, the processor 120 may identify that the count of transport protocol reception packets 2408 is relatively low and that the count of errors in the reception segment of the transport protocol 2410 is high.

Figure 24A:
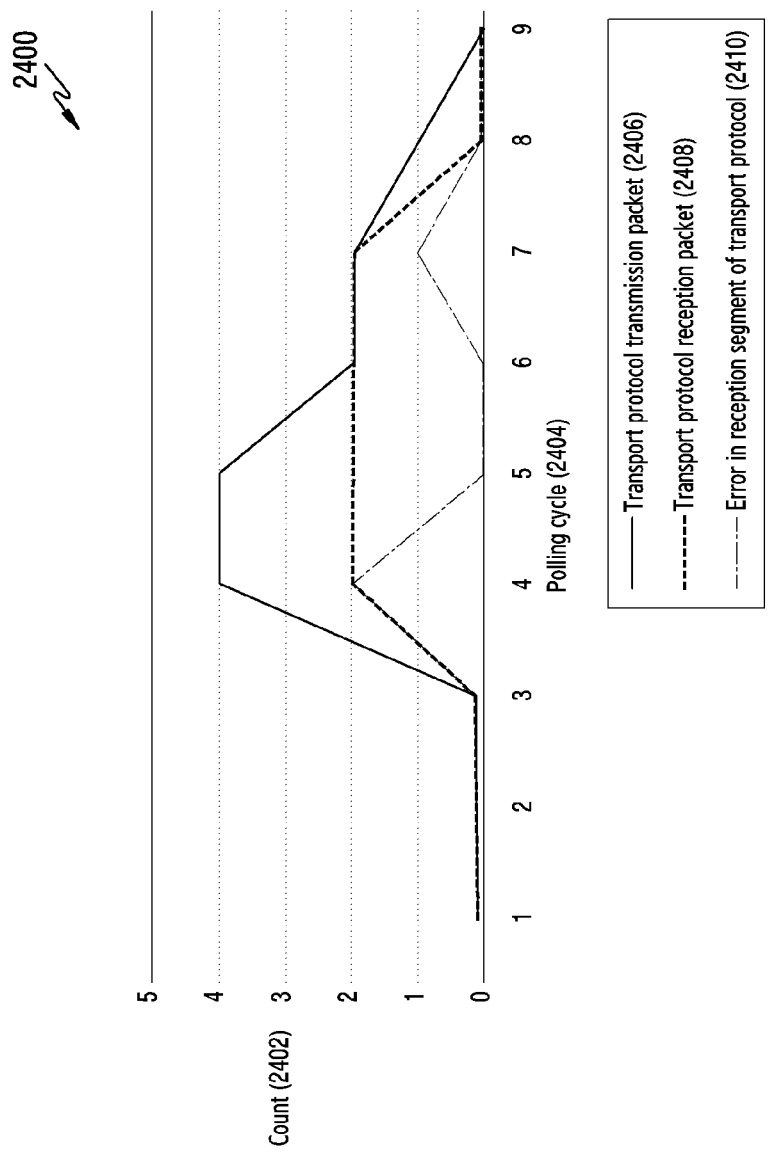
FIG. 24A illustrates a graph 2400 indicating an example of determining whether a backhaul failure has occurred based on a reception error of a transport protocol according to various embodiments of the disclosure.
Figure 24B:
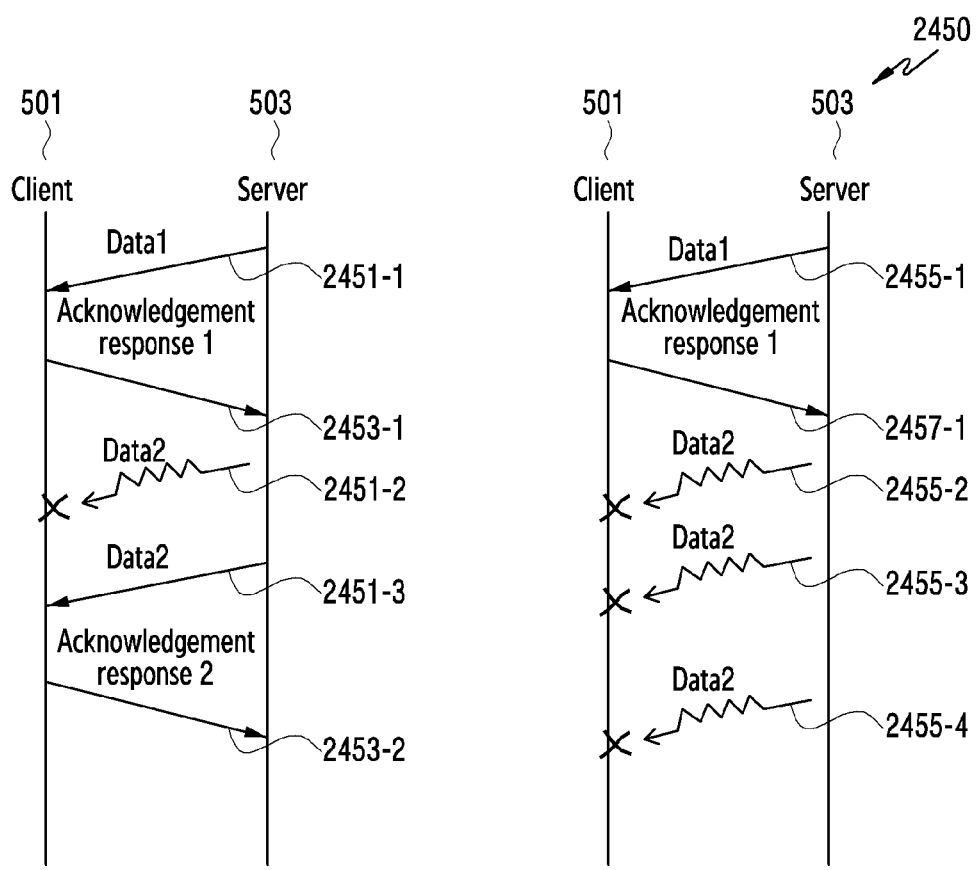
FIG. 24B illustrates a sequence diagram 2450 indicating an example of determining whether a backhaul failure has occurred based on a reception error of a transport protocol according to various embodiments of the disclosure.

According to various embodiments, in operation 2303, the processor 120 may determine whether a backhaul failure has occurred based on a result of identification. For example, as shown in FIG. 24B, the processor 120 may identify that the count of in-segment errors of the transport protocol increases as time passes, and may determine that a backhaul failure has occurred. For example, at time T0, a server (e.g., the server 503 of FIG. 5) may transmit pieces of data 2451-1 to 2451-3 to a client (e.g., the client 501 of FIG. 5). In an embodiment, the server 503 may retransmit 2451-3 data 2 after failing to transmit data 2 (2451-3). The client 501 may receive the pieces of data from the server 503 and transmit acknowledgement responses 2453-1 and 2453-2 to the pieces of data to the server 503. The count of TCP sockets and the number of transmitted segments at T0 are as shown in <Table 9> below.

TABLE 9

| Total socket count | Connection-established socket count | In-segment error count | Retransmission count | Number of received segments |
| --- | --- | --- | --- | --- |
| 15 | 10 | 18 | 17 | 1000 |

Referring to <Table 9>, the total count of TCP sockets is 15, the connection-established socket count is 10, the in-segment error count is 18, the retransmission count is 17, and the number of received segments is 1000. According to an embodiment, at time T1, the server 503 may transmit data 1 (2455-1) to the client 501, and the client 501 may transmit an acknowledgment response 2457-1 to the data 1 to the server 503. In an embodiment, the server 503 may attempt transmission 2455-2 to 2455-3 of data 2, but the client 501 may fail to receive data 2. The count of TCP sockets and the number of segments T1 are as shown in <Table 10> below.

TABLE 10

| Total socket count | Connection-established socket count | In-segment error count | Retransmission count | Number of received segments |
| --- | --- | --- | --- | --- |
| 15 | 10 | 20 | 17 | 1002 |

Referring to <Table 10>, the processor 120 may identify that since the client 501 has failed to receive data from the server 503, the in-segment error count is increased from 18 to 20, and the number of received segments is increased from 1000 to 1002. As described above, the processor 120 may identify that the count of errors in the reception segment increases and may determine that a backhaul failure has occurred. Hereinafter, FIGS. 25 to 31 illustrate various controlling operations performed to cope with the backhaul failure when the electronic device 101 has determined the backhaul failure.

Figure 25:
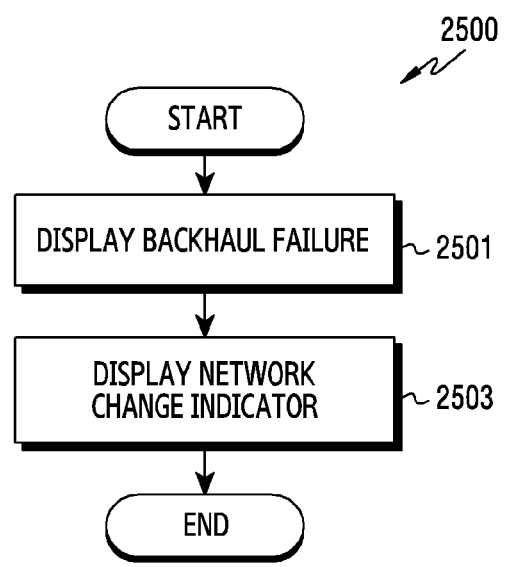
FIG. 25 illustrates a flowchart 2500 of an electronic device displaying a backhaul failure and a network change indicator according to various embodiments of the disclosure.

FIG. 25 illustrates a flowchart 2500 of an electronic device displaying a backhaul failure and a network change indicator according to various embodiments of the disclosure. In the following embodiment, the operations may be sequentially performed, but are not necessarily sequentially performed. For example, the sequential position of each operation may be changed, or at least two operations may be performed in parallel. FIG. 25 is a part of operation 1705 of FIG. 17, and the entity performing the operations illustrated in flowchart 2500 may be understood to be the electronic device 101 or a component (e.g., a processor 120) of the electronic device 101.

Referring to FIG. 25, in operation 2501, the electronic device (e.g., the processor 120 of FIG. 1) according to various embodiments may display a backhaul failure. For example, the processor 120 may display the backhaul failure, determined based on the state of the transport protocol and the count of sockets of the transport protocol, on a display device (e.g., the display device 160 of FIG. 1) of the electronic device 101. In various embodiments, the display of the backhaul failure may include a message indicating that the Internet connection of the electronic device 101 is lost.

Figure 26:
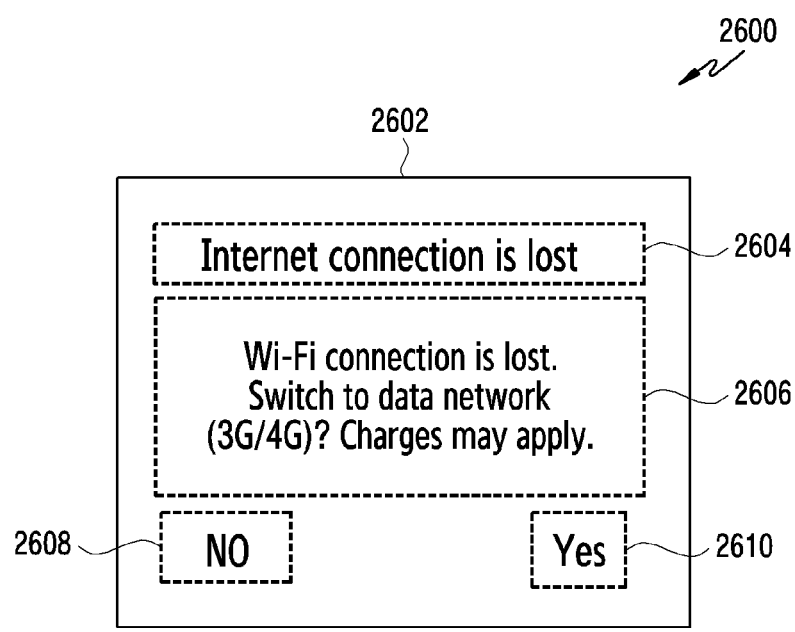
FIG. 26 illustrates an example 2600 of an interface of an electronic device, the interface displaying a network change indicator at the time of a backhaul failure according to various embodiments of the disclosure.
Figure 27:
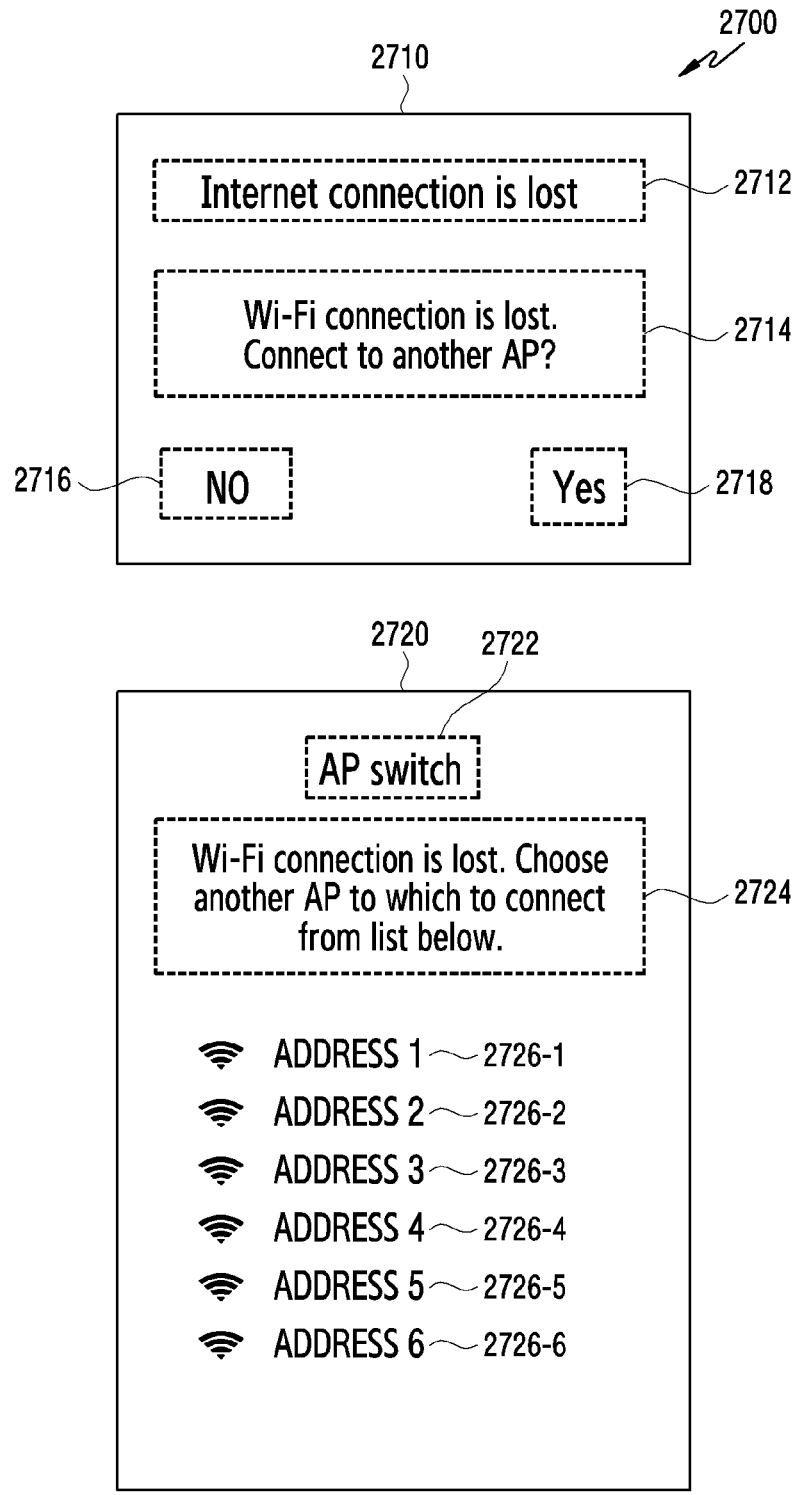
FIG. 27 illustrates an example 2700 of an interface of an electronic device, the interface displaying a change to another access point (AP) at the time of a backhaul failure according to various embodiments of the disclosure.
Figure 28:
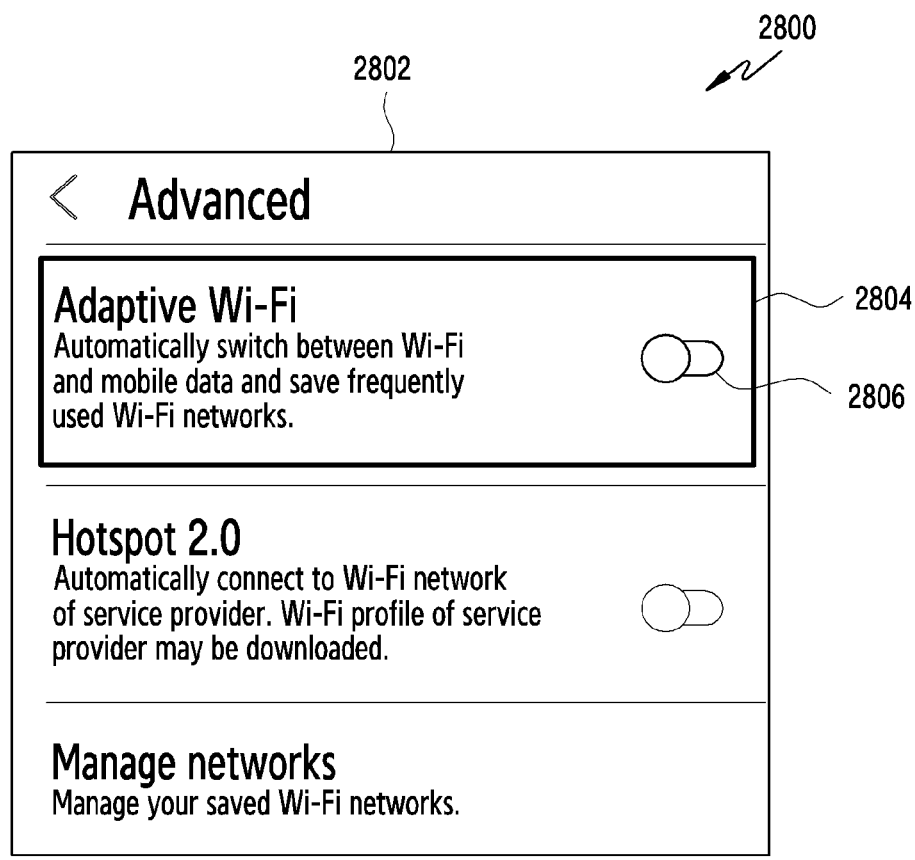
FIG. 28 illustrates an example 2800 of an interface of an electronic device, the interface displaying a network change indicator as an option at the time of a backhaul failure according to various embodiments of the disclosure.

According to various embodiments, in operation 2503, the processor 120 may display a network change indicator. For example, the processor 120 may display a message indicating whether to change the network from a Wi-Fi network to a cellular network, and at least one indicator which allows changing of the network upon a user's selection, on the display device 160. FIGS. 26 to 28, which will be described below, shows examples of displaying the backhaul failure and the network change indicator on the display device 160 of the electronic device 101.

FIG. 26 illustrates an example 2600 of an interface of an electronic device, the interface displaying a network change indicator at the time of a backhaul failure according to various embodiments of the disclosure.

Referring to FIG. 26, the processor 120 may display an interface 2602 displaying a network change indicator at the time of a backhaul failure on a display device 160. For example, the interface 2602 may include an indicator 2604 including a message indicating that the Internet connection is lost due to the backhaul failure, an indicator 2606 including a message prompting the user to select whether to change the network from a Wi-Fi network to a cellular network and precautions such as charges due to the network change, a first change indicator 2608, for not changing the network upon a user's input, and a second change indicator 2610, for changing the network upon a user's input. When the user selects the second change indicator 2610 as an input, the network may be switched from the Wi-Fi network to the cellular network after detecting the backhaul failure.

FIG. 27 illustrates an example 2700 of an interface of an electronic device, the interface displaying a change to another access point (AP) at the time of a backhaul failure according to various embodiments of the disclosure.

Referring to FIG. 27, the processor 120 may display an interface 2710, displaying an indicator indicating a change to another AP at the time of a backhaul failure, on a display device 160. For example, the interface 2710 may include an indicator 2712 including a message indicating that the Internet connection is lost due to the backhaul failure, an indicator 2714 including a message asking whether to change to another AP due to the lost Wi-Fi connection, a first change indicator 2716 for not changing the network upon a user's input, and a second change indicator 2718 for changing the network upon a user's input. The electronic device 101 may guide the user through a user interface to connect to another neighboring AP by changing the AP from a currently connected AP. In an embodiment, at the time of the backhaul failure, the processor 120 may guide a user to change to another AP by displaying addresses of other APs on the interface 2720. For example, the interface 2720 may include an indicator 2722 indicating an AP change, an indicator 2724 including a message guiding to change to another AP, and addresses 2726-1 to 2726-6 of other APs. In an embodiment, other APs recommended to the user may include an AP, the network quality of which is excellent (e.g., a normally operating backhaul network). When the user selects one of the addresses of other APs on the interface 2720, the processor 120 may attempt connection to an AP having the corresponding address. In an embodiment, the interface 2720 may include an indicator (not shown) displaying an address of an external device to which information on the backhaul failure is to be transmitted. The external device to which information on the backhaul failure is to be transmitted may include an external device identified in FIG. 29 to be described below.

FIG. 28 illustrates an example 2800 of an interface of an electronic device, the interface displaying a network change indicator as an option at the time of a backhaul failure according to various embodiments of the disclosure.

Figure 29:
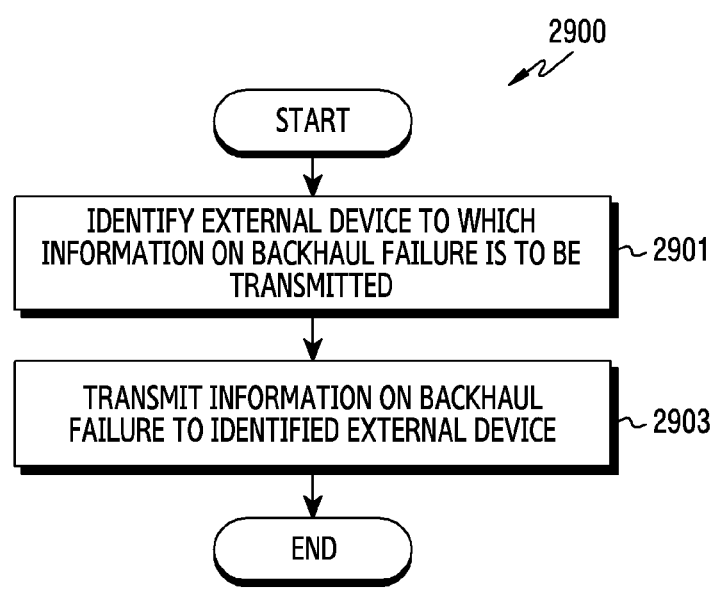
FIG. 29 illustrates a flowchart 2900 of an electronic device for sharing information on a backhaul failure with other electronic devices according to various embodiments of the disclosure.
Figure 30A:
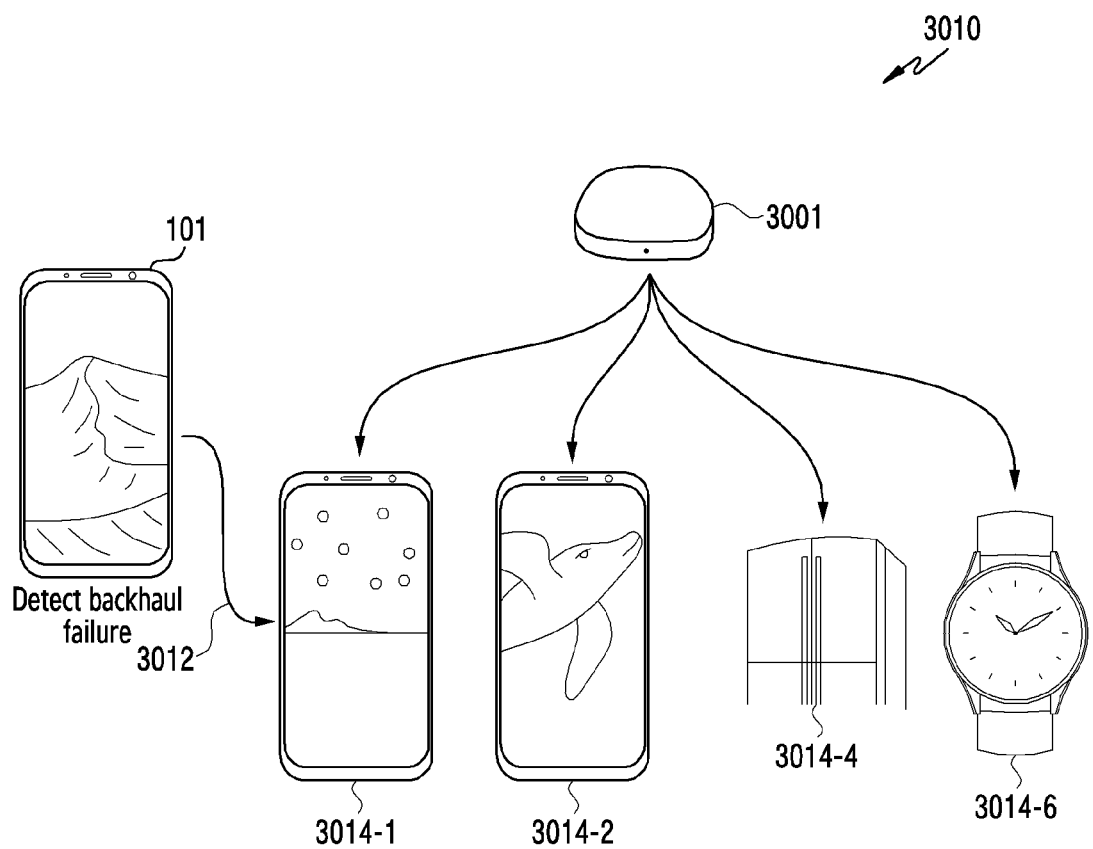
FIG. 30A illustrates an example 3010 of sharing, at the time of the backhaul failure, information on a backhaul failure with another electronic device connected to the same AP according to various embodiments of the disclosure.
Figure 30B:
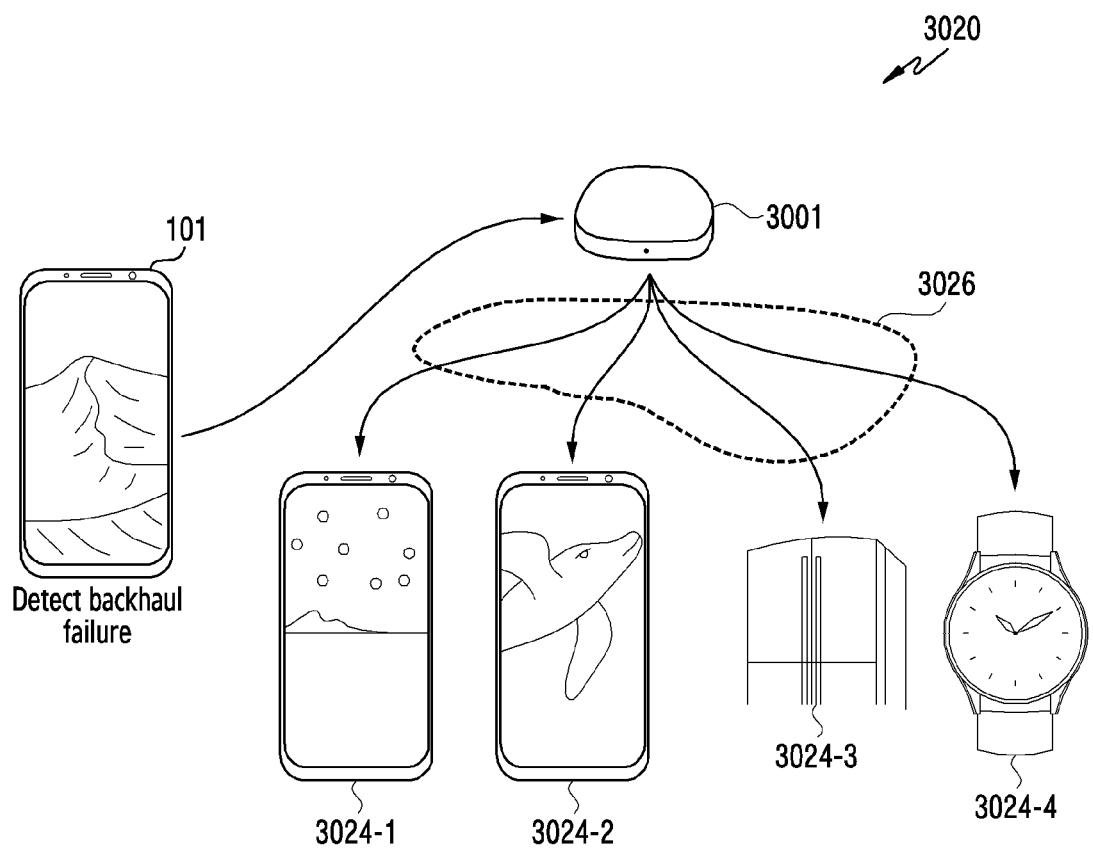
FIG. 30B illustrates an example 3020 of sharing, at the time of the backhaul failure, information on a backhaul failure with another electronic device connected to the same AP according to various embodiments of the disclosure.
Figure 31:
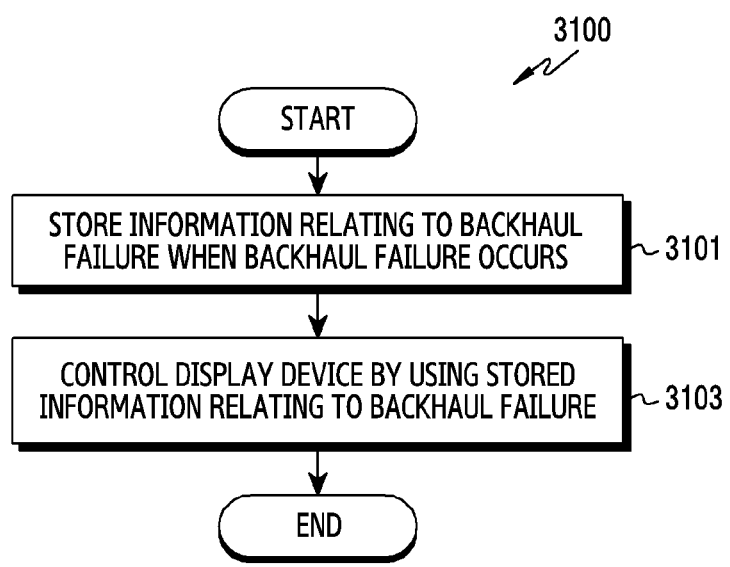
FIG. 31 illustrates a flowchart 3100 of an electronic device for storing information relating to a backhaul failure and providing service according to various embodiments of the disclosure.

Referring to FIG. 28, at the time of a backhaul failure, the processor 120 may produce an operation of automatically changing a network as an option and provide the produced operation to a user. In an embodiment, an interface 2802 may include a network automatic change indicator 2804 including a message providing notification of automatically changing a network at the time of the backhaul failure, and a change indicator 2806. In the case in which the change indicator 2806 is activated by a user's input, when detecting the backhaul failure, the processor 120 may automatically change the network without displaying a separate notification window. For example, when the backhaul failure occurs, the processor 120 may change the network from a currently connected Wi-Fi network to a cellular network or to another frequently used Wi-Fi network. In the case in which the change indicator 2806 is deactivated, even though the backhaul failure occurs, the processor 120 may not automatically change the network. FIGS. 29 to 31, which will be described below, illustrate an operation of the electronic device 101 which shares information on the backhaul failure with other electronic devices, or provides service according to the backhaul failure, at the time of the backhaul failure.

FIG. 29 illustrates a flowchart 2900 of an electronic device for sharing information on a backhaul failure with other electronic devices according to various embodiments of the disclosure. In the following embodiment, the operations may be sequentially performed, but are not necessarily sequentially performed. For example, the sequential position of each operation may be changed, or at least two operations may be performed in parallel. FIG. 29 is a part of operation 1705 of FIG. 17, and the entity performing the operations illustrated in flowchart 2900 may be understood to be the electronic device 101 or a component (e.g., a processor 120) of the electronic device 101.

Referring to FIG. 29, in operation 2901, the electronic device (e.g., the processor 120 of FIG. 1) according to various embodiments may identify an external device to which information on the backhaul failure is to be transmitted. For example, the external device may be an AP connected to the electronic device 101, devices included in the same network, devices registered based on a common account, or irrelevant devices. In an embodiment, the devices registered based on the common account may be devices belonging to one IoT cloud account. In an embodiment, the external device to which information on the backhaul failure is to transmitted may be electronic devices performing communication using a neighbor awareness network (NAN). In an embodiment, information on the external device to which information on the backhaul failure is to be transmitted may be managed in a server. For example, the server may identify the external device to which information on the backhaul failure is to be transmitted and transmit information (e.g., an address) on the identified external device to the electronic device 101, so that the electronic device 101 transmits information on the backhaul failure to the corresponding external device.

According to various embodiments, in operation 2903, the processor 120 may transmit information on the backhaul failure to the identified external device. In an embodiment, the electronic device 101 may transmit information on the backhaul failure to other devices connected to the same AP, as shown in the example 3010 of FIG. 30A. For example, the electronic device 101 may detect the backhaul failure, and may transmit information on the detected backhaul failure to an electronic device 3014-1 connected to an AP 3001 to which the electronic device 101 is connected. Although not illustrated, the electronic device 3014-1 that receives information on the backhaul failure from the electronic device 101 may share the information on the backhaul failure with other electronic devices 3014-2 to 3014-6. In an embodiment, the electronic device 101 may transmit information on the backhaul failure to an AP 3001 connected to the electronic device 101, as shown in the example 3020 of FIG. 30B. For example, after the AP 3001 connected to the electronic device 101 receives the information on the backhaul failure, the AP 3001 may transmit 3026 the received information on the backhaul failure to other electronic devices 3024-1 to 3024-4 connected to the AP 3001. As shown in the examples of FIGS. 30A and 30B, the electronic device 101 may share information on the backhaul failure with devices connected to the same AP. In an embodiment, the processor 120 may share the information on the backhaul failure with an external electronic device via a non-connection-based information-sharing scheme using a NAN.

FIG. 31 illustrates a flowchart 3100 of an electronic device for storing information relating to a backhaul failure and providing service according to various embodiments of the disclosure. In the following embodiment, the operations may be sequentially performed, but are not necessarily sequentially performed. For example, the sequential position of each operation may be changed, or at least two operations may be performed in parallel. FIG. 31 is a part of operation 1705 of FIG. 17, and the entity performing the operation illustrated in flowchart 3100 may be understood to be the electronic device 101 or a component (e.g., a processor 120) of the electronic device 101.

Referring to FIG. 31, in operation 3101, the electronic device (e.g., the processor 120 of FIG. 1) according to various embodiments may store information relating to the backhaul failure when a backhaul failure occurs. For example, whenever a backhaul failure occurs, the processor 120 may store information (e.g., name and security information) relating to the AP in which the backhaul failure occurs, geofence information pertaining to the corresponding AP, signal quality information (e.g., the signal strength, channel information, etc.), information (e.g., device names, signal strength of respective devices, location information of devices, etc.) on neighboring devices at the time of backhaul failure, information on what numberth time the backhaul failure has occurred, and the like. In an embodiment, the processor 120 may detect a location, an AP, or the like where the backhaul failure frequently occurs using the stored information.

According to various embodiments, in operation 3103, the processor 120 may control a display device by using the stored information relating to the backhaul failure. For example, the processor 120 may detect a location, an AP, or the like, where the backhaul failure frequently occurs by using the stored information relating to the backhaul failure, and display an indicator indicating an alert on a display device (e.g., the display device 160 of FIG. 1) in advance before the electronic device 101 reaches the location, or may display an AP where the backhaul failure frequently occurs, in a connectable AP list so that the AP has lower priority in the list.

Figure 32:
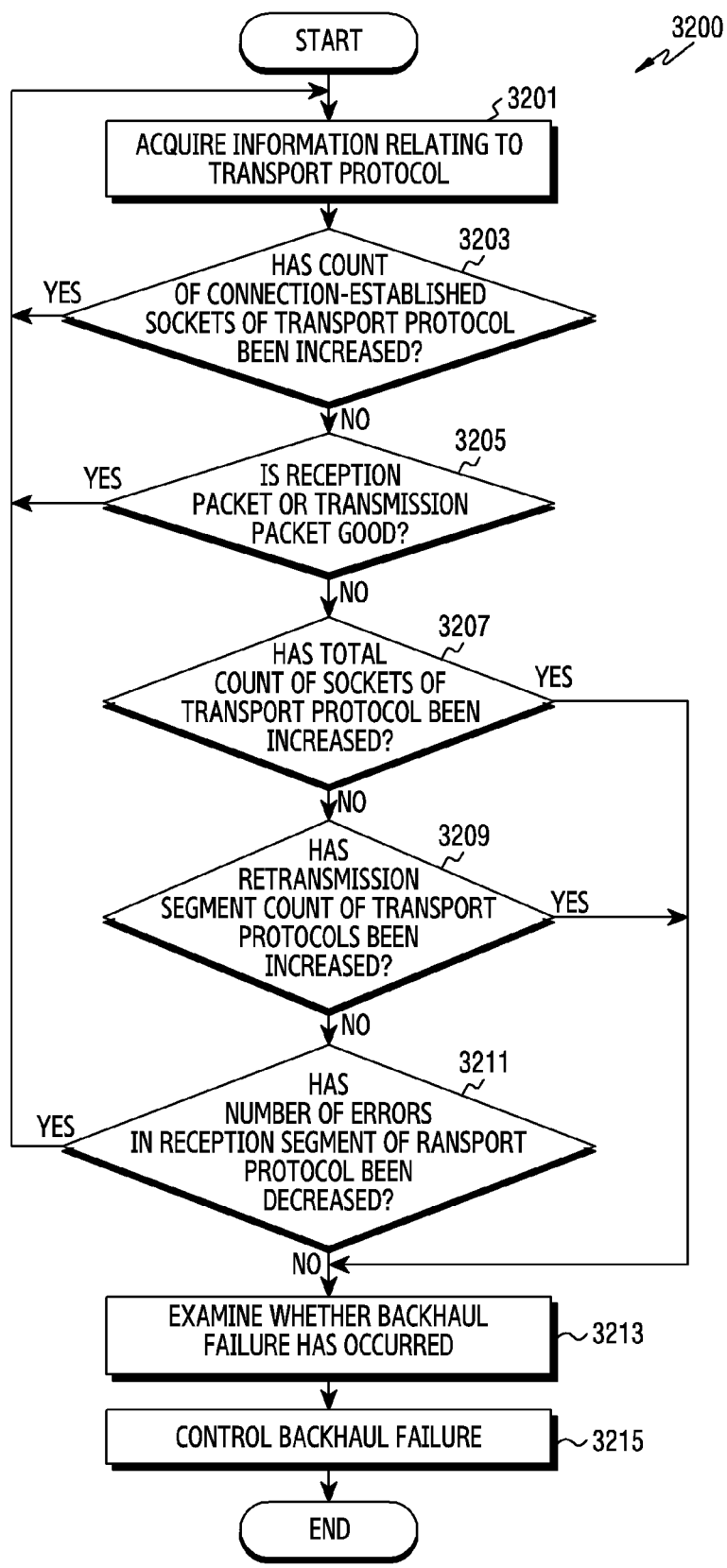
FIG. 32 illustrates a flowchart 3200 of an electronic device for examining whether a backhaul failure has occurred and controlling a backhaul failure according to various embodiments of the disclosure.

FIG. 32 illustrates a flowchart 3200 of an electronic device for examining whether a backhaul failure has occurred and controlling a backhaul failure according to various embodiments of the disclosure. In the following embodiment, the operations may be sequentially performed, but are not necessarily sequentially performed. For example, the sequential position of each operation may be changed, or at least two operations may be performed in parallel. The entity performing the operations illustrated in flowchart 3200 may be understood to be the electronic device 101 or a component (e.g., a processor 120) of the electronic device 101.

Referring to FIG. 32, in operation 3201, the electronic device (e.g., the processor 120 of FIG. 1) according to various embodiments may acquire information relating to a transport protocol. For example, the information relating to the transport protocol may include at least one piece of information on the total count of TCP sockets, a count of sockets in a connection-established state, the number of reception packets and the number of transmission packets, a count of retransmission segments of a TCP socket, or a count of reception segments of a TCP socket.

According to various embodiments, in operation 3203, the processor 120 may identify whether the count of connection-established sockets of a transport protocol increases. For example, as time passes, the processor 120 may identify whether the connection-established socket count indicating the connection-established state among states of the TCP socket increases. When the count of connection-established sockets of a transport protocol increases, the processor 120 may again perform an operation of acquiring information relating to the transport protocol. When the count of connection-established sockets of a transport protocol does not increase, the processor 120 may perform operation 3205.

According to various embodiments, in operation 3205, the processor 120 may identify whether a reception packet or a transmission packet has no problem. In various embodiments, when the reception packet or the transmission packet has no problem, it may indicate that there is no shortage in the number of reception packets or the number of transmission packets. For example, as time passes, the processor 120 may identify that the number of reception packets or the number of transmission packets is no longer increasing, or that the increasing trend is gentle, and may accordingly determine that the number of reception packets or the number of transmission packets is insufficient. When the reception packet or the transmission packet is good, i.e., when there is no shortage in the number of reception packets or the number of transmission packets, the processor 120 may perform an operation of acquiring information relating to the transport protocol again. When the reception packet or the transmission packet is not good, i.e., when the number of reception packets or the number of transmission packets is insufficient, the processor 120 perform operation 3207.

According to various embodiments, in operation 3207, the processor 120 may identify whether the total count of sockets of a transport protocol increases. For example, the processor 120 may identify whether the total count of TCP sockets increases based on the acquired information relating to the transport protocol. In an embodiment, as time passes, the processor 120 may identify whether the total count of TCP sockets increases. When the total count of sockets of a transport protocol increases, the processor 120 may perform operation 3213. When the total count of sockets of the transport protocol does not increase, the processor 120 may perform operation 3209.

According to various embodiments, in operation 3209, the processor 120 may identify whether the retransmission segment count of transport protocols increases. For example, when data transmission to a server (e.g., the server 503 of FIG. 5) fails due to deteriorated quality of a transmission packet and a reception packet, the processor 120 may retransmit the failed data and identify an increase in the retransmission segment count of transport protocols according to the retransmission. When the retransmission segment count of transport protocols increases, the processor 120 may perform operation 3213. When the retransmission segment count of transport protocols does not increase, the processor 120 may perform operation 3211.

According to various embodiments, in operation 3211, the processor 120 may identify whether the number of errors in a reception segment of a transport protocol decreases. In an embodiment, when data reception from the server 503 fails due to the deteriorated quality of a transmission packet and a reception packet, the processor 120 may identify that the number of errors in the reception segment of the transport protocol increases. When the number of errors in the reception segment of the transport protocol decreases, i.e., when the number of errors in the reception segment of the transport protocol does not increase, the processor 120 may again acquire information relating to the transport protocol. When the number of errors in the reception segment of the transport protocol does not decrease, i.e., when the number of errors in the reception segment of the transport protocol increases, the processor 120 may perform operation 3213.

According to various embodiments, in operation 3213, the processor 120 may examine whether backhaul failure has occurred. For example, when the total count of sockets of the transport protocol increases, but the count of connection-established sockets of a transport protocol does not increase, the processor 120 may examine whether there is a backhaul failure and determine that a backhaul failure has occurred. The processor 120 may identify that number of the reception packets or the number of transmission packets of the transport protocol is insufficient and that the retransmission segment count of sockets of the transport protocol increases, or that the number of errors in the reception segment of the transport protocol increases, and may determine that a backhaul failure has occurred after examining the backhaul failure.

According to various embodiments, in operation 3215, the processor 120 may control the backhaul failure. For example, the processor 120 may determine that a backhaul failure has occurred and display a network change indicator for indicating the backhaul failure and a network change according to the backhaul failure on a display device (e.g., the display device 160 of FIG. 1) of the electronic device 101. In an embodiment, the processor 120 may share information on the backhaul failure with the identified external device, store the information on the backhaul failure, and display the stored information on the backhaul failure on the display device so as to alert the user to the backhaul failure. FIGS. 33 to 39, which will be described below, illustrate in detail the implemented operation of the electronic device 101 to examine a backhaul state.

Figure 33:
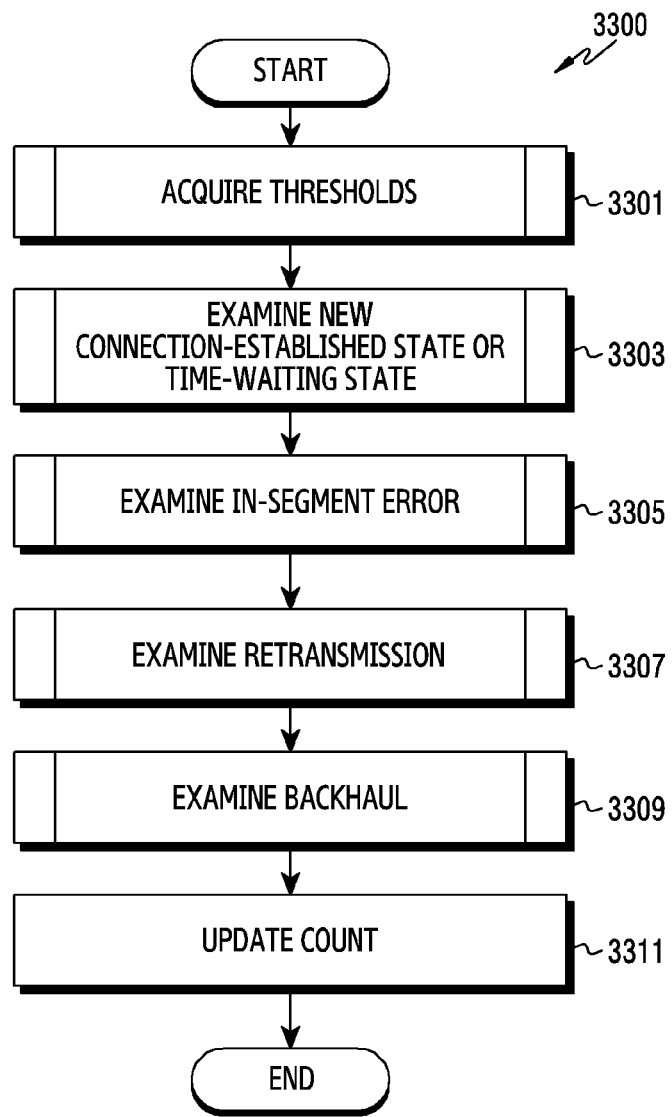
FIG. 33 illustrates a flowchart 3300 of an electronic device illustrating an implementation procedure for examining whether a backhaul failure has occurred according to various embodiments of the disclosure.

FIG. 33 illustrates a flowchart 330 of an electronic device illustrating an implementation procedure for examining whether a backhaul failure has occurred according to various embodiments of the disclosure. In the following embodiment, the operations may be sequentially performed, but are not necessarily sequentially performed. For example, the sequential position of each operation may be changed, or at least two operations may be performed in parallel. The entity performing the operations illustrated in flowchart 3300 may be understood to be the electronic device 101 or a component (e.g., a processor 120) of the electronic device 101.

Referring to FIG. 33, in operation 3301, the electronic device (e.g., the processor 120 of FIG. 1) according to various embodiments may acquire thresholds. For example, the thresholds may include thresholds related to reception signal strength, a backhaul connection examination, a reception segment, and a transmission segment.

According to various embodiments, in operation 3303, the processor 120 may examine a new connection-established state or a time-waiting state. For example, the processor 120 may identify an increase in the count of connection-established TCP sockets and examine the new connection-established state. The processor 120 may identify an increase in the time-waiting state count of TCP sockets and examine a new time-waiting state.

According to various embodiments, in operation 3305, the processor 120 may examine an in-segment error. For example, the processor 120 may identify that a segment error occurs due to deteriorated reception quality, which may be caused by the lack of reception packets.

According to various embodiments, in operation 3307, the processor 120 may examine retransmission. For example, the processor 120 may identify that the retransmission occurs due to the deteriorated transmission quality which may be caused by the lack of transmission packets.

According to various embodiments, in operation 3309, the processor 120 may examine backhaul. For example, the processor 120 may examine the backhaul which indicates a state in which an AP connected to the electronic device 101 is connected to the Internet.

According to various embodiments, in operation 3311, the processor 120 may update a count. For example, the processor 120 may update: a previous TCP connection-established count to a current TCP connection-established count; a previous time-waiting count to a current time-waiting count; a previous TCP in-use count to a current TCP in-use count; a previous in-segment error count to a current in-segment error count; a previous in-segment count to a current in-segment count; and a previous out-segment count to a current out-segment count.

Figure 34:
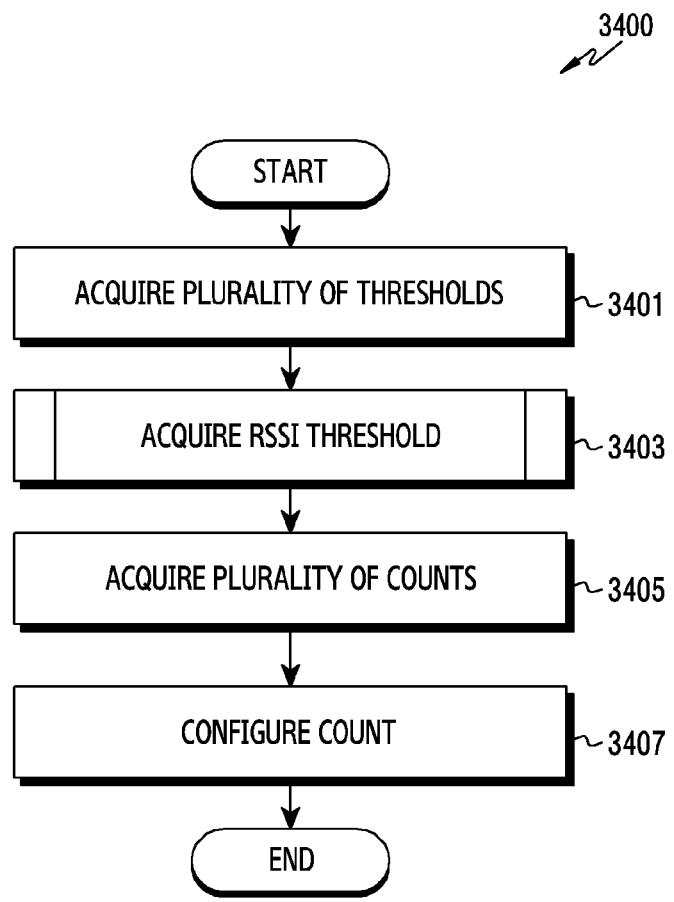
FIG. 34 illustrates a flowchart 3400 of an electronic device for acquiring a threshold according to various embodiments of the disclosure.

FIG. 34 illustrates a flowchart 3400 of an electronic device for acquiring a threshold according to various embodiments of the disclosure. In the following embodiment, the operations may be sequentially performed, but are not necessarily sequentially performed. For example, the sequential position of each operation may be changed, or at least two operations may be performed in parallel. FIG. 34 is a part of operation 3301 of FIG. 33, and the entity performing the operations illustrated in flowchart 3400 may be understood to be the electronic device 101 or a component (e.g., a processor 120) of the electronic device 101.

Referring to FIG. 34, in operation 3401, the electronic device (e.g., the processor 120 of FIG. 1) according to various embodiments may acquire a plurality of thresholds. For example, the plurality of thresholds may include: RSSI_POOR_SIGNAL_THRESHOLD=−83; RSSI_LOW_SIGNAL_THRESHOLD=−70; THRESHOLD BACKHAUL_CONNECTIVITY_CHECK_HIGH=5; THRESHOLD BACKHAUL_CONNECTIVITY_CHECK_LOW=2; THRESHOLD BACKHAUL_CONNECTIVITY_CHECK_POOR=2; TCP_POOR_SEG_RX=0; THRESHOLD_TCP_POOR_SEG_RX_TX=15; THRESHOLD_WAITING_CYCLE_CHECK_HIGH=5; THRESHOLD_WAITING_CYCLE_CHECK_HIGH=3; THRESHOLD_WAITING_CYCLE_CHECK_POOR=2; and THRESHOLD_MAX_WAITING_CYCLE=60.

According to various embodiments, in operation 3403, the processor 120 may acquire an RSSI threshold. For example, the processor 120 may compare current RSSI with a threshold to acquire the RSSI threshold.

According to various embodiments, in operation 3405, the processor 120 may acquire a plurality of counts. For example, the plurality of counts may include a current TCP connection-established count (currTcpEstablishedCount), a retransmission segment count (retransSegCount), an in-segment error count (inSegErrorCount), an in-segment count (inSegCount), an out-segment count (outSegCount), a TCP in-use count (TcpInUseCount), an orphan count (orphanCount), and a time-waiting count (timeWaitCount). In an embodiment, a current TCP connection-established count may indicate the number of TCP connections, the current state of which is the connection-established state. In an embodiment, the in-segment count may indicate the total number of received segments, including segments received in error. The in-segment count may include segments received in the current connection-established state. In an embodiment, the out-segment count may include the total number of transmitted segments including currently connected segments. The out-segment count may exclude retransmitted sockets. In an embodiment, the retransmission segment count may include the total number of retransmitted segments. The retransmission segment count may indicate the number of transmitted TCP sockets including at least one previously transmitted socket. In an embodiment, the in-segment error count may indicate the total number of segments received in error (e.g., bad TCP checksums). In an embodiment, the TCP in-use count may indicate the total number of TCP sockets, and the orphan count may exclude sockets in the time-waiting state, and may include sockets having no inode. The time-waiting count may indicate sockets in the time-waiting state.

According to various embodiments, in operation 3407, the processor 120 may configure a count. For example, the processor 120 may configure: the TCP in-use count as a difference between a TCP in-use count and an orphan count; an in-segment count difference (diffInSegCount) as a difference between an in-segment count and a previous in-segment count; an out-segment count difference (diffOutSegCount) as a difference between an out-segment count and a previous out-segment count; an in-segment error count difference (diffInSegErrorCount) as a difference between an in-segment error count and a previous in-segment error count; and a retransmission segment count difference (diffRetransSegCount) as a difference between a retransmission segment count and a previous retransmission segment count.

Figure 35:
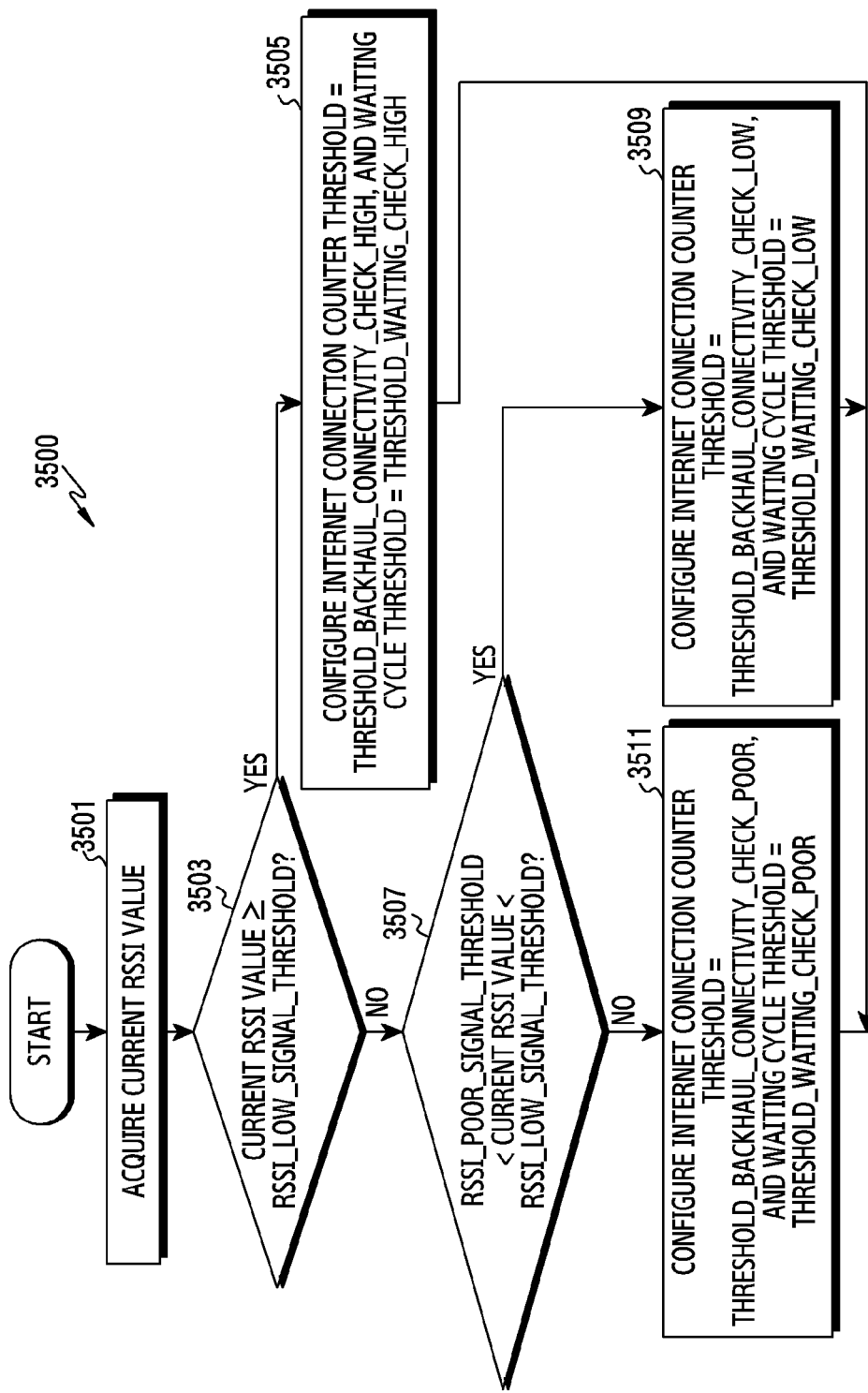
FIG. 35 illustrates a flowchart 3500 of an electronic device for acquiring a received signal strength indication (RSSI) threshold according to various embodiments of the disclosure.

FIG. 35 illustrates a flowchart 3500 of an electronic device for acquiring a received signal strength indication (RSSI) threshold according to various embodiments of the disclosure. In the following embodiment, the operations may be sequentially performed, but are not necessarily sequentially performed. For example, the sequential position of each operation may be changed, or at least two operations may be performed in parallel. FIG. 35 is a part of operation 3403 of FIG. 34, and the entity performing the operations illustrated in flowchart 3500 may be understood to be the electronic device 101 or a component (e.g., a processor 120) of the electronic device 101.

Referring to FIG. 35, in operation 3501, the electronic device (e.g., the processor 120 of FIG. 1) according to various embodiments may acquire a current RSSI value.

According to various embodiments, in operation 3503, the processor 120 may identify whether the current RSSI value is equal to or greater than RSSI_LOW_SIGNAL_THRESHOLD. When the current RSSI value is equal to or greater than RSSI_LOW_SIGNAL_THRESHOLD, the processor 120 may perform operation 3505. When the current RSSI value is not equal to or not greater than RSSI_LOW_SIGNAL_THRESHOLD, the processor 120 may perform operation 3507.

According to various embodiments, in operation 3505, the processor 120 may configure an Internet connection counter threshold as THRESHOLD_BACKHAUL_CONNECTIVITY_CHECK_HIGH and a waiting cycle threshold as THRESHOLD_WAITING_CHECK_HIGH.

According to various embodiments, in operation 3507, the processor 120 may identify that the current RSSI value is greater than RSSI_POOR_SIGNAL_THRESHOLD and smaller than RSSI_LOW_SIGNAL_THRESHOLD. When the current RSSI value is greater than RSSI_POOR_SIGNAL_THRESHOLD and smaller than RSSI_LOW_SIGNAL_THRESHOLD, the processor 120 may perform operation 3509. When the current RSSI value is not greater than RSSI_POOR_SIGNAL_THRESHOLD and not smaller than RSSI_LOW_SIGNAL_THRESHOLD, the processor 120 may perform operation 3511.

According to various embodiments, in operation 3509, the processor 120 may configure the Internet connection counter threshold as THRESHOLD_BACKHAUL_CONNECTIVITY_CHECK_LOW and the waiting cycle threshold as THRESHOLD_WAITING_CHECK_LOW.

According to various embodiments, in operation 3511, the processor 120 may configure the Internet connection counter threshold as THRESHOLD_BACKHAUL_CONNECTIVITY_CHECK_POOR and the waiting cycle threshold as THRESHOLD_WAITING_CHECK_POOR.

Figure 36:
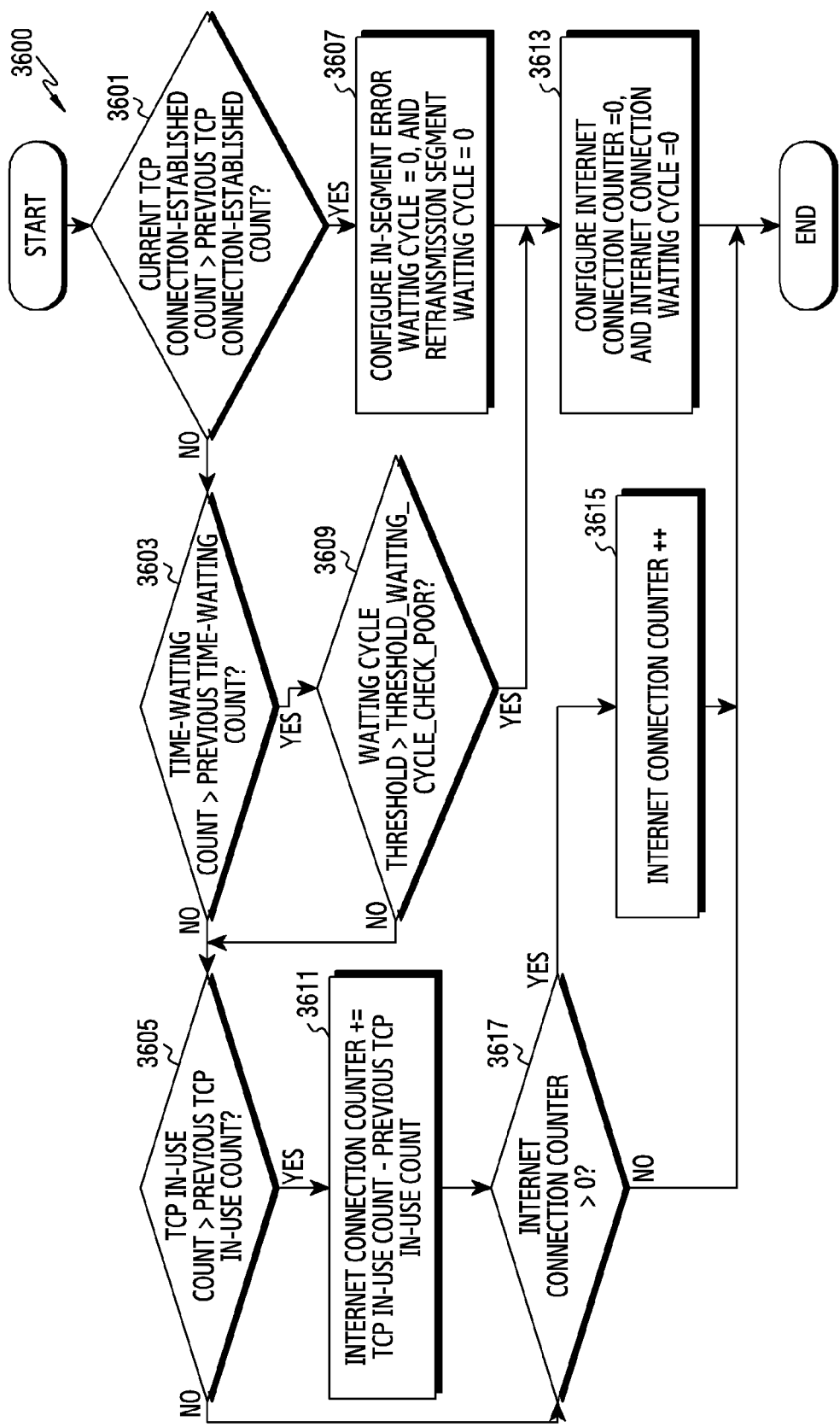
FIG. 36 illustrates a flowchart 3600 of an electronic device for examining a new connection-established state and a time-waiting state according to various embodiments of the disclosure.

FIG. 36 illustrates a flowchart 3600 of an electronic device for examining a new connection-established state and a time-waiting state according to various embodiments of the disclosure. In the following embodiment, the operations may be sequentially performed, but are not necessarily sequentially performed. For example, the sequential position of each operation may be changed, or at least two operations may be performed in parallel. FIG. 36 is a part of operation 3303 of FIG. 33, and the entity performing the operations illustrated in flowchart 3600 may be understood to be the electronic device 101 or a component (e.g., a processor 120) of the electronic device 101.

Referring to FIG. 36, in operation 3601, the electronic device (e.g., the processor 120 of FIG. 1) according to various embodiments may identify whether a current TCP connection-established count is greater than a previous TCP connection-established count. When the current TCP connection-established count is greater than the previous TCP connection-established count, the processor 120 may perform operation 3607. When the current TCP connection-established count is not greater than the previous TCP connection-established count, the processor 120 may perform operation 3603.

According to various embodiments, in operation 3603, the processor 120 may identity whether a time-waiting count is greater than a previous time-waiting count. When the time-waiting count is greater than the previous time-waiting count, the processor 120 may perform operation 3609. When the time-waiting count is not greater than the previous time-waiting count, the processor 120 may perform operation 3605.

According to various embodiments, in operation 3605, the processor 120 may identify whether a TCP in-use count is greater than a previous TCP in-use count. When the TCP in-use count is greater than the previous TCP in-use count, the processor 120 may perform operation 3611. When the TCP in-use count is not greater than the previous TCP in-use count, the processor 120 may perform operation 3617.

According to various embodiments, in operation 3607, the processor 120 may configure an in-segment error waiting cycle as 0, and a retransmission segment waiting cycle as 0.

According to various embodiments, in operation 3609, the processor 120 may identify whether a waiting cycle threshold is greater than THRESHOLD_WAITING_CYCLE_CHECK_POOR. When the waiting cycle threshold is greater than THRESHOLD_WAITING_CYCLE_CHECK_POOR, the processor 120 may perform operation 3613. When the time cycle threshold is not greater than THRESHOLD_WAITING_CYCLE_CHECK_POOR, the processor 120 may perform operation 3605.

According to various embodiments, in operation 3611, the processor 120 may configure an Internet connection counter as a value obtained by subtracting a previous TCP in-use count from the sum of the Internet connection counter and a TCP in-use count.

According to various embodiments, in operation 3613, the processor 120 may configure an Internet connection counter as 0 and an Internet connection waiting cycle as 0.

According to various embodiments, in operation 3615, the processor 120 may increase an Internet connection counter.

According to various embodiments, in operation 3617, the processor 120 may identify whether an Internet connection counter is greater than 0. When the Internet connection counter is greater than 0, the processor 120 may perform operation 3615. When the Internet connection counter is not greater than 0, the processor 120 may end the operation.

Figure 37:
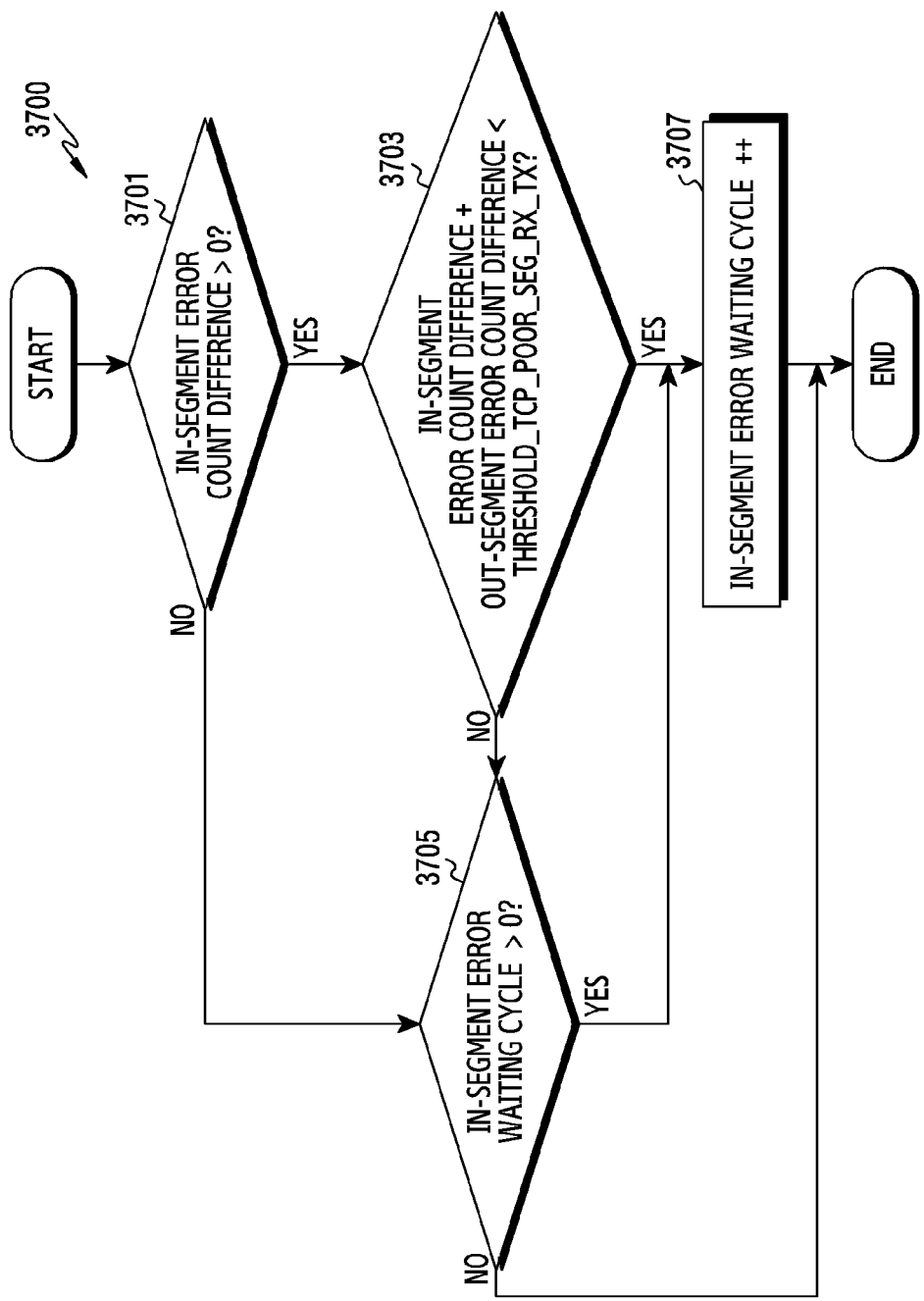
FIG. 37 illustrates a flowchart 3700 of an electronic device for examining an in-segment error and an out-segment error according to various embodiments of the disclosure.

FIG. 37 illustrates a flowchart 3700 of an electronic device for examining an in-segment error and an out-segment error according to various embodiments of the disclosure. In the following embodiment, the operations may be sequentially performed, but are not necessarily sequentially performed. For example, the sequential position of each operation may be changed, or at least two operations may be performed in parallel. FIG. 37 is a part of operation 3305 of FIG. 33, and the entity performing the operations illustrated in flowchart 3700 may be understood to be the electronic device 101 or a component (e.g., a processor 120) of the electronic device 101.

Referring to FIG. 37, in operation 3701, the electronic device (e.g., the processor 120 of FIG. 1) according to various embodiments may identify whether an in-segment error count difference is greater than 0. When the in-segment error count difference is greater than 0, the processor 120 may perform operation 3703. When the in-segment error count difference is not greater than 0, the processor 120 may perform operation 3705.

According to various embodiments, in operation 3703, the processor 120 may identify whether the sum of an in-segment error count difference and an out-segment error count difference is smaller than THRESHOLD_TCP_POOR_SEG_RX_TX. When the sum of the in-segment error count difference and the out-segment error count difference is smaller than THRESHOLD_TCP_POOR_SEG_RX_TX, the processor 120 may perform operation 3707.

When the sum of the in-segment error count difference and the out-segment error count difference is not smaller than THRESHOLD_TCP_POOR_SEG_RX_TX, the processor 120 may perform operation 3705.

According to various embodiments, in operation 3705, the processor 120 may identify whether an in-segment error waiting cycle is greater than 0. When the in-segment error waiting cycle is greater than 0, the processor 120 may perform operation 3707. When the in-segment error waiting cycle is not greater than 0, the processor 120 may end the operation.

According to various embodiments, in operation 3707, the processor 120 may increase an in-segment error waiting cycle value.

Figure 38:
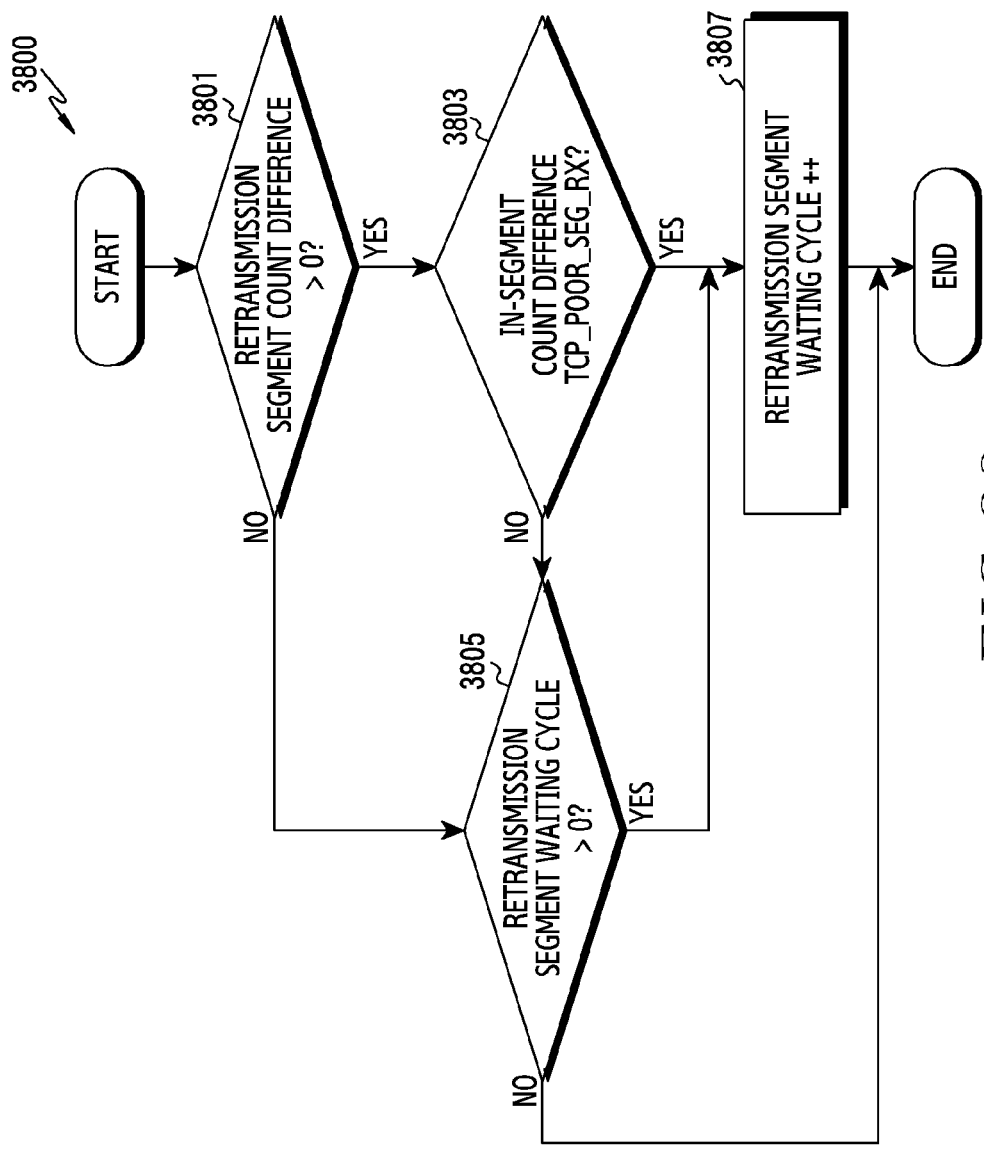
FIG. 38 illustrates a flowchart 3800 of an electronic device for examining a retransmission segment according to various embodiments of the disclosure.

FIG. 38 illustrates a flowchart 3800 of an electronic device for examining a retransmission segment according to various embodiments of the disclosure. In the following embodiment, the operations may be sequentially performed, but are not necessarily sequentially performed. For example, the sequential position of each operation may be changed, or at least two operations may be performed in parallel. FIG. 38 is a part of operation 3307 of FIG. 33, and the entity of the operations illustrated in flowchart 3800 may be understood to be the electronic device 101 or a component (e.g., processor 120) of the electronic device 101.

Referring to FIG. 38, in operation 3801, the electronic device (e.g., the processor 120 of FIG. 1) according to various embodiments may identify whether a retransmission segment count difference is greater than 0. When the retransmission segment count difference is greater than 0, the processor 120 may perform operation 3803. When the retransmission segment count difference is not greater than 0, the processor 120 may perform operation 3805.

According to various embodiments, in operation 3803, the processor 120 may identify whether an in-segment count difference is greater than TCP_POOR_SEG_RX. When the in-segment count difference is greater than TCP_POOR_SEG_RX, the processor 120 may perform operation 3807. When the in-segment count difference is not greater than TCP_POOR_SEG_RX, the processor 120 may perform operation 3805.

According to various embodiments, in operation 3805, the processor 120 may identify whether a retransmission segment waiting cycle is greater than 0. When the retransmission segment waiting cycle is greater than 0, the processor 120 may perform operation 3807. When the retransmission segment waiting cycle is not greater than 0, the processor 120 may end the operation.

According to various embodiments, in operation 3807, the processor 120 may increase a retransmission segment waiting cycle.

Figure 39:
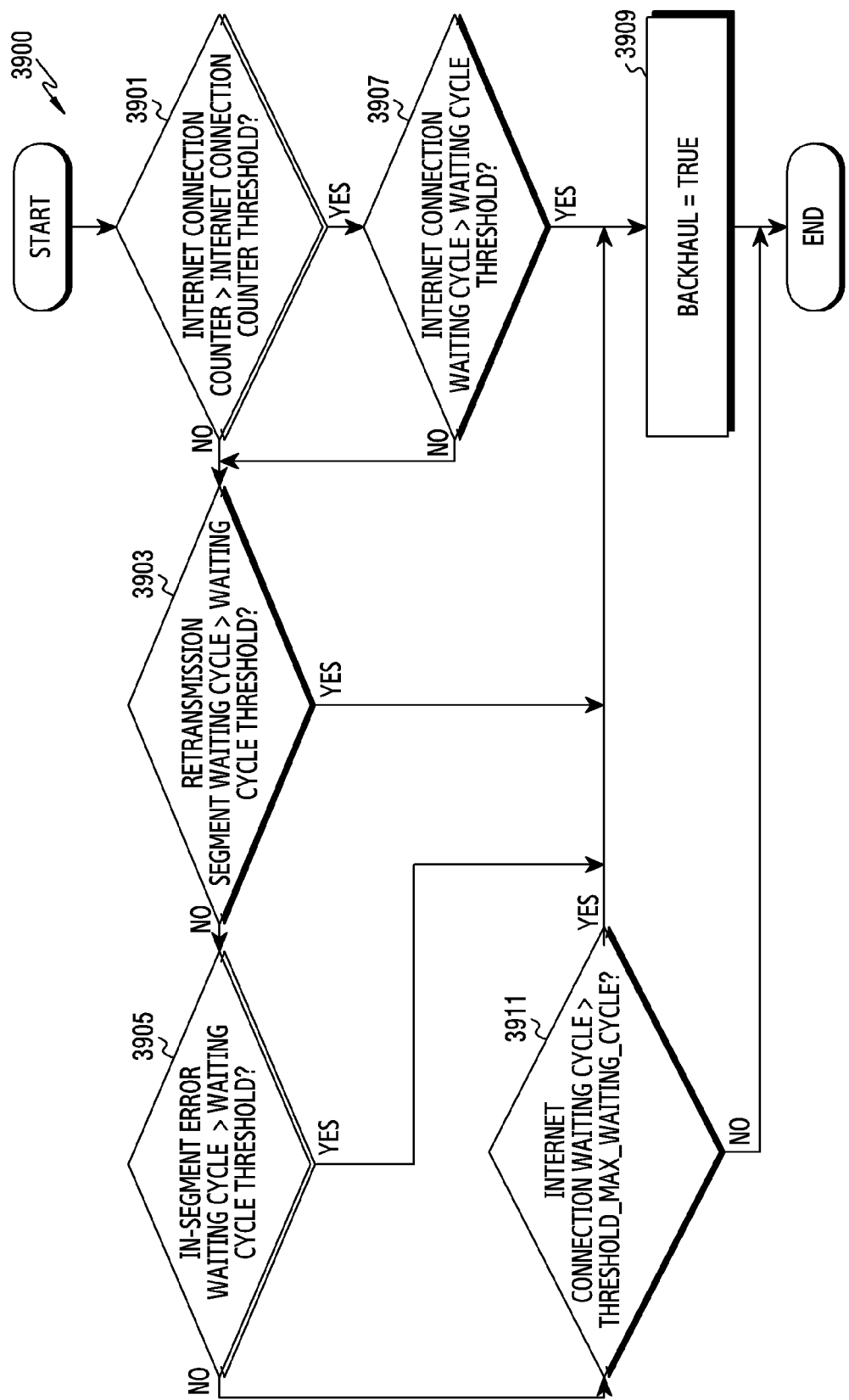
FIG. 39 illustrates a flowchart 3900 of an electronic device for examining a backhaul state according to various embodiments of the disclosure.

FIG. 39 illustrates a flowchart 3900 of an electronic device for examining a backhaul state according to various embodiments of the disclosure. In the following embodiment, the operations may be sequentially performed, but are not necessarily sequentially performed. For example, the sequential position of each operation may be changed, or at least two operations may be performed in parallel. FIG. 39 is a part of operation 3309 of FIG. 33, and the entity performing the operations illustrated in flowchart 3900 may be understood to be the electronic device 101 or a component (e.g., a processor 120) of the electronic device 101.

Referring to FIG. 39, in operation 3901, the electronic device (e.g., the processor 120 of FIG. 1) according to various embodiments may identify whether an Internet connection counter is greater than an Internet connection counter threshold. When the Internet connection counter is greater than the Internet connection counter threshold, the processor 120 may perform operation 3907. When the Internet connection counter is not greater than the Internet connection counter threshold, the processor 120 may perform operation 3903.

According to various embodiments, in operation 3903, the processor 120 may identify whether a retransmission segment waiting cycle is greater than a waiting cycle threshold. When the retransmission segment waiting cycle is greater than the waiting cycle threshold, the processor 120 may perform operation 3909. When the retransmission segment waiting cycle is not greater than the waiting cycle threshold, the processor 120 may perform operation 3905.

According to various embodiments, in operation 3905, the processor 120 may identify whether an in-segment error waiting cycle is greater than a waiting cycle threshold. When the in-segment error waiting cycle is greater than the waiting cycle threshold, the processor 120 may perform operation 3909. When the in-segment error waiting cycle is not greater than the waiting cycle threshold, the processor 120 may perform operation 3911.

According to various embodiments, in operation 3907, the processor 120 may identify whether an Internet connection waiting cycle is greater than a waiting cycle threshold. When the Internet connection waiting cycle is greater than the waiting cycle threshold, the processor 120 may perform operation 3909. When the Internet connection waiting cycle is not greater than the waiting cycle threshold, the processor 120 may perform operation 3903.

According to various embodiments, in operation 3909, the processor 120 may configure a value corresponding to the backhaul as true.

According to various embodiments, in operation 3911, the processor 120 may identify whether an Internet connection waiting cycle is greater than THRESHOLD_MAX_WAITING_CYCLE. When the Internet connection waiting cycle is greater than THRESHOLD_MAX_WAITING_CYCLE, the processor 120 may perform operation 3909. When the Internet connection waiting cycle is not greater than THRESHOLD_MAX_WAITING_CYCLE, the processor 120 may end the operation.

According to various embodiments, a method of operating an electronic device (e.g., the electronic device 101 of FIG. 1) may include: identifying a state of a transport protocol; determining a communication state of the electronic device 101 based on the state of the transport protocol; and changing a network based on the communication state.

In various embodiments, the state of the transport protocol may include a state of a TCP socket used by an application executed in the electronic device.

In various embodiments, the communication state may include at least one of a good state, a poor state, a blocked state, and a sluggish state.

In various embodiments, the determining of the communication may include: detecting a TCP socket for connection establishment; identifying whether a state of the TCP socket is changed from a connection establishment request state to a connection-established state; identifying whether the sum of the number of transmission data packets of an application executed in the electronic device and the number of reception data packets of an application executed in the electronic device is greater than a threshold; identifying whether the state of the TCP socket is a connection-release-waiting state or a time-waiting state; and when the TCP socket for the connection establishment is detected, the state of the TCP socket is changed from the connection establishment request state to the connection-established state, the sum of the number of transmission data packets and the number of reception data packets is greater than the threshold, or the connection-release-waiting state and the time-waiting state are identified, determining the communication state to be the good state.

In various embodiments, the determining of the communication state may include: identifying the communication state is a good state; detecting a TCP socket for connection establishment; identifying whether a state of the TCP socket is a connection establishment request state; identifying whether the number of transmission data packets of an application executed in the electronic device is greater than the number of reception data packets of an application executed in the electronic device; and when the communication state is not a good state, the TCP socket for the connection establishment is detected, the connection establishment request state is identified, or the number of transmission data packets is greater than the number of reception data packets, determining the communication state to be the poor state.

In various embodiments, the determining of the communication state may include: detecting a TCP socket for performing retransmission; identifying whether the number of transmission data packets of an application executed in the electronic device and the number of reception data packets of an application executed in the electronic device are smaller than a threshold; identifying whether a link speed, a signal-to-noise ratio (SNR), and received signal strength indication (RSSI) of the electronic device are greater than a corresponding threshold; and when a TCP socket for performing retransmission is detected, the number of transmission data packets and the number of reception data packets are smaller than the threshold, and the link speed, the SNR, and the RSSI are greater than the threshold, determining the communication state to be the blocked state.

In various embodiments, the blocked state may include a state in which an application executed in the electronic device is blocked by a network firewall.

In various embodiments, the determining of the communication state may include: detecting a TCP socket for connection establishment; identifying whether a state of the TCP socket is a new connection establishment request state; identifying whether the sum of the number of transmission data packets of an application executed in the electronic device and the number of reception data packets of an application executed in the electronic device is smaller than a threshold; and when the TCP socket for the connection establishment is detected, the new connection establishment request is identified, or the sum of the number of transmission data packets and the number of reception data packets is smaller than the threshold, determining the communication state to be the sluggish state.

In various embodiments, the state of the transport protocol may be identified by using an ID and an IP address of the TCP socket.

In various embodiments, the method of operating the electronic device 101 may include: displaying the communication on the electronic device; and displaying a message including information on a network change on the electronic device based on the communication state.

In various embodiments, the method of operating the electronic device 101 may further include: identifying at least one of a state of the transport protocol and a count of sockets of the transport protocol; determining whether a backhaul failure has occurred based on at least one of the state of the transport protocol and the count of sockets of the transport protocol; and controlling the backhaul failure based on the backhaul failure determination.

In various embodiments, the determining of whether a backhaul failure has occurred on at least one of the identified state of the transport protocol and the identified count of sockets of the transport protocol may include: identifying that a total count of sockets of the transport protocol is equal to or greater than a threshold; identifying that a count of connection-established sockets of the transport protocol is maintained or reduced; and determining whether a backhaul failure has occurred based on results of the identification.

In various embodiments, the determining of whether a backhaul failure has occurred based on at least one of the identified state of the transport protocol and the identified count of sockets of the transport protocol may include: identifying that the number of transmission packets of an application executed in the electronic device and the number of reception data packets of an application executed in the electronic device are smaller than or equal to a threshold; and determining whether a backhaul failure has occurred based on a result of the identification.

In various embodiments, the determining of whether a backhaul failure has occurred based on at least one of the identified state of the transport protocol and the identified count of sockets of the transport protocol may include: identifying that a retransmission segment of the transport protocol is equal to or greater than a threshold; and determining whether a backhaul failure has occurred based on a result of the identification.

In various embodiments, the determining of whether a backhaul failure has occurred based on the identified state of the transport protocol and the identified count of sockets the transport protocol may include: identifying whether an error in a reception segment of the transport protocol occurs; and determining whether a backhaul failure has occurred based on a result of the identification.

In various embodiments, the controlling of the backhaul failure based on the backhaul failure determination may include: displaying information relating to the backhaul failure; and displaying an indicator for changing a network based on the backhaul failure.

In various embodiments, the controlling of the backhaul failure based on the backhaul failure determination may include: identifying an external device to which information relating to the backhaul failure is to be transmitted; and transmitting the information relating to the backhaul failure to the identified external device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. A method of operating an electronic device, comprising:
    detecting a transmission control protocol (TCP) socket for a connection establishment or a TCP socket for performing retransmission;
    identifying a state of a transport protocol of the detected TCP socket, the state of the transport protocol including a connection establishment request state, a connection establishment state and a connection release state;
    identifying a number of transmission data packets of an application executed in the electronic device and a number of reception data packets of the application executed in the electronic device;
    identifying a link speed, a signal-to-noise ratio (SNR), and a received signal strength indication (RSSI) of the electronic device;
    determining a communication state of the electronic device based on the state of the transport protocol, the identified number of transmission data packets, the identified number of reception data packets, the link speed, the SNR and the RSSI; and
    changing a network based on the communication state.

2. The method of claim 1, wherein the communication state is determined to be at least one of a good state, a poor state, a blocked state, and a sluggish state.

3. The method of claim 2, further comprising:
    detecting the TCP socket for performing retransmission;
    identifying whether the number of transmission data packets of the application executed in the electronic device and the number of reception data packets of the application executed in the electronic device are smaller than a threshold;
    identifying whether the link speed, the signal-to-noise ratio (SNR), and the received signal strength indication (RSSI) of the electronic device are greater than corresponding thresholds; and
    when the TCP socket for performing retransmission is detected, the number of transmission data packets and the number of reception data packets are smaller than the threshold, and the link speed, the SNR, and the RSSI are greater than the corresponding thresholds, determining the communication state to be a blocked state.

4. The method of claim 1, further comprising:
    displaying the communication state on the electronic device; and
    displaying a message comprising information relating to a network change on the electronic device based on the communication state.

5. The method of claim 1, further comprising:
    identifying at least one of a state of the transport protocol and a count of sockets of the transport protocol;
    determining whether a backhaul failure has occurred based on at least one of the identified state of the transport protocol and the identified count of sockets of the transport protocol; and
    controlling the backhaul failure based on determining that the backhaul failure has occurred.

6. The method of claim 5, wherein the determining of whether a backhaul failure has occurred based on at least one of the identified state of the transport protocol and the identified count of sockets of the transport protocol comprises:
    identifying an occurrence of an error in a reception data packet of the transport protocol; and
    determining whether a backhaul failure has occurred based on a result of identifying the occurrence of the error in the reception data packet of the transport protocol.

7. The method of claim 5, wherein controlling of the backhaul failure based on the backhaul failure determination comprises:
    identifying an external device to which information relating to the backhaul failure is to be transmitted; and
    transmitting information relating to the backhaul failure to the identified external device.

8. An electronic device comprising:
    a communication module;
    at least one processor; and
    a memory operatively connected to the at least one processor,
    wherein the memory is configured to store instructions that, when executed, cause the at least one processor to:
    detect a transmission control protocol (TCP) socket for a connection establishment or a TCP socket for performing retransmission,
    identify a state of a transport protocol of the detected TCP socket, the state of the transport protocol including a connection establishment request state, a connection establishment state and a connection release state,
    identify a number of transmission data packets of an application executed in the electronic device and a number of reception data packets of the application executed in the electronic device,
    identify a link speed, a signal-to-noise ratio (SNR), and a received signal strength indication (RSSI) of the electronic device, and
    determine a communication state of the electronic device based on the state of the transport protocol, the identified number of transmission data packets, the identified number of reception data packets, the link speed, the SNR and the RSSI, and
    change a network based on the communication state.

9. The electronic device of claim 8, wherein the communication state is determined to be at least one of a good state, a poor state, a blocked state, and a sluggish state.

10. The electronic device of claim 9, wherein, when executed, the instructions cause the at least one processor to:
    detect the TCP socket for performing retransmission,
    identify whether the number of transmission data packets of the application executed in the electronic device and the number of reception data packets of the application executed in the electronic device are smaller than a threshold,
    identify whether the link speed, the signal-to-noise ratio (SNR), the received signal strength indication (RSSI) of the electronic device are greater than corresponding thresholds, and
    when the TCP socket for performing retransmission is detected, the number of transmission data packets and the number of reception data packets are smaller than the threshold, and the link speed, the SNR, and the RSSI are greater than the corresponding thresholds, determine the communication state to be the blocked state.

11. The electronic device of the claim 8, wherein, when executed, the instructions cause the at least one processor to:
    display the communication state on the electronic device, and display a message including information relating to a network change on the electronic device based on the communication state.

12. The electronic device of claim 8, wherein, when executed, the instructions cause the at least one processor to:
identify at least one of a state of the transport protocol and a count of sockets of the transport protocol,
determine a backhaul failure based on at least one of the identified state of the transport protocol and the identified count of sockets of the transport protocol, and
control the backhaul failure based on determining that the backhaul failure has occurred.

13. The electronic device of claim 12, wherein, when executed, the instructions cause the at least one processor to:
identify occurrence of an error in a reception data packet of the transport protocol, and
determine whether a backhaul failure has occurred based on a result of identifying the occurrence of the error in the reception data packet of the transport protocol.

14. The method of claim 5, wherein the determining of whether a backhaul failure has occurred based on at least one of the identified state of the transport protocol and the identified count of sockets the transport protocol comprises:
identifying that a total count of sockets of the transport protocol is equal to or greater than a threshold;
identifying that a count of connection-established sockets of the transport protocol is maintained or reduced; and
determining whether a backhaul failure has occurred based on results of identifying that the total count of sockets of the transport protocol is equal to or greater than the threshold and identifying that the count of connection-established sockets of the transport protocol is maintained or reduced.

15. The method of claim 5, wherein the determining of whether a backhaul failure has occurred based on at least one of the identified state of the transport protocol and the identified count of sockets of the transport protocol comprises:
identifying that the number of transmission data packets of an application executed in the electronic device and the number of reception data packets of an application executed in the electronic device are smaller than or equal to a threshold; and
determining whether a backhaul failure has occurred based on a result of identifying that the number of transmission data packets and the number of reception data packets are smaller than or equal to the threshold.

16. The method of claim 5, wherein the determining of whether a backhaul failure has occurred based on at least one of the identified state of the transport protocol and the identified count of sockets of the transport protocol comprises:
identifying that a retransmission data packet of the transport protocol is equal to or greater than a threshold; and
determining whether a backhaul failure has occurred based on a result of identifying that the retransmission data packet is equal to or greater than the threshold.

17. The method of claim 5, wherein the controlling of the backhaul failure based on the backhaul failure determination comprises:
displaying information relating to the backhaul failure; and
displaying an indicator for changing a network based on the backhaul failure.

18. A non-transitory computer-readable recording medium comprising a plurality of instructions,
wherein the plurality of instructions are configured to, when executed by a processor, cause the processor to:
detect a transmission control protocol (TCP) socket for a connection establishment or a TCP socket for performing retransmission,
identify a state of a transport protocol of the detected TCP socket, the state of the transport protocol including a connection establishment request state, a connection establishment state and a connection release state,
identify a number of transmission data packets of an application executed in an electronic device and a number of reception data packets of the application executed in the electronic device,
identify a link speed, a signal-to-noise ratio (SNR), and a received signal strength indication (RSSI) of the electronic device, and
determine a communication state of the electronic device based on the state of the transport protocol, the identified number of transmission data packets, the identified number of reception data packets, the link speed, the SNR and the RSSI, and
change a network based on the communication state.

* * * * *